(12) United States Patent
Sunada

(10) Patent No.: US 11,785,154 B2
(45) Date of Patent: Oct. 10, 2023

(54) IMAGE READING APPARATUS AND IMAGE FORMING APPARATUS

(71) Applicant: CANON KABUSHIKI KAISHA, Tokyo (JP)

(72) Inventor: Hidenori Sunada, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/848,638

(22) Filed: Jun. 24, 2022

(65) Prior Publication Data

US 2023/0007129 A1   Jan. 5, 2023

(30) Foreign Application Priority Data

Jul. 5, 2021 (JP) ................................ 2021-111240

(51) Int. Cl.
*H04N 1/00* (2006.01)
*H04N 1/04* (2006.01)

(52) U.S. Cl.
CPC ....... *H04N 1/0057* (2013.01); *H04N 1/00649* (2013.01); *H04N 1/00729* (2013.01); *H04N 1/04* (2013.01)

(58) Field of Classification Search
CPC ............ H04N 1/00588; H04N 1/0057; H04N 1/00602; H04N 1/00352; H04N 1/00384; H04N 1/00397; H04N 1/00411; H04N 1/00437; H04N 1/00591; H04N 1/0062; H04N 1/00663; H04N 5/772; H04N 1/0061; H04N 1/2112; H04N 1/2137; H04N 2101/00; H04N 2201/214; H04N 1/00037; H04N 1/04; H04N 1/32609; H04N 1/3263; H04N 1/00018; H04N 1/00631; H04N 1/00652; H04N 1/00702; H04N 1/00777; H04N 1/1215; H04N 1/00013; H04N 1/00129; H04N 1/00172; H04N 1/00525;
(Continued)

(56) References Cited

U.S. PATENT DOCUMENTS 5,033,728 A * 7/1991 Miura ................ G03B 27/6264
271/3.18
6,285,852 B1 * 9/2001 Etoh .................. H04N 1/00602
399/373
(Continued)

FOREIGN PATENT DOCUMENTS

JP    2015-162077 A    9/2015

*Primary Examiner* — Negussie Worku
(74) *Attorney, Agent, or Firm* — VENABLE LLP

(57) ABSTRACT

An image reading apparatus controls a sheet feeding unit such that in a reading job in which a plurality of documents on a document tray is continuously fed, continuous feeding of the documents is stopped in response to changing of a detection state in which a document is detected on the document tray to a non-detection state in which no document is detected on the document tray. The control unit executes a first mode in which the sheet feeding unit stops the continuous feeding of the documents in a case where the number of documents having been discharged continuously in the reading job has reached a predetermined number of sheets, regardless of a detection result of the detection unit, and a second mode which continues the continuous feeding of the documents regardless of the number of documents having been discharged continuously.

17 Claims, 33 Drawing Sheets

(58) Field of Classification Search
CPC ........... H04N 1/00607; H04N 1/00612; H04N 1/00623; H04N 1/00628; H04N 1/00649; H04N 1/0066; H04N 1/00687; H04N 1/00694; H04N 1/0071; H04N 1/00729; H04N 1/00745; H04N 1/00755; H04N 1/047; H04N 1/1017; H04N 1/121; H04N 1/195; H04N 1/2307; H04N 1/2361; H04N 1/32101; H04N 1/40056; H04N 2201/0096; H04N 2201/04; H04N 5/265; B65H 2511/13; B65H 7/02; B65H 2701/1912; B65H 2220/01; B65H 2801/39; B65H 5/062; B65H 2220/02; B65H 2511/414; B65H 7/12; B65H 2220/11; B65H 2511/20; B65H 2511/524; B65H 2553/61; B65H 3/0638; B65H 3/0669; B65H 2513/40; B65H 2515/10; B65H 2513/10; B65H 2553/41; B65H 2701/1311; B65H 3/5261; B65H 9/006; B65H 2511/12; B65H 2511/40; B65H 2513/41; B65H 3/06; B65H 7/14; B65H 7/18; B65H 2402/441; B65H 2402/51; B65H 2403/514; B65H 2404/1521; B65H 2404/17; B65H 2404/5311; B65H 2511/224; B65H 2511/30; B65H 2513/412; B65H 2513/512; B65H 2515/70; B65H 2553/412; B65H 2557/52; B65H 2701/1313; B65H 3/0653; B65H 3/0684; B65H 3/5215; B65H 7/06; B65H 1/14; B65H 2220/03; B65H 2404/1441; B65H 2404/722; B65H 2404/7231; B65H 2404/725; B65H 2511/51; B65H 2511/528; B65H 2513/50; B65H 3/063; B65H 9/004; B65H 9/06; B65H 9/166; B65H 2220/04; B65H 2301/21; B65H 2301/33; B65H 2405/1112; B65H 2405/11161; B65H 2405/11162; B65H 2405/1412; B65H 2511/21; B65H 2511/514; B65H 2511/515; B65H 2553/43; B65H 2553/81; B65H 2601/521; B65H 2701/1131; B65H 2701/1768; B65H 2701/1827; B65H 2801/21; B65H 3/0816; B65H 39/11; B65H 43/00; B65H 7/04; B65H 1/26; B65H 1/266; B65H 1/28; B65H 11/005; B65H 20/22; B65H 23/1882; B65H 2301/321; B65H 2301/42134; B65H 2301/42322; B65H 2402/46; B65H 2404/261; B65H 2404/268; B65H 2404/2691; B65H 2406/122; B65H 2406/323; B65H 2408/111; B65H 2408/112; B65H 2408/118; B65H 2511/15; B65H 2511/214; B65H 2511/22; B65H 2511/416; B65H 2511/417; B65H 2511/52; B65H 2511/521; B65H 2511/522; B65H 2513/51; B65H 2551/14; B65H 2557/2423; B65H 2701/11231; B65H 2701/18292; B65H 2801/06; B65H 29/58; B65H 29/60; B65H 3/042; B65H 3/0676; B65H 3/30; B65H 3/446; B65H 43/04; B65H 5/026; B65H 5/06; B65H 5/224; B65H 5/26; B65H 7/00; B65H 7/08; B65H 7/125; B65H 83/02; B65H 85/00; B65H 9/002; G03G 15/1615; G03G 15/6508; G03G 15/6594; G03G 15/5016; G03G 2215/00734; G03G 15/5029; G03G 15/6514; G03G 15/6564; G03G 2215/00599; G03G 2215/00945; G03G 15/2003; G03G 15/5095; G03G 15/55; G03G 15/607; G03G 15/6511; G03G 15/6538; G03G 15/6552; G03G 15/6555; G03G 15/70; G03G 15/80; G03G 21/203; G03G 2215/00358; G03G 2215/00472; G03G 2215/0458; G03G 7/00; G03G 15/041; G03G 15/047; G03G 15/23; G03G 15/30; G03G 15/5012; G03G 15/5062; G03G 15/6526; G03G 15/6529; G03G 15/6558; G03G 15/6591; G03G 21/14; G03G 2215/00185; G03G 2215/00383; G03G 2215/00392; G03G 2215/00409; G03G 2215/00459; G03G 2215/00556; G03G 2215/00729; G03G 2215/00751; G03G 2215/00949; G03G 2215/0487
USPC .................................................. 358/475, 498
See application file for complete search history.

(56) References Cited

U.S. PATENT DOCUMENTS

| 7,621,519 | B2* | 11/2009 | Sagawa | B65H 5/36 271/4.01 |
|---|---|---|---|---|
| 8,448,932 | B2* | 5/2013 | Kubota | G03G 15/5029 700/223 |
| 8,950,743 | B2* | 2/2015 | Sakano | B65H 5/062 271/3.14 |
| 10,455,114 | B2* | 10/2019 | Osada | H04N 1/00771 |
| 10,719,887 | B2 | 7/2020 | Nakayama | |
| 11,330,126 | B2* | 5/2022 | Hino | H04N 1/00602 |
| 2002/0051666 | A1* | 5/2002 | Asai | G03G 15/6508 399/391 |
| 2002/0141772 | A1* | 10/2002 | Kawano | G03G 15/2003 399/68 |
| 2006/0114280 | A1* | 6/2006 | Koide | B41J 13/0036 347/16 |
| 2007/0047979 | A1* | 3/2007 | Ai | G03G 15/6508 399/23 |
| 2013/0230205 | A1* | 9/2013 | Nuggehalli | G06Q 40/12 382/100 |
| 2016/0176667 | A1* | 6/2016 | Mori | B65H 9/006 271/227 |
| 2018/0107146 | A1* | 4/2018 | Shinohara | G03G 15/6508 |
| 2020/0319583 | A1* | 10/2020 | Nakama | G03G 15/80 |
| 2020/0341409 | A1* | 10/2020 | Tsujimura | G03G 15/1615 |
| 2021/0112171 | A1* | 4/2021 | Tachibana | B65H 3/0684 |

* cited by examiner

| COLOR/MONOCHROME |
| READ SIZE MODE |
| PLATEN GLASS/ FRONT SURFACE/REAR SURFACE |
| RESOLUTON |
| DOCUMENT TYPE |
| READ STATE |
| CONTINUOUSLY DISCHARGED SHEET COUNTER |
| UPPER LIMIT OF CONTINUOUSLY DISCHARGED SHEET COUNTER |

FIG19

| PAGE NUMBER |
| --- |
| COLOR/MONOCHROME |
| READ SIZE MODE |
| PLATEN GLASS/ FRONT SURFACE/REAR SURFACE |
| RESOLUTON |
| DOCUMENT TYPE |
| READ STATE |

IMAGE READING APPARATUS AND IMAGE FORMING APPARATUS

BACKGROUND OF THE INVENTION

Field of the Invention

The present invention relates to image reading apparatuses for reading images from documents and image forming apparatuses for forming images read by the image reading apparatus.

Description of the Related Art

Image reading apparatuses adopted in multifunction machines are generally equipped with an automatic document feeder (ADF). In order to cope with recent demands for a more efficient operation flow through use of information technology, a configuration has been disclosed in which receipts and bills are read by an ADF that is provided in a multifunction machine and that serves as an input unit for entering expenditure information, and in which the image data is integrated in the operation flow to be processed (refer to Japanese Patent Application Laid-Open Publication No 2015-162077).

In general, documents containing expenditure data such as receipts and bills are small pieces of paper, and such documents are possibly folded, crumpled, or curled before they are placed on a document tray. It is difficult to stack and align such documents, especially in cases where there is a large number of such documents.

When conveying documents in the ADF, feeding operations are repeatedly performed until all the documents placed on the document tray are fed. Therefore, in a case where folded or crumpled documents are read and discharged by the ADF continuously, stacking failure may occur on the sheet discharge tray or the documents may be jammed in a sheet discharge unit of the ADF.

SUMMARY OF THE INVENTION

According to a first aspect of the present invention, an image reading apparatus includes a document tray on which a document is placed, a detection unit configured to detect the document placed on the document tray, a sheet feeding unit configured to feed the document placed on the document tray, a conveyance unit configured to convey the document fed by the sheet feeding unit along a conveyance path, a reading unit configured to read an image on the document being conveyed by the conveyance unit, a sheet discharge unit configured to discharge the document having been read by the reading unit, a sheet discharge tray on which the document discharged by the sheet discharge unit is stacked, and a control unit configured to stop feeding of the document by the sheet feeding unit in a case where the detection unit detects that there is no document present on the document tray. The control unit is configured to execute a first mode and a second mode, the first mode being a mode in which the sheet feeding unit stops feeding of the document in a case where the number of documents having been discharged continuously by the sheet discharge unit has reached a predetermined number of sheets, regardless of a detection result of the detection unit, and the second mode being a mode in which the sheet feeding unit continues feeding of the documents regardless of the number of documents having been discharged continuously by the sheet discharge unit.

According to a second aspect of the present invention, an image reading apparatus includes a document tray on which a document is placed, a detection unit configured to detect a document placed on the document tray, a sheet feeding unit configured to feed the document placed on the document tray, a conveyance unit configured to convey the document fed by the sheet feeding unit along a conveyance path, a reading unit configured to read an image on the document conveyed by the conveyance unit, a sheet discharge unit configured to discharge the document having been read by the reading unit, a sheet discharge tray on which the document discharged by the sheet discharge unit is stacked, and a control unit configured to stop feeding of the document by the sheet feeding unit in a case where the detection unit detects that there is no document present on the document tray. The control unit is configured to execute a first mode and a second mode, the first mode is a mode in which the sheet feeding unit stops feeding of the document in a case where the number of documents having been fed continuously by the sheet feeding unit has reached a predetermined number of sheets, regardless of a detection result of the detection unit, and the second mode is a mode in which the sheet feeding unit continues feeding of the document regardless of the number of documents having been fed continuously by the sheet feeding unit.

According to a third aspect of the present invention, an image reading apparatus includes a document tray on which a document is placed, a detection unit configured to detect the document placed on the document tray, a sheet feeding unit configured to feed the document placed on the document tray, a conveyance unit configured to convey the document fed by the sheet feeding unit along a conveyance path, a reading unit configured to read an image on the document being conveyed by the conveyance unit, a sheet discharge unit configured to discharge the document having been read by the reading unit, a sheet discharge tray on which the document discharged by the sheet discharge unit is stacked, and a control unit configured to stop feeding of the document by the sheet feeding unit in a case where the detection unit detects that there is no document present on the document tray. In a state where the document on the document tray is detected by the detection unit, the control unit is configured to stop feeding of the document by the sheet feeding unit, if documents continuously read by the reading unit have reached a predetermined number of sheets.

Further features of the present invention will become apparent from the following description of exemplary embodiments with reference to the attached drawings.

BRIEF DESCRIPTION OF THE DRAWINGS

FIG. 9A is a view illustrating an image read by the CCD sensor unit according to the first embodiment.

FIG. 9B is a view illustrating an image data subjected to skew correction control.

FIG. 18 is a view illustrating an apparatus management information according to the first embodiment.

FIG. 19 is a view illustrating a page management information according to the first embodiment.

DESCRIPTION OF THE EMBODIMENTS

First Embodiment

Figure 1:
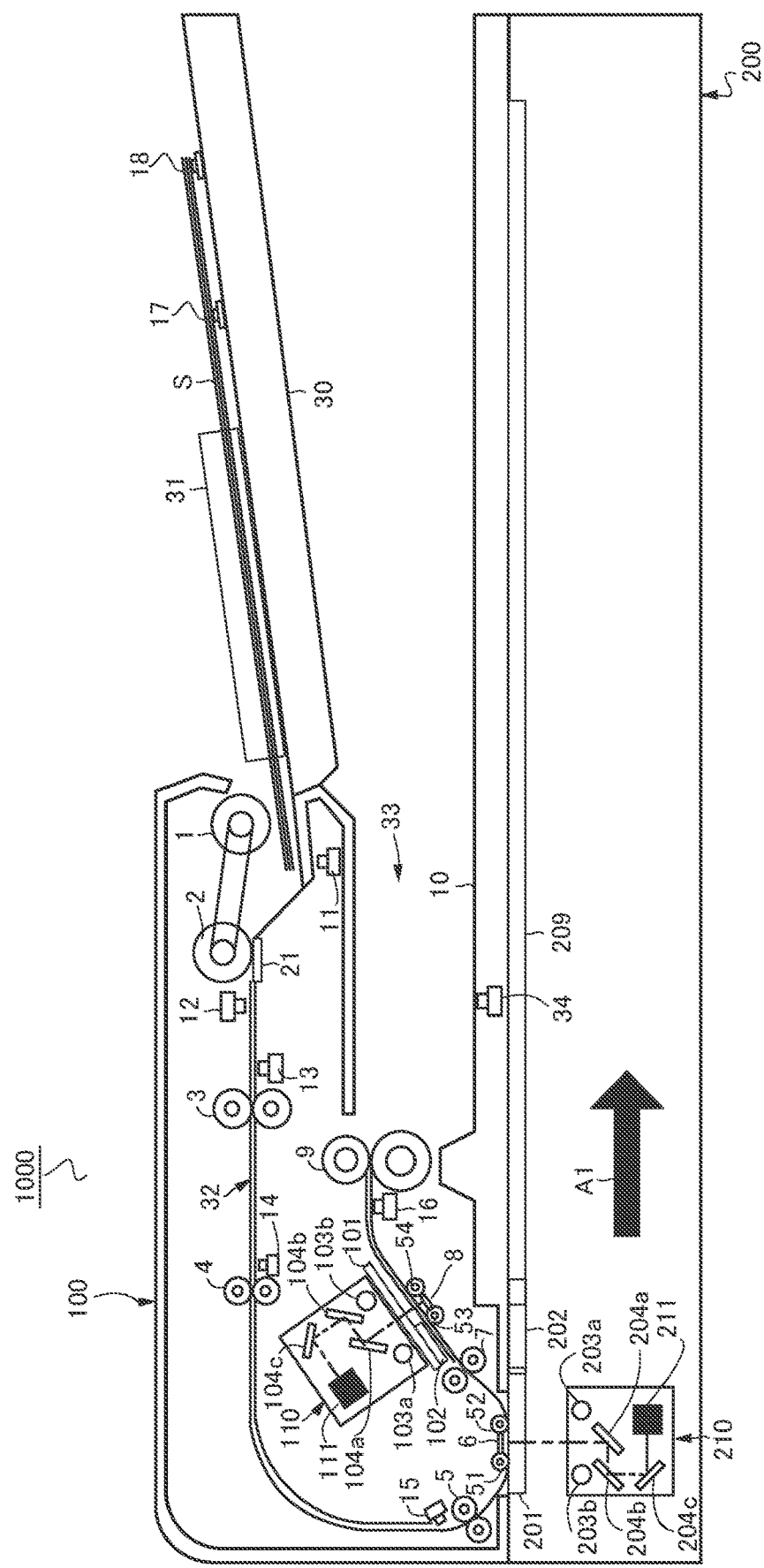
FIG. 1 is a schematic drawing of an image reading apparatus according to a first embodiment.

An embodiment according to the present technique will be described with reference to FIGS. 1 to 24. At first, a general configuration of an image reading apparatus according to the first embodiment will be described with reference to FIG. 1. FIG. 1 is a front view of an image reading apparatus 1000.

Image Reading Apparatus

FIG. 1 is a configuration diagram of the image reading apparatus 1000 according to the first embodiment. The image reading apparatus 1000 includes a reading apparatus (reader) 200 serving as a reading unit, and an automatic document feeder (ADF) 100. An operation of the image reading apparatus 1000 is controlled by a controller described later. The ADF 100 is attached to a casing of the reader 200 by a hinge not shown. The casing of the reader 200 supports a platen glass 209 and a document feeding-reading glass 201. The ADF 100 is openable and closable with respect to the platen glass 209 and the document feeding-reading glass 201 by pivoting via the hinge not shown. A shading white board 202 is provided between the platen glass 209 and the document feeding-reading glass 201 inside the casing of the reader 200.

In the first embodiment, the reader 200 has a CCD sensor unit 210 disposed inside the casing. The CCD sensor unit 210 reads an image formed on one side, or front surface, of a document, and generates image data representing the image being read. The ADF 100 includes a CCD sensor unit 110 that reads an image formed on the other side, or rear surface, of the document. The CCD sensor unit 110 reads the image formed on the other side of the document and generates image data representing the image being read.

The ADF 100 includes a document tray 30 capable of supporting a bundle of documents S composed of one or more sheet-like documents, a conveyance path 32 through which documents are conveyed, and a sheet discharge tray 10 onto which a document having been subjected to reading is discharged.

The document tray 30 includes a document guide plate 31 that regulates a direction, i.e., width direction, orthogonal to a conveyance direction, i.e., longitudinal direction, of the document, document length sensors 17 and 18 positioned at different positions in the conveyance direction of the document, and a document presence detection sensor 11 serving as a detection unit for detecting a presence or an absence of a document.

The document guide plate 31 is configured movably in a width direction and to abut against an end portion of the document in the width direction to regulate the position of the document in the width direction. According to the first embodiment, two document guide plates 31 are provided to regulate both end portions in the width direction of the document. It is also possible to adopt a configuration where one document guide plate 31 is provided to regulate only one end in the width direction of the document. If there is only one document guide plate 31, the other end in the width direction of the document is regulated by the regulation plate being fixed.

The two document guide plates 31 are configured such that one moves in an interlocked manner when the other moves via an interlock mechanism not shown provided in the document tray 30. In the first embodiment, a conveyance center line of the document corresponds to a center in the width direction. The two document guide plates 31 are configured to move toward or away from the center in the width direction and configured such that the distance from the center of the document tray 30 to the document guide plates 31 arranged on either side are at the same distance at both the front direction and the depth direction. Therefore, the center line of conveyance of the document is positioned at the same center position in the width direction regardless of document size. The distance between two document guide plates 31 can be narrowed to a minimum width of 48 mm such that even a business card size document can be conveyed.

The document length sensors 17 and 18 are each a sensor for detecting the presence of a document, wherein the document length sensor 18 is arranged upstream in the conveyance direction of the document length sensor 17. A CPU 321 of the reader 200 (refer to FIG. 4) can detect an approximate length of the document in the conveyance direction based on a detection result of the presence or absence of document of each of the document length sensors 17 and 18 in a state where the end downstream in the conveyance direction of the document is abutted against a base end of the document tray 30. If the document length sensor 17 detects a document and the document length sensor 18 does not detect a document, for example, the CPU 321 determines that the document length is longer than the length from the base end to the position of the document length sensor 17 and shorter than the length from the base end to the position of the document length sensor 18.

The document presence detection sensor 11 is arranged at a base end portion of the document tray 30 such that the presence of a document can be detected regardless of the size of the document placed on the document tray 30. The CPU 321 determines whether a document is placed on the document tray 30 based on the detection result of the document presence detection sensor 11.

The ADF 100 is equipped with conveyance units including a pickup roller 1, a separation roller 2, a drawing roller 3, a conveyance roller 4, a lead roller 5, front surface read rollers 51 and 52, rear surface read rollers 53 and 54, a lead roller 7, and a sheet discharge roller 9 on the conveyance path 32 in the named order from upstream in the conveyance direction.

Figure 2:
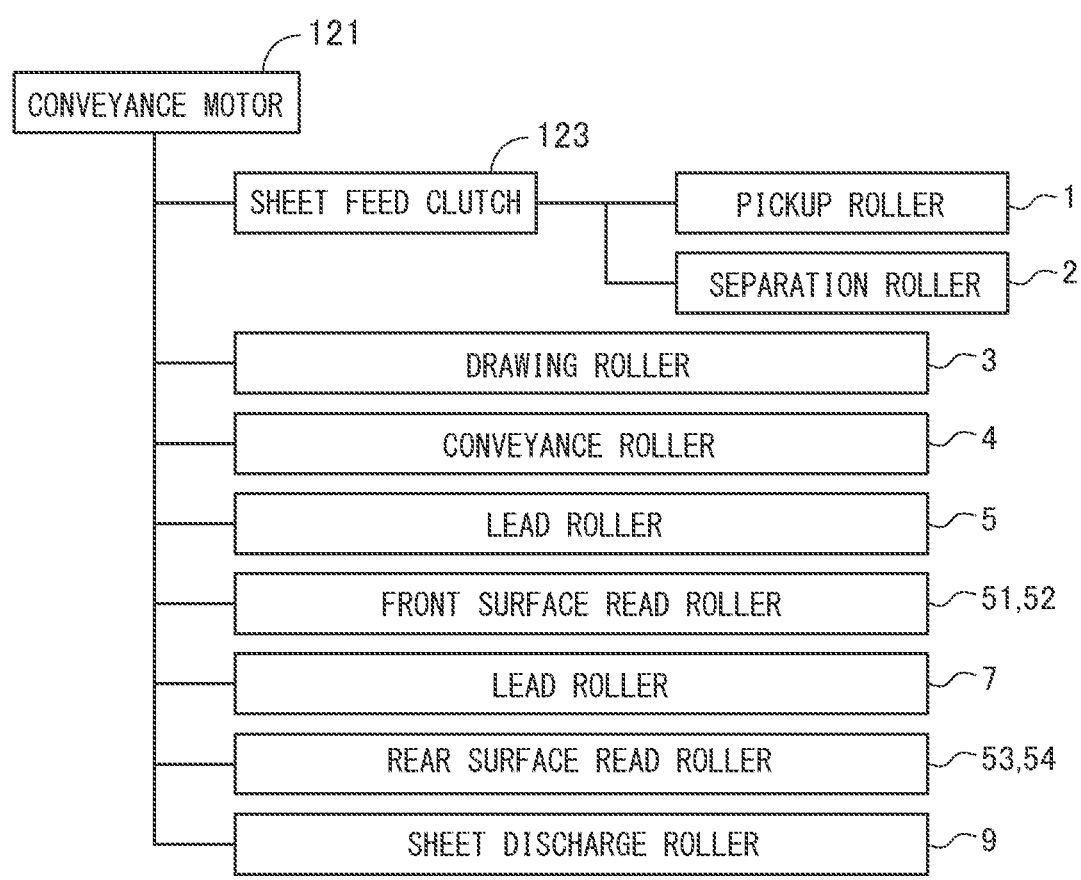
FIG. 2 is a block diagram illustrating a relationship of drives of respective rollers for conveying documents and a conveyance motor according to the first embodiment.

FIG. 2 is a block diagram illustrating a relationship between drives of respective rollers that convey the document and a conveyance motor 121 in the ADF 100. As illustrated in FIG. 2, the respective rollers that convey the document use the conveyance motor 121 as a drive source. The pickup roller 1, the separation roller 2, and the conveyance motor 121 are not directly connected, and a driving force of the conveyance motor 121 is configured to be transmitted to the pickup roller 1 and the separation roller 2 via a sheet feed clutch 123.

The pickup roller 1 is arranged swingably on a rotation shaft of the separation roller 2, and when folding a document from the document tray 30, the sheet feed clutch 123 is turned on and the pickup roller 1 falls on a surface of the uppermost document of the bundle of documents S and rotates. By falling on the surface of the document and rotating, the pickup roller 1 picks up the uppermost document from the bundle of documents S placed on the document tray 30 and conveys the document to the separation roller 2. The separation roller 2 separates the documents sheet by sheet by a separation nip portion formed between the separation roller 2 and a separation pad 21 that regulates the bundle of documents S from protruding from the document tray 30 and moving downstream before the conveyance of the document is started. The separation of documents is a known technique. The pickup roller 1 and the separation roller 2 constitute a sheet feeding unit that feeds the documents placed on the document tray 30 one sheet at a time.

The documents separated one sheet at a time by the separation roller 2 and the separation pad 21 are conveyed by the drawing roller 3 to the conveyance roller 4. In the ADF 100, the sheet feed clutch 123 is turned off at a point of time when a predetermined time has elapsed from when a leading edge of a document has been detected by a draw-out sensor 13 provided upstream in the conveyance direction of the drawing roller 3. In the ADF 100, by the sheet feed clutch 123 being turned off, the rotation of the pickup roller 1 positioned above the document tray 30 is stopped and feeding of a subsequent document is suppressed. In the ADF 100, the rotation of the separation roller 2 is stopped by the sheet feed clutch 123 being turned off, such that the document is conveyed for a brief time by the drawing roller 3.

The conveyance roller 4 for conveying the document having passed through the drawing roller 3 is arranged downstream of the drawing roller 3 in the conveyance direction. Further, a registration sensor 14 for detecting the document conveyed along the conveyance path 32 is arranged upstream of the conveyance roller 4 in the conveyance direction. The conveyance roller 4 conveys the document toward the document feeding-reading glass 201. The document conveyed by the conveyance roller 4 is conveyed to a read position of a CCD (Charge Coupled Device) sensor unit 210, i.e., above the document feeding-reading glass 201, by the lead roller 5 and the front surface read rollers 51 and 52.

A read sensor 15 is arranged upstream of the lead roller 5 in the conveyance direction, and a read processing of image of the document is controlled using a timing at which the leading edge of the document being conveyed is detected by the read sensor 15, i.e., document leading edge detection timing. In the image reading apparatus 1000, starting of read at a first surface read position is controlled based on the document leading edge detection timing of the read sensor 15 and a distance from the read sensor 15 to the read position of the CCD sensor unit 210, i.e., first surface read position. Further, in the image reading apparatus 1000, starting of read at a second surface read position is controlled based on the document leading edge detection timing of the read sensor 15 and a distance from the read sensor 15 to the read position of the CCD sensor unit 110, i.e., second surface read position.

The document feeding-reading glass 201 is positioned at the read position, i.e., first surface read position, of the CCD sensor unit 210 for reading the image on the document conveyed by the ADF 100. The shading white board 202 is provided on the document feeding-reading glass 201. The shading white board 202 is a member serving as a reference of white color that is used when executing a shading processing. The shading processing using the shading white board 202 is performed before starting reading of the image.

A white-colored opposing member 6 is provided at a position opposed to the CCD sensor unit 210 interposing the document feeding-reading glass 201. A front surface read roller 51 is arranged upstream of the opposing member 6, and a front surface read roller 52 is arranged downstream thereof.

The document is conveyed by the front surface read roller 51 between the document feeding-reading glass 201 and the opposing member 6. The CCD sensor unit 210 irradiates light from light source lamps 203*a* and 203*b* to a first surface, i.e., front surface, of the document passing through between the document feeding-reading glass 201 and the opposing member 6. Reflected light from the first surface of the document is bent by a plurality of reflecting mirrors 204*a*, 204*b*, and 204*c*, and enters the CCD sensor 211. Electric signals obtained through photoelectric conversion of the reflected light received by a plurality of photoelectric conversion elements are subjected to predetermined processing by the CCD sensor 211, and an image data is generated. In this way, the CCD sensor unit 210 reads the image on the first surface of the document one line at a time. The direction in which the photoelectric conversion elements are arranged is referred to as the main scanning direction.

The document having passed through the first surface read position is conveyed by the front surface read roller 52 to the lead roller 7. The document is conveyed by the lead roller 7 from the first surface read position to the read position (second surface read position) of the CCD sensor unit 110. A document feeding-reading glass 101 is provided at the second surface read position. A shading white board 102 is provided on the document feeding-reading glass 101. The shading white board 102 is a member serving as a reference of white color that is used when executing a shading processing. The shading processing using the shading white board 102 is performed before starting reading of the image.

A white-colored opposing member 8 is provided at a position opposed to the CCD sensor unit 110 interposing the document feeding-reading glass 101. A rear surface read roller 53 is arranged upstream of the opposing member 8, and a rear surface read roller 54 is arranged downstream thereof.

The document is conveyed by the rear surface read roller 53 between the document feeding-reading glass 101 and the opposing member 8. The CCD sensor unit 110 irradiates light from light source lamps 103*a* and 103*b* to a second surface, i.e., rear surface, of the document passing through between the document feeding-reading glass 101 and the opposing member 8. Reflected light from the second surface of the document is bent by a plurality of rear surface reflecting mirrors 104*a*, 104*b*, and 104*c*, and enters a CCD sensor 111. Electric signals obtained through photoelectric conversion of the reflected light received by a plurality of photoelectric conversion elements are subjected to predetermined processing by the CCD sensor 111, and an image data is generated. In this way, the CCD sensor unit 110 reads the image on the second surface of the document one line at a time.

The document having passed through the read position of the CCD sensor unit 110 is conveyed by the rear surface read roller 54 to the sheet discharge roller 9 arranged downstream thereof. The sheet discharge roller 9 is configured as a sheet discharge unit that discharges the document being read by the CCD sensor units 210 and 110 to the sheet discharge tray 10. In the ADF 100, the document discharged by the sheet discharge roller 9 is stacked on the sheet discharge tray 10. Further, a sheet discharge sensor 16 for detecting presence or absence of a discharged document is arranged upstream of the sheet discharge roller 9 in the conveyance direction.

When reading a document image on one side of a document, the CCD sensor unit 210 reads the document image on the first surface of the document, and the CCD sensor unit 110 is not activated. If a plurality of documents are placed on the document tray 30, feeding of a document from the bundle of documents S, separation, conveyance processing, read processing at the first surface read position, and sheet discharge processing are repeatedly performed until the reading of image from the first surface and a second surface of a last document and discharge thereof to the sheet discharge tray 10 are completed.

Meanwhile, when reading document images from both surfaces of the document, the CCD sensor unit 210 reads the document image on the first surface of the document and the CCD sensor unit 110 reads the document image on the second surface of the document one line at a time. If a plurality of documents are placed on the document tray 30, feeding of a document from the bundle of documents S, separation, conveyance processing, read processing at the first surface read position and the second surface read position, and sheet discharge processing are repeatedly performed until the reading of image from the first and second surfaces of a last document and discharge thereof to the sheet discharge tray 10 are completed.

Image Forming Apparatus

Figure 3:
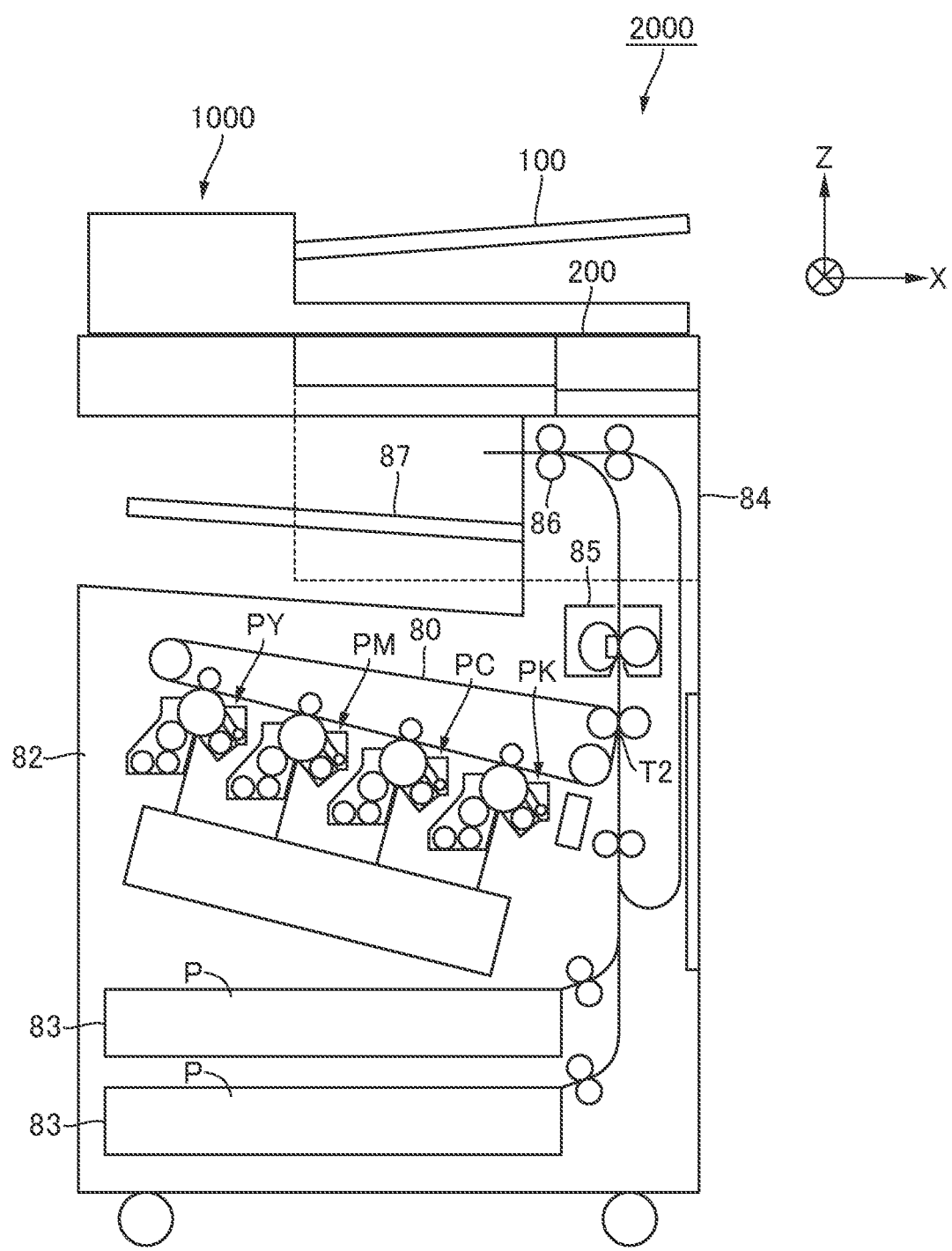
FIG. 3 is a cross-sectional view of an image forming apparatus according to the first embodiment.

FIG. 3 is a cross-sectional view of an image forming apparatus 2000 equipped with the image reading apparatus 1000 of the first embodiment. As illustrated in FIG. 3, the image forming apparatus 2000 is a tandem-type full-color multifunction machine in which four image forming units PY, PM, PC, and PK are arranged along an intermediate transfer belt 80.

The image forming apparatus 2000 forms a toner image on a recording material P according to an image data read by the image reading apparatus 1000 or image signals from a host device such as a personal computer connected in a communicatable manner with the image forming apparatus 2000. The recording material P can be paper, plastic films, or sheet materials such as cloth, which are hereinafter referred to as sheets.

In an apparatus body 82 of the image forming apparatus 2000, a yellow toner image is formed at the image forming unit PY and the yellow toner image being formed is primarily transferred to the intermediate transfer belt 80. A magenta toner image is formed at the image forming unit PM and the magenta toner image being formed is primarily transferred to be superposed on the yellow toner image already transferred to the intermediate transfer belt 80. A cyan toner image is formed at the image forming unit PC and the cyan toner image being formed is primarily transferred to be superposed on the yellow and magenta toner images already transferred to the intermediate transfer belt 80. A black toner image is formed at the image forming unit PK and the black toner image being formed is primarily transferred to be superposed on the yellow, magenta, and cyan toner images already transferred to the intermediate transfer belt 80.

A sheet feed cassette 83 is arranged drawably to the front side at a lower part of the apparatus body 82. The image forming apparatus 2000 conveys the recording material P stored in the sheet feed cassette 83 via a pickup roller, a conveyance roller, and a registration roller to a secondary transfer nip portion where the intermediate transfer belt 80 and a secondary transfer portion T2 contact each other. During conveyance of the recording material P, the image forming apparatus 2000 conveys the recording material P at a synchronized timing with the toner image on the intermediate transfer belt 80. The multilayer toner image on the intermediate transfer belt 80 is transferred to the recording material P at the secondary transfer nip portion by the operation of a secondary transfer bias voltage applied to the secondary transfer portion T2.

The recording material P to which the toner image is secondarily transferred at the secondary transfer portion T2 has the toner image fixed by being heated and pressed at a fixing unit 85 arranged at a vertical path portion 84, and after the toner image is fixed to the front surface, the recording material P is discharged by a sheet discharge roller 86 to a sheet discharge tray 87. A conveyance mechanism of the recording material P including the sheet discharge roller 86, various sensors, and fans are arranged in the vertical path portion 84, and the path portion is covered by a vertical path portion cover 88.

The sheet discharge tray 87 is arranged between the apparatus body 82 and the image reading apparatus 1000 positioned above the apparatus body 82 and supports the recording material P to which an image has been formed in the image forming apparatus 2000 removably from the front side of the apparatus body 82.

Control Block

Figure 4:
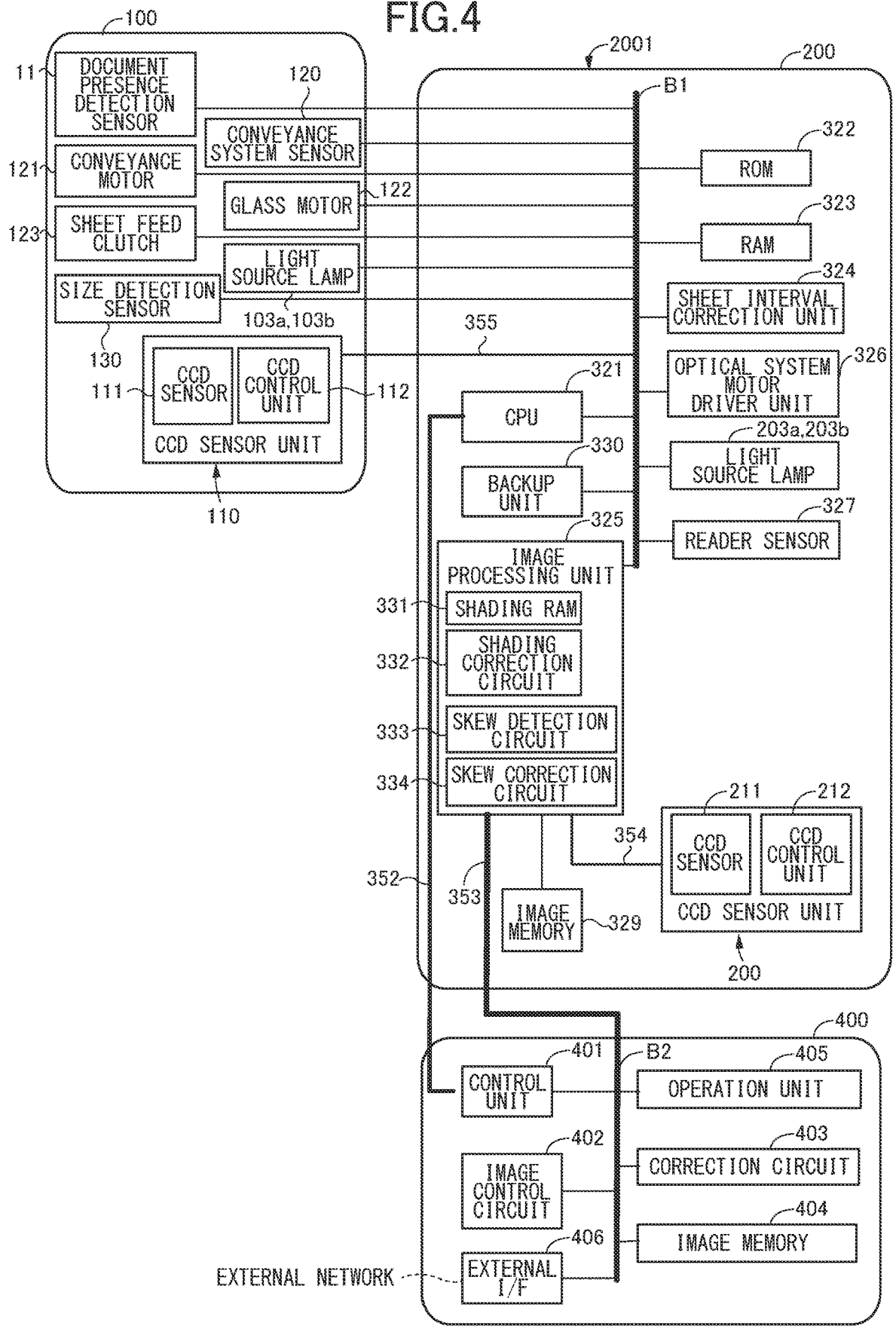
FIG. 4 is a control block diagram of an image reading apparatus according to the first embodiment.

FIG. 4 is a control block diagram for controlling the operation of the image reading apparatus 1000. As illustrated in FIG. 4, a control system of the image reading apparatus 1000 includes a reader controller 2001 provided on the reader 200 to control the operation of the ADF 100 and the reader 200, and a controller unit 400. In the first embodiment, the image reading apparatus 1000 adopts a configuration in which a CPU (Central Processing Unit) is not provided within the control bock of the ADF 100 and in which the CPU 321 of the reader 200 controls the reader 200 and the ADF 100. The CPU 321 constitutes a control unit according to the first embodiment.

The controller unit 400 can be provided on the reader 200, but for example, if the image reading apparatus 1000 is assembled with the image forming apparatus 2000 to constitute a copying machine, the controller unit 400 can be provided on the image forming apparatus 2000.

The reader controller 2001 includes the CPU 321, a ROM (Read Only Memory) 322 and a RAM (Random Access Memory) 323. The CPU 321 controls the operations of the ADF 100 and the reader 200 by executing a computer program stored in the ROM 322 which serves as a program storing ROM. The RAM 323 which is a work RAM provides work areas when the CPU 321 executes various programs. The CPU 321, the ROM 322, and the RAM 323 are mutually connected in a communicatable manner via a bus line B1.

The CPU 321 controls document conveyance in the ADF 100 via an output port and an input port connected to the ADF 100 according to a control program stored in the ROM 322. The conveyance motor 121 that drives the various rollers for conveyance and a glass motor 122 for moving the rear surface document feeding-reading glass 101 are connected to the output port. Further, the sheet feed clutch 123 for connecting the roller of the sheet feeding unit to the driving force from the conveyance motor 121 and the light source lamps 103a and 103b for irradiating the rear surface of the document are also connected to the output port.

The document presence detection sensor 11, conveyance system sensors 120 including a post-separation sensor 12, the draw-out sensor 13, the registration sensor 14, the read sensor 15 and the sheet discharge sensor 16, and a size detection sensor 130 including the document length sensors 17 and 18 are connected to the input port. Further, the CCD sensor unit 110 is also connected to the input port. The CCD sensor unit 110 includes the CCD sensor 111, and a CCD control unit 112 for driving the CCD sensor 111.

A sheet interval correction unit 324, an optical system motor driver unit 326, the light source lamps 203a and 203b, a reader sensor 327, a backup unit 330, an image processing unit 325, and the CCD sensor unit 110 are connected to a bus line B1.

The CCD sensor unit 110 includes the CCD sensor 111 serving as a light receiving sensor, and the CCD control unit 112 serving as a control unit of the CCD sensor 111. The CCD control unit 112 controls the CCD sensor 111. The CCD sensor 111 converts the reflected light into image data and transmits the image data by the control of the CCD control unit 112 via an image data communication line 355 and the bus line B1 to the image processing unit 325.

The backup unit 330 can perform backup of a part of work data used for control and setting values if settings are determined per apparatus. The optical system motor driver unit 326 is a driver circuit for driving an optical system driving motor. The light source lamps 203a and 203b are each composed of LEDs, which are lit by the control of the CPU 321 and irradiates light to the document. The reflected light of the light irradiated on the document is received by the CCD sensor 211 and converted to image data.

The sheet interval correction unit 324 performs correction, i.e., sheet interval correction, of distance, i.e., interval between sheets, from a trailing edge of a preceding document and a leading edge of a succeeding document of the succeeding document. The reader sensor 327 includes a pressure board open/close detection sensor that detects opening and closing of the ADF 100 with respect to the reader 200 and a pressure board size detection sensor for detecting the length of the document placed on the platen glass 209. The image processing unit 325 includes, in the inner side thereof, a shading RAM 331, a shading correction circuit 332, a skew detection circuit 333, and a skew correction circuit 334. Further, the CCD sensor unit 210 is connected to the image processing unit 325.

The CPU 321 executes a read processing for reading the image on the first surface of the document by controlling the optical system motor driver unit 326 and controlling the CCD sensor unit 210 via the image processing unit 325. The CCD sensor unit 210 is used not only to read the image on the first surface, i.e., front surface, of the document supported on the ADF 100 but also to read the image on the document placed on the platen glass 209.

The CCD sensor unit 210 includes the CCD sensor 211 serving as a light receiving sensor, and a CCD control unit 212 serving as a control unit of the CCD sensor 211. The CCD control unit 212 controls the CCD sensor 211. The CCD sensor 211 converts the reflected light into image data, and by the control of the CCD control unit 212, transmits the image data via an image data communication line 354 to the image processing unit 325.

The image signal formed on the CCD sensor unit 210 is converted into digital image data and transferred via the image data communication line 354 to the image processing unit 325. The image processing unit 325 executes various image processing, such as a shading processing, detection and correction of dust image such as striped image on the image data, and detection and correction of amount of inclination of the document. The image processing unit 325 executes the various image processing by using an image memory 329 as work area.

The image data processed by the image processing unit 325 is sequentially transmitted via a controller interface image communication line 353 including an image transferring clock signal line to the controller unit 400. Further, the signal serving as a reference of the leading edge of the document image data is controlled of its timing by the CPU 321 and notified via a controller interface control communication line 352 to the controller unit 400.

The CPU 321 monitors the various sensors arranged along the conveyance path 32 periodically in the feeding and conveyance operation of the document from the ADF 100. The CPU 321 performs conveyance control of the document by controlling the conveyance motor 121 and the sheet feed clutch 123 according to the detection timing of the document by the various sensors. Further, the CPU 321 determines that jamming has occurred as an abnormality of document conveyance if the detection signals of the various sensors maintain the state of document presence or document absence continuously for a predetermined length of time or longer.

The CPU 321 realizes reading of document image by synchronizing the conveyance control of the document in the ADF 100 and the image read processing performed at the CCD sensor unit 210 and the CCD sensor unit 110. The CPU 321 moves the document feeding-reading glass 101 to the read area by a glass motor 122 and lights the light source lamps 103a and 103b when reading images from a document by the CCD sensor unit 110.

The controller unit 400 is an apparatus that controls the entire image reading system including the reader 200 and the ADF 100. In the controller unit 400, a control unit 401, an image control circuit 402 for carrying out magnification or rotation of image, a correction circuit 403, an image memory unit 404, an operation unit 405, and an external I/F 406 are connected via a bus line B2.

The digital image being transmitted to the controller unit 400 via the image processing unit 325 is subjected to image control such as magnification or rotation by the image control circuit 402 before being transmitted to the correction circuit 403. Then, the correction circuit 403 carries out correction processing such as correction of color to the image signal and writes the data into the image memory unit 404. By carrying out the above-mentioned processing to the image data of the image area of the document, the document read image is generated.

The operation unit 405 is a user interface having an input interface and an output interface. The input interface of the operation unit 405 includes various key buttons and touch panels, and the output interface includes displays and speakers. The operation unit 405 carries out an image read operation instruction from the user to the entire system, displays the read image, and communicates with the control unit 401 to execute display and input operations requested by the user. The user can enter instructions related to reading image or various settings for reading image using the input interface of the operation unit 405 and confirm various inputs on a screen by the output interface.

The external I/F 406 is an interface for connecting with an external network and transmitting the document image read by receiving a document read request from a computer connected to the network to the control unit 401. Further, the external I/F 406 is an interface for realizing a function of transmitting the document image obtained by executing the document reading operation from the operation unit 405 to the computer connected to the network. Further, the connection destination is equipped with not only a wired LAN but also a wireless communication unit for communicating with portable terminals such as smartphones, and the present configuration enables to relay the communicated information between portable terminals and computers connected to the network.

Image Read Processing of Pressure Board Configuration

Figure 5:
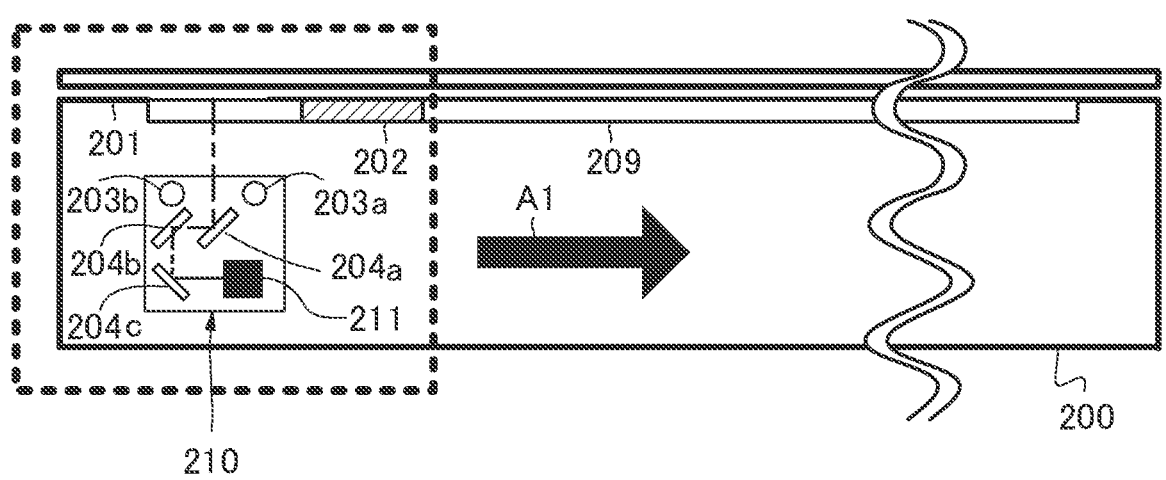
FIG. 5 is a view illustrating an image read processing by a reader of a pressure board configuration according to the first embodiment.

FIG. 5 is an explanatory view of an image read processing by the reader 200 in the pressure board configuration. As illustrated in FIG. 5, the reader 200 scans the document on the platen glass 209 in a sub-scanning direction shown by arrow A1 of FIG. 5 by an optical system equipped with the CCD sensor unit 210 including the light source lamps 203a and 203b and reflecting mirrors 204a, 204b, and 204c. Thereby, the reader 200 optically reads the image information recorded on the document. Then, the read image information is subjected to photoelectric conversion and transferred as image data to the controller unit 400 illustrated in FIG. 4.

The shading white board 202 is a white board for creating a reference data of a white level by shading. In the reader 200, shading control is executed by moving the CCD sensor unit 210 to an area directly below the shading white board 202 and reading the shading white board 202 immediately after starting the reading job.

Shading Control

The shading white boards 202 and 102 are each a white board for creating a reference data of a white level by shading. Shading control is performed before reading a document. In shading control, the shading white board 202 is read by the CCD sensor unit 210 and the shading white board 102 is read by the CCD sensor unit 110. The CPU 321 creates reference data for each of a front surface and a rear surface used for shading correction based on respective read results.

Figure 6:
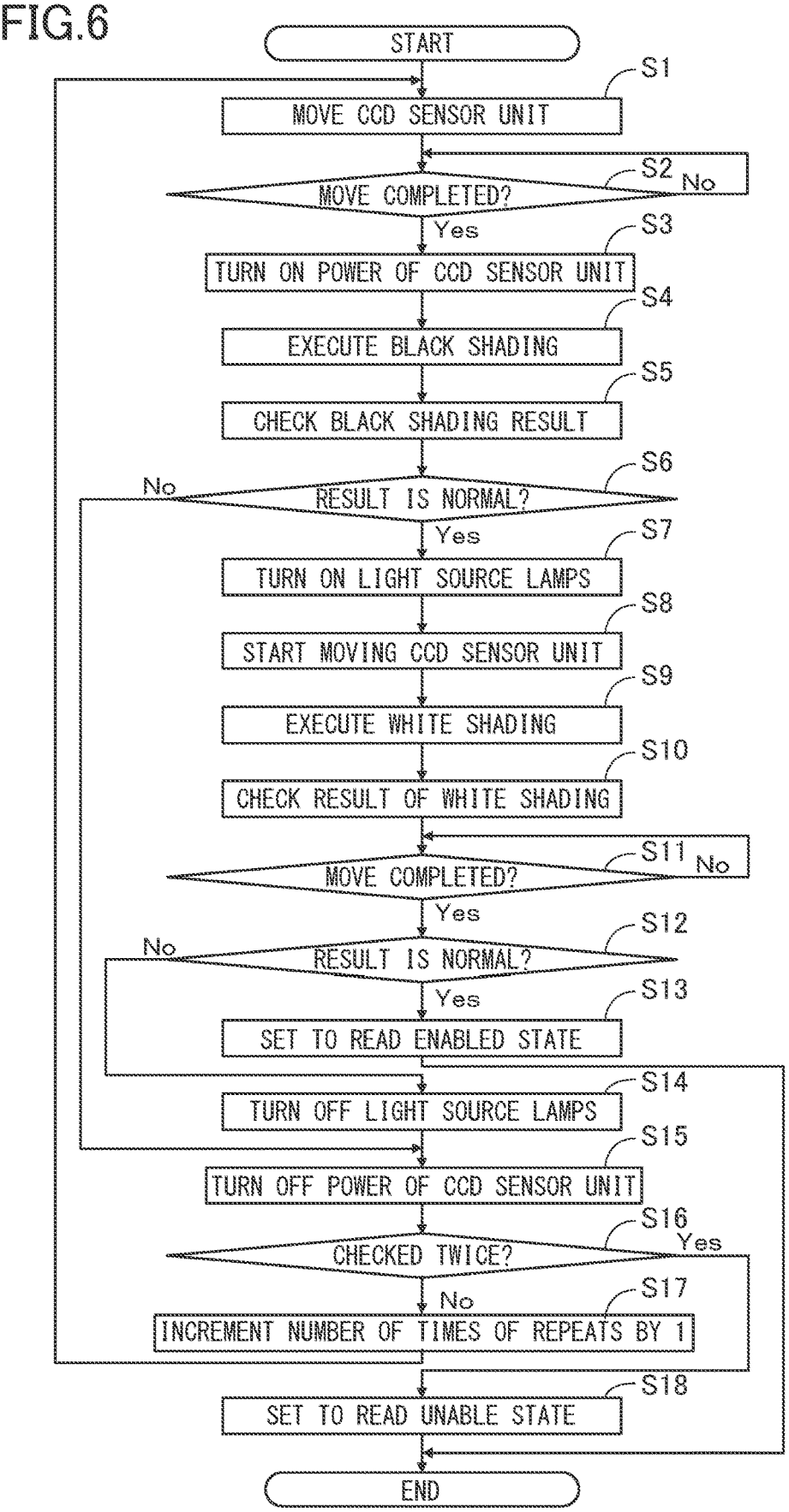
FIG. 6 is a flowchart illustrating a shading control according to the first embodiment.

FIG. 6 is a flowchart illustrating a control processing executed by the CPU 321 in shading control. In shading control, at first, the CPU 321 moves the CCD sensor unit 210 to an area immediately below the shading white board 202 (S1). Next, the CPU 321 determines whether movement of the CCD sensor unit 210 has been completed (S2), and if the movement is not completed (No), repeats the processing of step S2 until the movement is completed.

In the processing of step S2, if it is determined that the movement has been completed (Yes), the CPU 321 turns on the power of the CCD sensor unit 210 (S3). In this processing, the CPU 321 enables the CCD sensor 211 to perform a read operation by turning on the power of the CCD sensor unit 210. Next, the CPU 321 executes black shading (S4). In this processing, the CPU 321 performs reading of the shading white board 202 in a state where the light source lamps 203a and 203b are not lit and acquires a black level as black shading.

Next, the CPU 321 checks the result of black shading (S5) and determines whether the result of black shading is normal (S6). Through these processes, the CPU 321 determines whether the black level has exceeded a first range to determine whether the result of black shading is normal.

In the processing of step S6, if it is determined that the result of black shading is normal (Yes), the CPU 321 lights the light source lamps 203a and 203b (S7). Next, the CPU 321 starts to move the CCD sensor unit 210 (S8). In this processing, the CPU 321 moves the optical system motor driver unit 326 and moves the CCD sensor unit 210 from directly below the shading white board 202 to directly below the first surface read position.

While moving the CCD sensor unit 210, the CPU 321 executes white shading (S9). In this processing, the CPU 321 reads the shading white board 202 as white shading and acquires the white level. Next, the CPU 321 checks the result of white shading (S10).

Next, the CPU 321 determines whether movement of the CCD sensor unit 210 that has been started in the processing of step S8 has been completed (S11), and if the movement has not been completed (No), repeats the processing of step S11 until the movement is completed.

In the processing of step S11, if it is determined that movement has been completed (Yes), the CPU 321 determines whether the result of white shading acquired in the processing of step S10 is normal (S12). In the processing of steps S10 and S12, the CPU 321 determines whether the result of white shading is normal by determining whether the white level has exceeded a second area. In the processing of step S12, if it is determined that the result of white shading is normal (Yes), the CPU 321 sets the status of the CCD sensor unit 210 to read enabled (S13). Then, the CPU 321 ends the shading control with the light source lamps 203a and 203b remaining lit.

Meanwhile, in the processing of step S12, if it is determined that the result of white shading is not normal (No), the CPU 321 turns off the light source lamps 203a and 203b to restart the processing from black shading (S14).

After executing the processing of step S14 or during the processing of step S6, if it is determined that the result of black shading is not normal (No), the CPU 321 turns off the power of the CCD sensor unit 210 (S15). Next, the CPU 321 determines whether the check is performed twice (S16). In this processing, the CPU 321 determines whether the number of times that the black level or the white level has been determined as not normal is twice.

The CPU 321 determines whether the check has been performed twice to avoid determining apparatus failure in a case where the CCD sensor unit 210 could not perform the read processing directly below the shading white board 202 due to some sudden trouble. Sudden trouble includes electric noise or the CCD sensor unit 210 getting caught during movement.

In the processing of step S16, if it is determined that the check has not been performed twice (No), the CPU 321 adds 1 to the number of counts of repeat, and returns the processing to step S1. Meanwhile, if it is determined that the check has been performed twice (Yes), the CPU 321 determines apparatus failure by performing the check twice to avoid repeating the processing for many times even if the apparatus is actually malfunctioning, and sets the status of the CCD sensor unit 210 to read unable state (S17). Then, the CPU 321 ends the shading control.

The flowchart illustrated in FIG. 6 shows the control related to shading of a reading of the first surface, i.e., front surface, of the document, but a similar flow is basically performed for reading the second surface, i.e., rear surface, of the document with some differences in configuration. The shading white board 102 is arranged on the document feeding-reading glass 101 configured to be moved by the glass motor 122. The CPU 321 enables reading of the shading white board 102 by moving the document feeding-reading glass 101 such that the shading white board 102 is positioned at an opposed surface of the CCD sensor unit 110. The CPU 321 determines whether a black level has been acquired normally by black shading and whether a white level has been acquired normally by white shading based on a reading brightness of the shading white board 102. After reading the shading white board 102, the CPU 321 moves the document feeding-reading glass 101 to the second surface read position and performs reading of image of the second surface of the document.

Skew Detection Control

The image reading apparatus 1000 starts reading of the image at a timing prior to the reaching of the document to the first surface read position on the document feeding-reading glass 201 for a predetermined distance based on the detection of a leading edge of the document by the read sensor 15. Thereby, missing of image can be prevented in the image reading apparatus 1000 even at the upper limit of permissible range of skewing during conveyance of the document by the ADF 100.

Figure 7A:
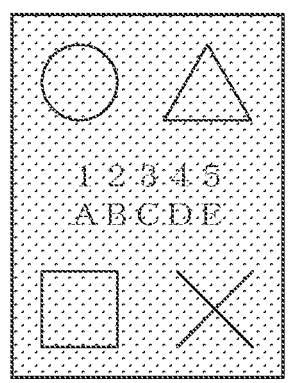
FIG. 7A is a view illustrating one example of a document according to the first embodiment.
Figure 7B:
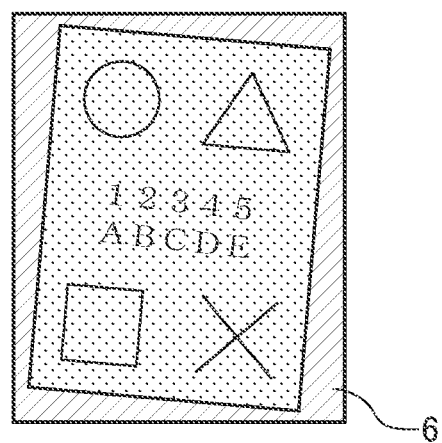
FIG. 7B is a view illustrating a read area of a CCD sensor unit.

FIG. 7A is a view illustrating one example of a document subjected to reading of image by the CCD sensor unit 210 of the image reading apparatus 1000, and FIG. 7B is a view illustrating one example of an image acquired by reading the document. As illustrated in FIG. 7B, not only the document but also the image obtained by reading the opposing member 6 as a background of the document is acquired in the image reading apparatus 1000.

Figure 8:
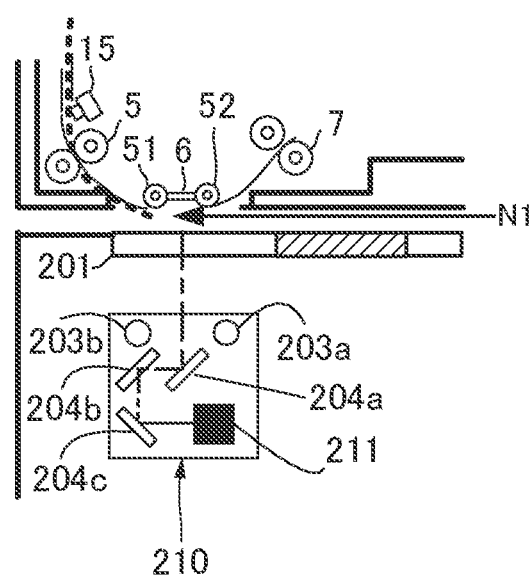
FIG. 8 is a view illustrating a position of a document at a timing at which reading of an image by the image reading apparatus is started according to the first embodiment.

The image processing unit 325 extracts the boundary between the document and the opposing member 6 by the skew detection circuit 333. The actual operation is described with reference to FIG. 8. FIG. 8 is a view illustrating the position of the document at a timing at which reading of image by the image reading apparatus 1000 is started. As illustrated in FIG. 8, in the image reading apparatus 1000, the leading edge of the document has reached the opposing member 6 at a timing at which the reading of image is started, but the leading edge of the document is not nipped, such that a shadow is formed at a gap N1 between the opposing member 6 and the document feeding-reading glass 201. The image processing unit 325 executes an edge extraction processing for the shadow generated at the gap N1 by the skew detection circuit 333, and detects a position, a width, and a skew angle of the document within the image being read.

Skew Correction Control

The image being read by the CCD sensor unit 210 is stored in the image memory 329 as an image with the document still skewed. When transmitting the image data to the controller unit 400, the image processing unit 325 extracts only the document portion by the skew correction circuit 334 and corrects skewing of the image data according to the results of the position, the width, and the skew angle of the document detected by the skew detection circuit 333.

Figures 9A, 9B:
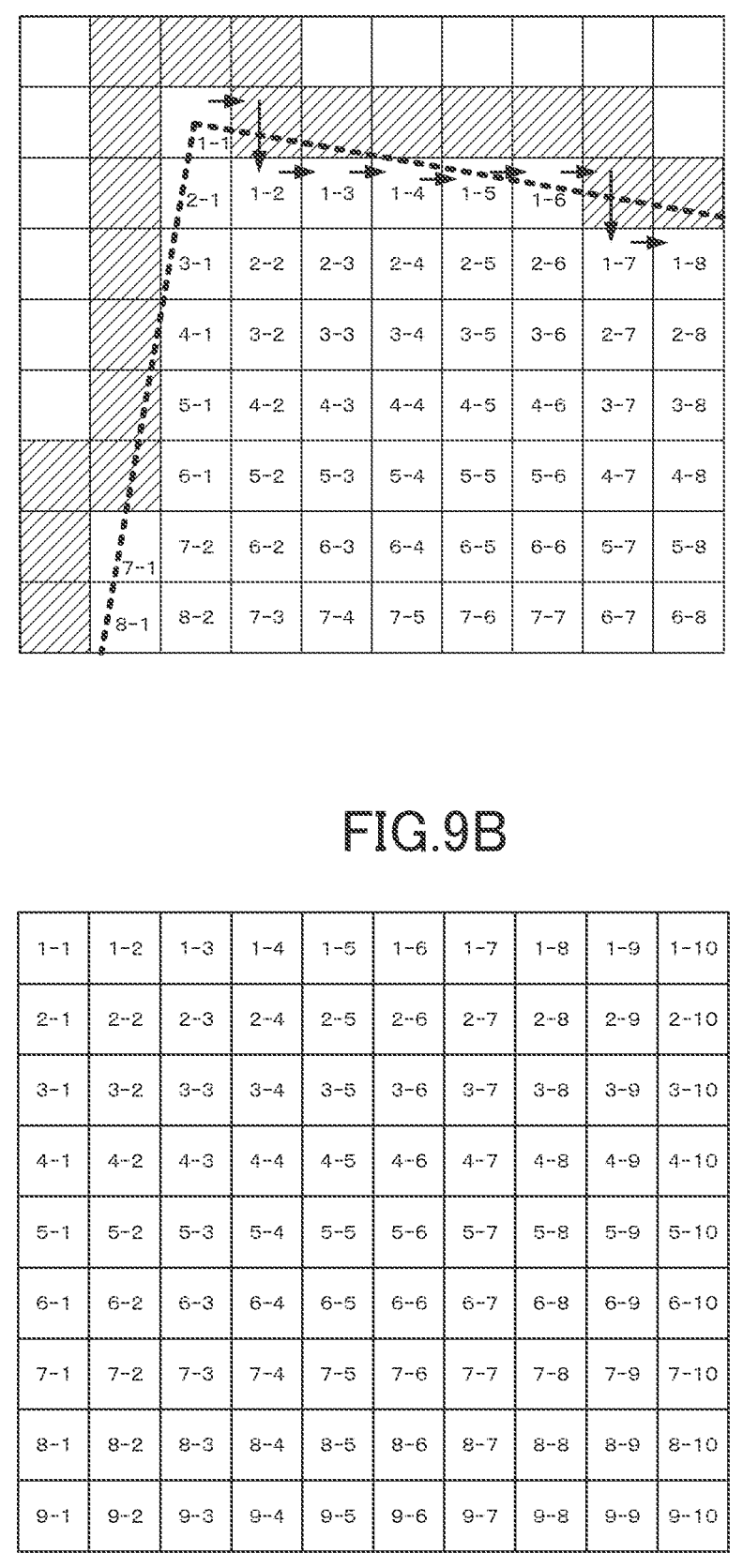

FIG. 9A is a view illustrating an image being read by the CCD sensor unit 210, and FIG. 9B is a view illustrating the image data to which skew correction control has been executed. As described above, in the image reading apparatus 1000, since the document width and the skew angle are detected during skew detection control, skew correction control is performed by controlling the order of transmission of each pixel data when transmitting the image data of the document to the controller unit 400.

One square shaped area illustrated in FIG. 9A represents one pixel. The image processing unit 325 determines, based on the result of detection of shadow of the edge portion of the document in the image illustrated by the dotted line in FIG. 9A, that the edge portion of the document in pixel units corresponds to an inner side of oblique lined areas illustrated in FIG. 9A. A rectangular area surrounded by four corners of the document, which are an intersection of the leading edge of the document and a left edge of the document, an intersection of the leading edge of the document and a right edge of the document, an intersection of the trailing edge of the document and the left edge of the document, and an intersection of the trailing edge of the document and the right edge of the document, is treated as an image present in an effective area of the document.

The line extending between the intersection of the leading edge of the document and the left edge of the document and the intersection of the leading edge of the document and the right edge of the document corresponds to the leading edge of the document. When transmitting image data to the controller unit 400, at first, the image processing unit 325 transmits a Vsync signal which is a sub-scanning reference signal that indicates a head of one page, and further transmits an Hsync signal which is a signal that indicates a head of the main scanning direction. Thereafter, the image processing unit 325 transmits image data one pixel at a time in order of each line from the ledge edge of the document.

After transmission of image corresponding to one line at the head is completed, the image processing unit 325 transmits the Hsync signal again, and thereafter, transfers the image corresponding to the next line. Each of the areas 1-1, 1-2, 1-3, . . . in FIG. 9A correspond to one pixel to be transmitted to the controller unit 400. In the illustrated example, area m-n, wherein m and n are each an integer, denotes an nth pixel from the left edge on an mth line from the head. In the example illustrated in FIG. 9A, after sending pixel 1-1, since the pixel on the right of 1-1 is either a shadow or already transmitted, the pixel directly below 1-1 is transmitted as pixel 1-2 to the controller unit 400. Since the pixel on the right of 1-2 is not a shadow and not yet transmitted, the right pixel is transmitted as it is as pixel 1-3 after pixel 102.

The controller unit 400 can reproduce the image on the original document as illustrated in FIG. 9B by arranging the transmitted pixels in lines in the order in which they were transmitted. As described, the image reading apparatus 1000 can correct skewing by controlling the order in which the image data stored in the image memory 329 is transmitted to the controller unit 400.

Figure 10:
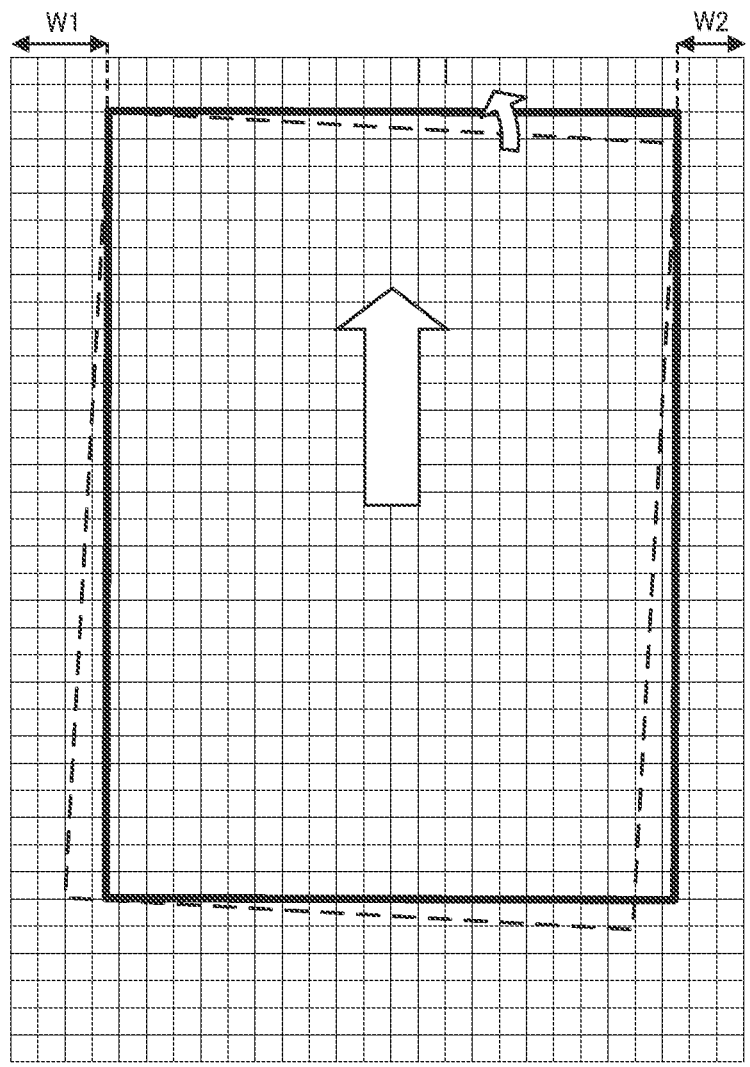
FIG. 10 is a view illustrating a position of a document image prior to skew correction and a position of a document image after skew correction according to the first embodiment.

FIG. 10 is a view illustrating a position of a document image prior to skew correction and a position of a document image after skew correction. In FIG. 10, the position of the document image prior to skew correction is illustrated by dotted lines and the position of the document image after skew correction is illustrated by solid lines. In the image reading apparatus 1000, the position of the document during reading of the document can be computed based on the intersection of the leading edge of the document and the left edge of the document in the main scanning direction and the intersection of the leading edge of the document and the right edge of the document in the main scanning direction with respect to the position of the leading edge of the document in the document image after skew correction. In the example illustrated in FIG. 10, the conveyance direction of the document is the up-down direction in the drawing, such that the main operation direction corresponds to the right-left direction in the drawing and the upper side of the drawing corresponds to the leading edge of the document in the conveyance direction, and the distance from the edge portion of the area in which the actual reading of image has been performed can be acquired by the image processing unit 325.

As described above, the reading of image by the CCD sensor unit 210 is performed across the entire width in the main operation direction, such that missing of document image will not occur in the main operation direction even if the document is skewed.

Further, the image reading apparatus 1000 is capable of computing the document width from a width of an image of an assumed maximum size that has been read across the entire width in the main operation direction. The image reading apparatus 1000 computes the width of the document by subtracting a distance W1 from a left edge of the assumed maximum size to a left edge of the leading edge of the document and a distance W2 from a right edge of the assumed maximum size to a right edge of the leading edge of the document.

Conveyance Stop Control

In the image reading apparatus 1000, even if a document is conveyed to a document reading area prior to completing the shading control, image cannot be read. The image reading apparatus 1000 will not convey the document to the document reading area before the shading control is completed prior to reading the image on the first document among the bundle of documents S supported on the document tray 30. The image reading apparatus 1000 causes the first document to standby at a predetermined position on the conveyance path and conveys the same to the document reading area after the shading control is completed.

In the image reading apparatus 1000, as for the second and subsequent documents, since the shading control is already completed, conveyance of the document will not be stopped due to the shading control not being completed, but conveyance may be stopped by other reasons. In the image reading apparatus 1000, for example, even in a case where the image data of the document cannot be received by the controller unit 400 due to other processing being performed, it may be necessary to temporarily stop the conveyance of the document prior to reading a document among the plurality of documents being conveyed.

Figure 11:
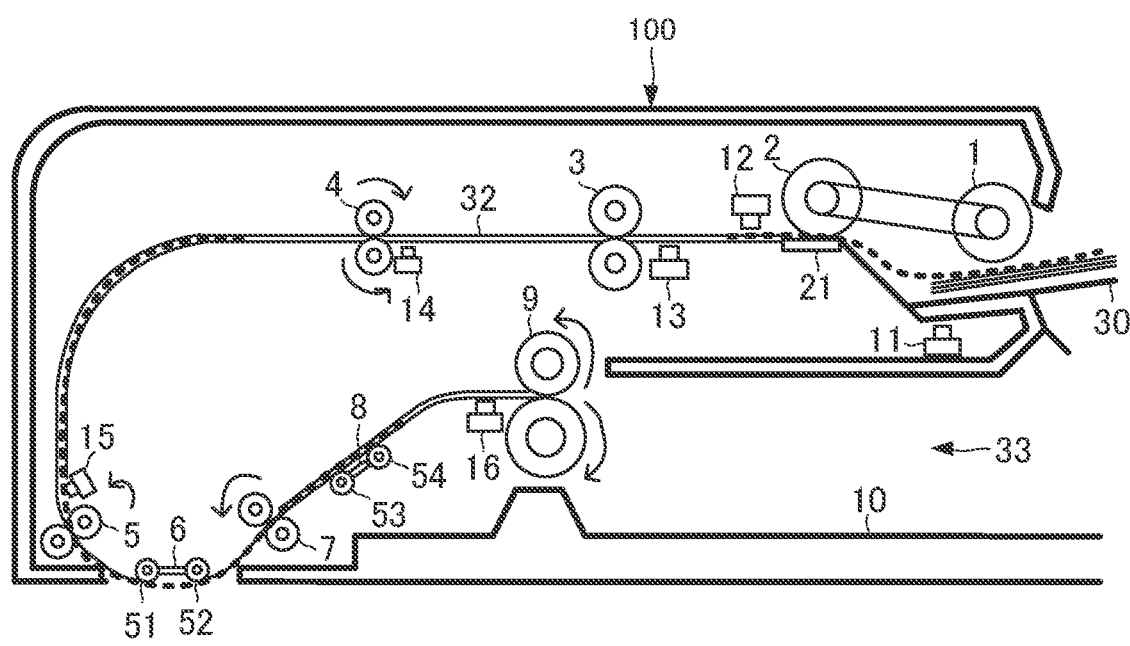
FIG. 11 is a view illustrating a position of a document within a conveyance path in a case where document conveyance is stopped before the document reaches a drawing roller according to the first embodiment.

FIG. 11 is a view illustrating a position of a document within the conveyance path 32 in a case where the conveyance of a document is stopped before the document reaches the drawing roller 3. As described above, the driving force of the conveyance motor 121 (refer to FIG. 5) will not be transmitted to the pickup roller 1 and the separation roller 2 by the sheet feed clutch 123 (refer to FIG. 5) being turned off. Therefore, the ADF 100 can stop the conveyance of the document that has not reached the drawing roller 3 by having the sheet feed clutch 123 turned off in the state illustrated in FIG. 11.

In the ADF 100, until it is determined that a new document can be read, the sheet feed clutch 123 is controlled to be maintained in an off state such that the leading edge of the document that has not reached the drawing roller 3 is stopped between the separation roller 2 and the drawing roller 3. In the ADF 100, if it is determined that a new document can be read, the sheet feed clutch 123 is controlled to an on state and the conveyance of the document toward a downstream side of the drawing roller 3 in the conveyance direction is resumed. In the ADF 100, the sheet feed clutch 123 is turned to the off state at a point of time when a predetermined time has elapsed after the leading edge of the document has reached the drawing roller 3, and thereafter, the document is conveyed by rollers such as the drawing roller 3, the conveyance roller 4, and the lead roller 5, such that reading of image is performed.

Conveyance Control of Document Having Short Length

As described, the ADF 100 enables a document having a minimum width of 48 mm to be placed on the document tray 30. In general, the length in the conveyance direction is also often short in a document having a narrow width size, such as a business card size. In the ADF 100, in a case of a document having a short length in the conveyance direction, the trailing edge of the document may pass through the pickup roller 1 before the leading edge of the document reaches the drawing roller 3 and the sheet feed clutch 123 is turned off.

Figure 12:
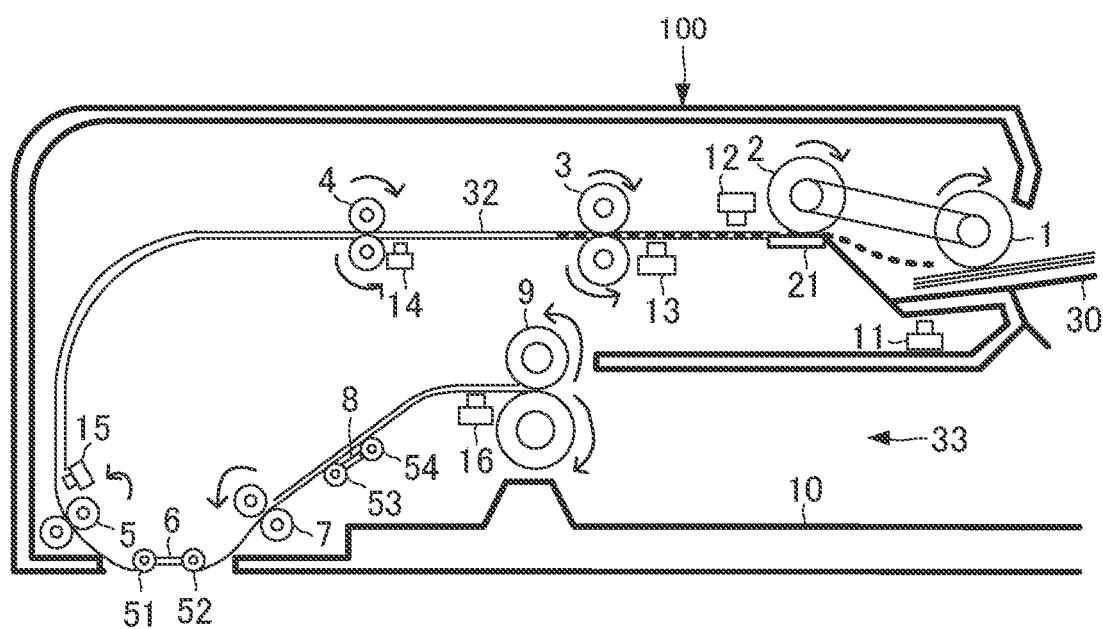
FIG. 12 is a view illustrating a state in which a trailing edge of a document has passed through a pickup roller when a sheet feed clutch is controlled to an off state and at a timing immediately before conveyance of the document by the drawing roller is started according to the first embodiment.

FIG. 12 is a view illustrating a state in which the trailing edge of the document has passed through the pickup roller 1 when the sheet feed clutch 123 is controlled to an off state and at a timing immediately before the conveyance of the document by the drawing roller 3 is started. In the ADF 100, when conveying a document having a length so short that the trailing edge of the document will pass through the pickup roller 1 before the leading edge of the document reaches the drawing roller 3 and the sheet feed clutch 123 is turned off, it is necessary to prevent the feeding of a document standing by to be fed on the document tray 30. In such a case, in order to prevent the document standing by to be fed on the document tray 30 from being fed, the ADF 100 sets the sheet feeding speed to a speed capable of having conveyance of the document standing by to be fed stopped by the separation pad 21, i.e., stoppable speed.

In the ADF 100, in order to reduce the sheet feeding speed to the stoppable speed, the rotational speed of the conveyance motor 121 must be slowed. Therefore, in the ADF 100, when continuously reading documents placed on the document tray 30 in a state where the documents are conveyed by the stoppable speed, the document reading speed at the CCD sensor unit 210 and the CCD sensor unit 110 is also slowed.

Regarding the document length in the conveyance direction, the ADF 100 is configured to allow passing of a sheet as large as an A3 size (420 mm), regardless of the document width. However, in the ADF 100, if the document is long and narrow, the placing of the document on the document tray 30 becomes difficult, and as a result, the stackability on the sheet discharge tray 10 tends to be deteriorated.

Bill Reading Mode

A computer connected via a network to the image reading apparatus 1000 has an application for job workflow installed, and the image reading apparatus 1000 is set as an input unit for billing information of the application. The input method of the billing information can be selected between paper bills placed on the platen glass 209 or the document tray 30 of the ADF and digital information in a portable information terminal such as a smartphone connected wirelessly to the external I/F 406.

Figure 13:
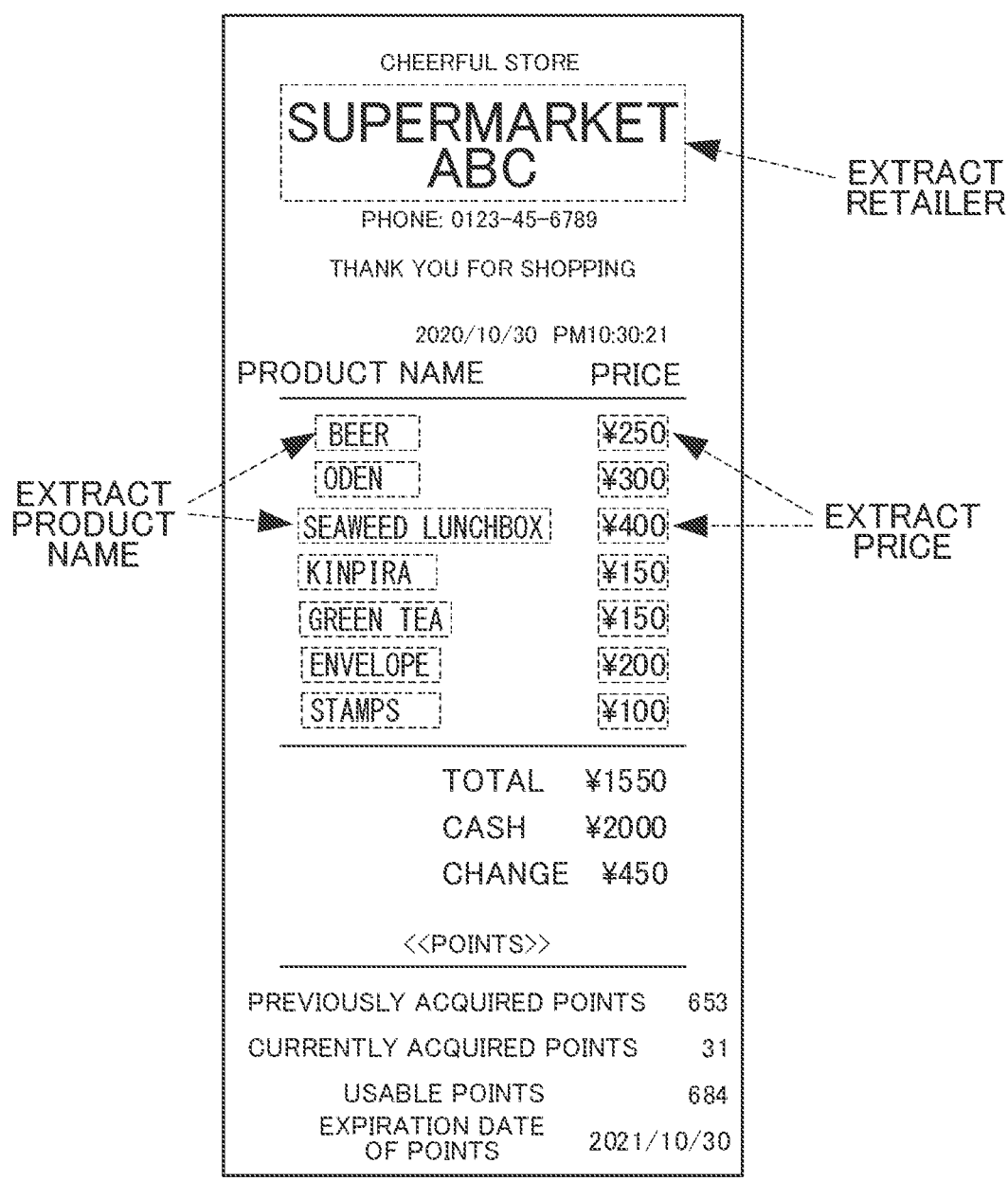
FIG. 13 is a view illustrating one example of a paper bill placed on a platen glass or on a document tray of the ADF according to the first embodiment.

FIG. 13 is a view illustrating one example of a paper bill placed on the platen glass 209 or on the document tray 30 of the ADF 100. Paper bills are first taken in as digital image data by the image reading apparatus 1000. Thereafter, the application installed in the computer side extracts retailer, product name, and total amount by a known OCR technique for extracting characters from images of predetermined areas in the image data. Then, the data is stored in a predetermined database and automatically classified into subjects such as product name and expenses, and application of expenses is carried out based on the data.

Limitation of Number of Continuously Dischargeable Sheets

Documents such as paper bills described above generally have a length in the conveyance direction longer than the length in a width direction orthogonal to the conveyance direction, and they tend to have a low stackability on the sheet discharge tray 10. Specifically, documents like receipts that are issued when a product is purchased as illustrated in FIG. 13 are generally folded and kept in wallets instead of being immediately placed on the document tray 30 of the ADF 100.

Figure 14:
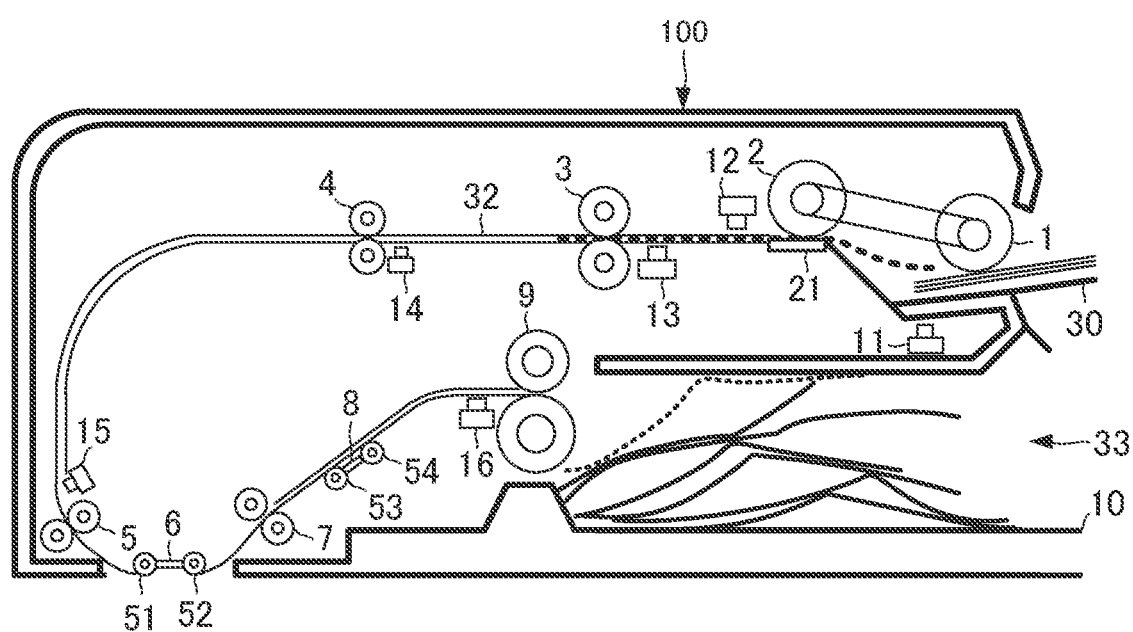
FIG. 14 is a view illustrating a state in which a plurality of receipts having folded lines by being folded are conveyed in the ADF according to the first embodiment.

FIG. 14 is a view illustrating a case in which a plurality of receipts having folded lines by being folded are conveyed in the ADF 100. As illustrated in FIG. 14, when a plurality of receipts being folded and still having folded lines are conveyed in the ADF 100, the stacking height of the receipts may become extremely high by having receipts with folded lines at various positions. In such a case, in the ADF 100, even at a point of time when a number of receipts smaller than the number of sheets stackable on the sheet discharge tray 10 is discharged, the receipts may be piled up to reach an upper side of a sheet discharge unit 33 that opposes the sheet discharge tray 10.

If a new receipt is discharged in a state where the receipts have been piled up to reach the upper side of the sheet discharge unit 33 as illustrated in the receipts illustrated by the dotted line in FIG. 14, the leading edge of the receipt being discharged may contact other receipts or the upper side of the sheet discharge tray 10 and may be curved greatly in the ADF 100. If the leading edge of the receipt being discharged is curved greatly, there may be a case where the order in which the receipts are stacked is changed or the receipt is not discharged properly such that the trailing edge of the receipt cannot go through the sheet discharge roller 9 and may be determined as sheet jam.

The image reading apparatus 1000 according to the first embodiment adopts a configuration in which, in a state where a receipt read mode is designated as the reading job, a limitation is set to the number of loadable sheets on the sheet discharge tray 10 by setting a limitation to the number of continuously dischargeable sheets to be discharged on the sheet discharge tray 10.

The CPU 321 determines whether the number of sheets obtained by adding the number of documents that have already been discharged and the number of documents whose leading edges have reached a downstream side of the position of the drawing roller 3 has reached the number of continuously dischargeable sheets to the sheet discharge tray 10. If it is determined that the number has reached the number of continuously dischargeable sheets, the CPU 321 turns off the sheet feed clutch 123 to temporarily stop the feeding of the document placed on the document tray 30 and limits the number of loadable sheets on the sheet discharge tray 10 from increasing beyond the number of continuously dischargeable sheets. Then, the CPU 321 turns off the sheet feed clutch 123, and thereafter, stops the conveyance motor 121 at a point of time when the document being conveyed within the apparatus has been conveyed by the sheet discharge roller 9 to the sheet discharge tray 10.

The image reading apparatus 1000 adopts a configuration in which, in a state where the reading job has been interrupted by the number of sheets reaching the number of continuously dischargeable sheets, the documents supported on the sheet discharge tray 10 must be removed to resume the reading job.

Figure 15:
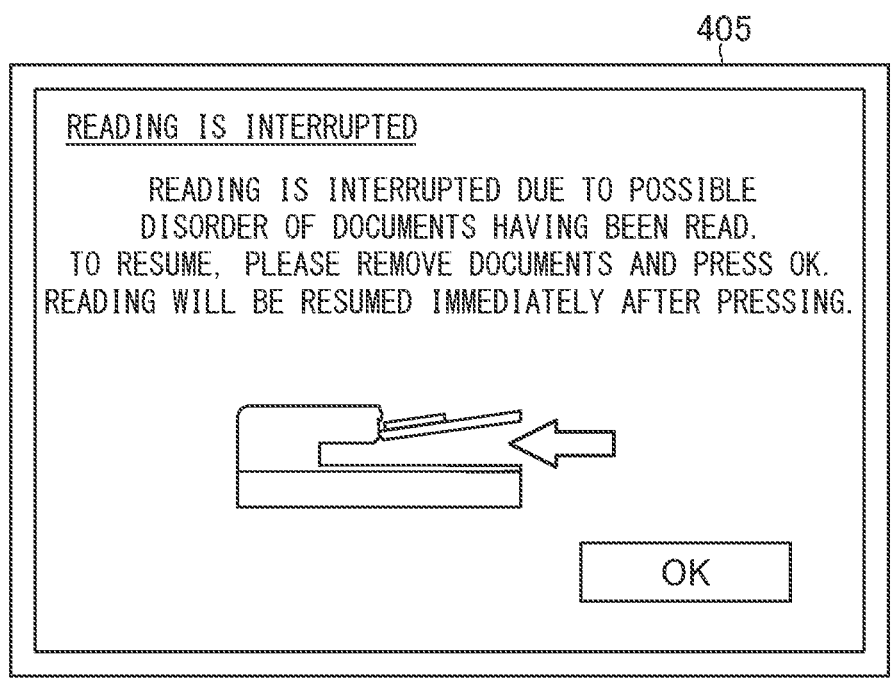
FIG. 15 is a view illustrating an example of an information displayed on an operation unit in a case where a reading job is interrupted by having reached a number of continuously dischargeable sheets according to the first embodiment.

FIG. 15 is a drawing illustrating one example of information displayed on the operation unit 405 in a state where the reading job has been interrupted by the number of sheets having reached the number of continuously dischargeable sheets. As illustrated in FIG. 15, information urging the user to remove the document that has been discharged onto the sheet discharge tray 10 is displayed on the operation unit 405. If the "OK" button illustrated in FIG. 15 is pressed, a request to resume reading is transmitted to the CPU 321. In a state where the documents discharge on the sheet discharge tray 10 have been removed by the user and the request to resume reading has been received, the CPU 321 starts rotating the conveyance motor 121 and then turns on the sheet feed clutch 123 to resume the reading job of documents standing by in the ADF 100.

In the image reading apparatus 1000, in a state where image is read from a plurality of receipts, it is difficult to perceive the shapes and folds of the respective receipts, and it is difficult to provide a full load detection sensor on the upper surface of the sheet discharge unit 33 to determine whether the load is full. Therefore, the image reading apparatus 1000 of the first embodiment adopts a configuration in which whether the sheet discharge tray 10 is in a full load state is determined by setting the number of continuously dischargeable sheets.

According to the image reading apparatus 1000 of the first embodiment, the number of continuously dischargeable sheets is set to 10 in advance as the number of sheets judged to cause no harm such as sheet jam or changing of order of stacking of documents based on experimental data, but it is configured to enable the environment of use of the user to be reflected.

Figure 16:
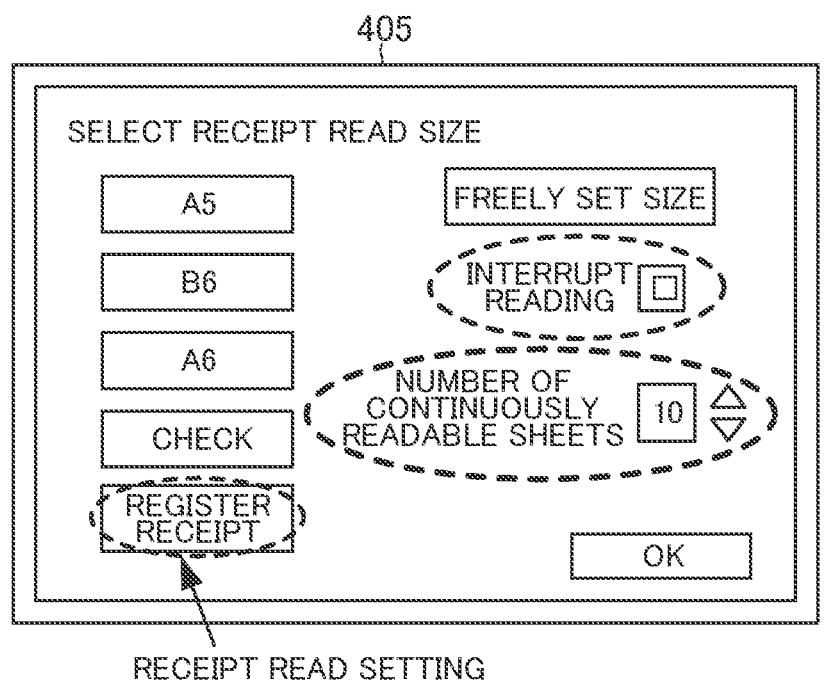
FIG. 16 is a view illustrating a selection screen of a read size of a document displayed on the operation unit according to the first embodiment.

FIG. 16 is a view illustrating a screen for selecting a read size of the document displayed on the operation unit 405. As illustrated in FIG. 16, on the read size select screen, a button for selecting the document size, an interrupt read checkbox for determining whether to interrupt read when documents are read continuously, and a button for setting the number of continuously dischargeable sheets are displayed. According to the image reading apparatus 1000, in a state where there is no checkmark on the interrupt read checkbox, the limitation of the number of continuously dischargeable sheets is canceled, and the number of continuously dischargeable sheets becomes non-settable in the operation unit 405. Further, according to the image reading apparatus 1000, in a state where there is a checkmark on the interrupt read checkbox, the button for setting the number of continuously dischargeable sheets can be operated to set the number of continuously dischargeable sheets to a number other than 10.

Control Flow During Reading of Document

According to the image reading apparatus 1000, multiple documents are conveyed simultaneously in the ADF 100 to execute a reading job in which a plurality of documents are read, and a control regarding a conveyance stop processing is executed as needed.

The CPU 321 is configured to execute the following control flow for each sheet of documents. If there are multiple documents, the number of control flows correspond to the number of documents [exist] existing, and the processing described in each control flow is processed by the CPU 321 in time division. Further, in a state where two control operations regarding the reading of images on both sides, such as double side reading, is performed, the processing of two control flows are executed in parallel and processed by the CPU 321 in time division.

Control of Entire Apparatus

Figure 17:
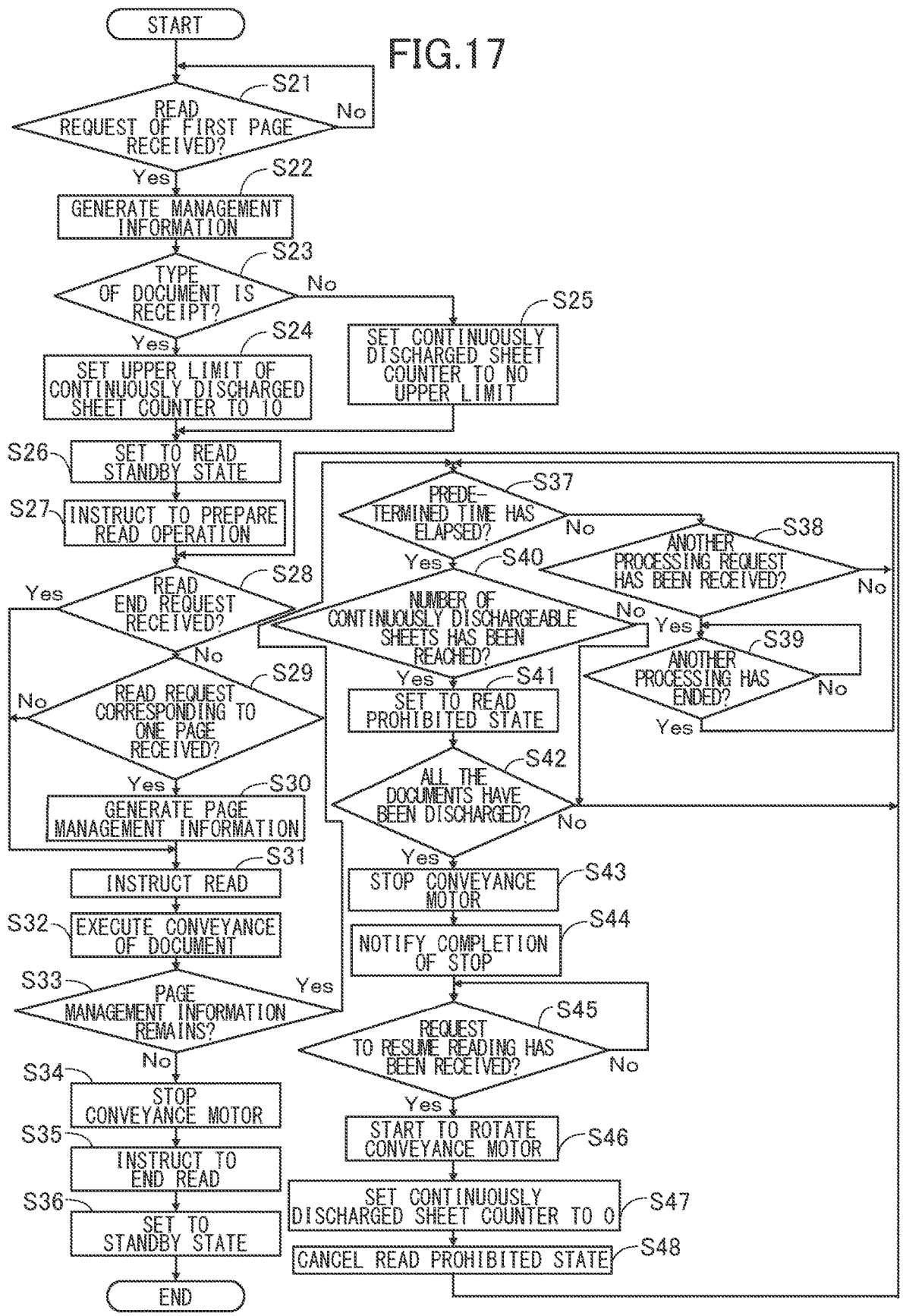
FIG. 17 is a flowchart illustrating a control processing of an entire image reading apparatus during reading of a document according to the first embodiment.

FIG. 17 is a flowchart illustrating a control processing of the entire image reading apparatus 1000 in reading documents. At first, the CPU 321 determines whether a read request of a first page of the bundle of documents S placed on the document tray 30 has been received from the controller unit 400 (S21). If a read request of a first page has not been received (No), the CPU 321 repeats the processing of step S21. When a read request of a first page is received (Yes), the CPU 321 generates a management information including an apparatus management information of the entire apparatus and a page management information for reading the first document in the RAM 323 (S22).

FIG. 18 is a view illustrating an apparatus management information. As illustrated in FIG. 18, the apparatus management information includes selection of color/monochrome, specification of read resolution of document designated by the controller unit 400, and a load position of the document serving as the read target, which is either on the platen glass 209 or the document tray 30. Further, the apparatus management information includes setting of various read modes regarding the type of document being read, such as normal/business card/receipt, and setting of read size mode for setting the method for determining the read size. The apparatus management information includes a continuously discharged sheet counter for executing interruption of the reading job based on the number of sheets being discharged, and a setting of the upper limit of the continuously discharged sheet counter. The read size mode includes a mode that uses the size specified by the operation unit 405 in advance to read the image, and a mode that uses the size detected automatically at a change timing of image and conveyance sensor during document conveyance to read the image.

FIG. 19 is a view illustrating a page management information. As illustrated in FIG. 19, the page management information includes information indicating a page number for identifying the document to be read, selection of color/monochrome, setting of various read modes as type of documents to be read, such as normal/business card/receipt, document size, and read state of document. The CPU 321 controls the reading and conveyance of the document while referring to the page management information.

After executing the processing of step S22, the CPU 321 determines whether the document type is a receipt (S23). In the processing, the CPU 321 determines whether a receipt is set as the read mode in the apparatus management information. In the processing of step S23, if it is determined that a receipt is set (Yes), the CPU 321 sets the upper limit of the continuously discharged sheet counter to 10 and stores the same in the apparatus management information (S24). Meanwhile, in the processing of step S23, if it is determined that the receipt is not set (No), the CPU 321 sets the upper limit of the continuously discharged sheet to no upper limit and stores the same in the apparatus management information (S25). In the processing of step S25, the CPU 321 sets a value greater than 1000 (9999 according to the first embodiment), which is the upper limit of the number of continuously readable sheets in the system, as the upper limit of the continuously discharged sheet counter to set the continuously discharged sheet counter to no upper limit.

Since the upper limit of the continuously discharged sheet counter is set to no upper limit, the image reading apparatus 1000 can continuously discharge documents exceeding the predetermined number of sheets when an upper limit is set, which is 10. The CPU 321 can also be configured to realize no upper limit of the continuously discharged sheet counter by performing, when the continuously discharged sheet counter is set to no upper limit, a control so as not to increment the continuously discharged sheet counter by 1 in a case where discharge of sheet is determined.

A receipt read mode of stopping the feeding of the document by the pickup roller 1 and the separation roller 2 in a state where the upper limit of the continuously discharged sheet counter is limited to 10, which is the determined number of sheets, regardless of the detection result of the document presence detection sensor 11 constitutes a first mode according to the first embodiment. Further, a read mode other than the receipt of continuing feeding of documents by the pickup roller 1 and the separation roller 2 regardless of the number of documents discharged continuously by the sheet discharge roller 9 constitutes a second mode according to the first embodiment. Further, a type that differs from the receipt as the type of document for which the second mode is set constitutes a second type. Further, regarding the type of the document that differs from the second type, the receipt which belongs to a document type whose stackability in a state supported on the sheet discharge tray 10 is lower than the document of the second type constitutes a first type.

Further, as described above, the image reading apparatus 1000 is configured to be able to cancel the limitation of the number of continuously dischargeable sheets if the checkmark on the interrupt read checkbox displayed on the operation unit 405 illustrated in FIG. 16 is deleted. If the request indicating that the checkmark on the interrupt read checkbox has been deleted is received from the controller unit 400 in a state where the receipt is set as the document type, the CPU 321 sets the upper limit of the continuously discharged sheet counter to no upper limit even in a case where the upper limit has already been set.

Thereby, in the image reading apparatus 1000, even if the document placed on the document tray 30 is a receipt, when the user wishes to have a number of documents exceeding the upper limit of the number of continuously dischargeable sheets discharged continuously, a number of documents exceeding the upper limit can be discharged continuously. In a state where the document placed on the document tray 30 is a receipt, the operation unit 405 that cancels the limitation of the determined number of sheets constitutes a cancel unit according to the first embodiment.

After executing the processing of step S24 or step S25, the CPU 321 sets the entire apparatus to a read standby state (S26). Next, the CPU 321 instructs the CCD sensor unit 210 to prepare for the read operation (S27), and thereafter, advances to the read processing per sheet of the documents. In the processing of step S27, the CPU 321 instructs the CCD sensor unit 210 to prepare for the read operation including the shading control mentioned above.

In the read processing per sheet of documents, at first, the CPU 321 determines whether a read end request has been received (S28). In the image reading apparatus 1000, if a user instructs discontinuation of document read operation from the operation unit 405, a document read end request is notified from the controller unit 400 to the CPU 321. Therefore, in a state where a page management information is remaining, the CPU 321 periodically confirms whether a read end request has been received.

In the processing of step S28, if it is determined that a read end request has not been received (No), the CPU 321 determines whether a read request corresponding to one page of a document has been received (S29). In this processing, the CPU 321 determines whether a read request of one sheet of document has been notified from the controller unit 400. In the processing of step S29, if it is determined that a read request corresponding to one page of a document has been received (Yes), the CPU 321 generates a page management information of the read page (S30).

After executing the processing of step S30, if it is determined that a read end request has been received in the processing of step S28 (Yes) or if it is determined that a read request for one page of the document has not been received in the processing of step S29 (No), the CPU 321 advances the processing to step S31. In the processing of step S31, the CPU 321 instructs the CCD sensor unit 210 to read the image according to the page management information. Next, the CPU 321 executes conveyance of the document according to the page management information (S32). In the processing of steps S31 and S32, if a page management information has been generated in the processing of step S30, the CPU 321 performs the processing according to the generated page management information. Meanwhile, if the processing of step S30 has been skipped, the CPU 321 performs the processing according to the already-generated page management information. The details of the processing of steps S31 and S32 will be described below.

Next, the CPU 321 determines whether a page management information remains (S33). In this processing, if it is determined that the page management information does not remain (No), the CPU 321 outputs a stop instruction to the conveyance motor 121 (S34) and instructs to end the read operation by the CCD sensor unit 210 (S35). Then, the CPU 321 sets the state notified to the controller unit 400 to a standby state (S36) and ends the series of document reading jobs.

In the processing of step S33, if it is determined that a page management information remains (Yes), the CPU 321 determines whether a predetermined time has elapsed (S37). In this processing, if it is determined that a predetermined time has not elapsed (No), the CPU 321 determines whether another processing request has been received (S38). In this processing, if it is determined that another processing request has not been received (No), the CPU 321 returns the processing to step S37. Meanwhile, if it is determined that another processing request has been received (Yes), the CPU 321 determines whether another processing has ended (S39). In this processing, if it is determined that another processing is not ended (No), the CPU 321 repeats the processing of step S39 until another processing is ended, and if it is determined that another processing has ended (Yes), the CPU 321 returns the processing to step S37. In the processing of steps S37 to S39, the CPU 321 monitors and executes the respective tasks that exist in time division processing, and every time a predetermined standby time included in each task elapses, the task to be executed is switched. In a state where all the other tasks are in the standby state, the CPU 321 repeats the processing of steps S37 and S38, and when a cycle for executing the processing of the entire apparatus arrives, it is determined in the processing of step S37 that a predetermined time has elapsed (Yes).

In the processing of step S37, if it is determined that a predetermined time has elapsed (Yes), the CPU 321 determines whether the number of continuously dischargeable sheets has been reached (S40). In the processing, the CPU 321 compares a current value of the continuously discharged sheet counter stored in the apparatus management information with an upper limit value of the continuously discharged sheet counter stored in the apparatus management information. As described in detail below, the CPU 321 is configured to read the image without stopping the conveyance of the document in a state where a leading edge of the next document scheduled to be subjected to reading passes a temporary stop position between the separation roller 2 and the drawing roller 3, hereinafter referred to as temporary stop position. Therefore, the CPU 321 is configured to increment the continuously discharged sheet counter by 1 at a timing at which the leading edge of the document passes the temporary stop position. In the image reading apparatus 1000, the number of sheets of the document having passed the temporary stop position is set as the value on the continuously discharged sheet counter.

In the processing of step S40, if it is determined that the number of continuously dischargeable sheets has not been reached (No), the CPU 321 returns the processing to step S28 to read the subsequent document. Meanwhile, if it is determined that the number of continuously dischargeable sheets has been reached (Yes), the CPU 321 sets up a read prohibited state to prohibit reading of a new document (S41).

Next, the CPU 321 determines whether all the documents have been discharged (S42). In this processing, if it is determined that not all the documents have been discharged (No), the CPU 321 returns the processing to step S28, and the document reading and conveyance processing is continued until the document that has caused the number of continuously dischargeable sheets to be reached has been discharged. Meanwhile, if it is determined that all the documents have been discharged (Yes), the CPU 321 stops the conveyance motor 121 (S43) and notifies stop completed to the controller unit 400 (S44).

If a stop complete notification based on the number of continuously dischargeable sheets being reached is received from the CPU 321, the controller unit 400 displays the display illustrated in FIG. 15 on the operation unit 405 and urges the user to remove the documents being discharged onto the sheet discharge tray 10. In the image reading apparatus 1000 of the first embodiment, since the upper limit of the continuously discharged sheet counter is set to 10 in the processing of step S24, 10 documents have been discharged onto the sheet discharge tray 10. That is, the CPU 321 continuously discharges 10 documents, and in a state where feeding of documents by the pickup roller 1 and the separation roller 2 is stopped, the operation unit 405 is caused to display information urging the user to remove the documents to be displayed.

Next, the CPU 321 determines whether the request to resume reading from the controller unit 400 has been received (S45), and if the request to resume reading has not been received (No), it repeats the processing of step S45. In this state, the controller unit 400 stands by for the OK button displayed on the operation unit 405 to be pressed by the user. In a state where the pressing of the OK button by the user has been detected, the controller unit 400 determines that the document discharged on the sheet discharge tray 10 has been removed, and outputs a request to resume reading to the CPU 321.

In the processing of step S45, if it is determined that the request to resume reading has been received (Yes), the CPU 321 starts to rotate the conveyance motor 121 (S46), initiates the value stored in the continuously discharged sheet counter to 0 (S47), and cancels the read prohibited state (S48). Then, the CPU 321 returns the processing to step S28.

As described, the image reading apparatus 1000 interrupts the document read operation according to the number of sheets of documents discharged onto the sheet discharge tray 10, and resumes the document read operation according to the operation the operation unit 405 by the user. Further, according to the image reading apparatus 1000, the processing of steps S28 to S33 and steps S37 to S48 are repeated until either all the documents placed on the document tray 30 have been read or a document read request has been received and reading of documents other than the documents remaining on the document tray 30 have been completed. Then, the series of document reading jobs in the image reading apparatus 1000 are finished when there is no more page management information.

Control Regarding CCD Sensor Unit

Figure 20:
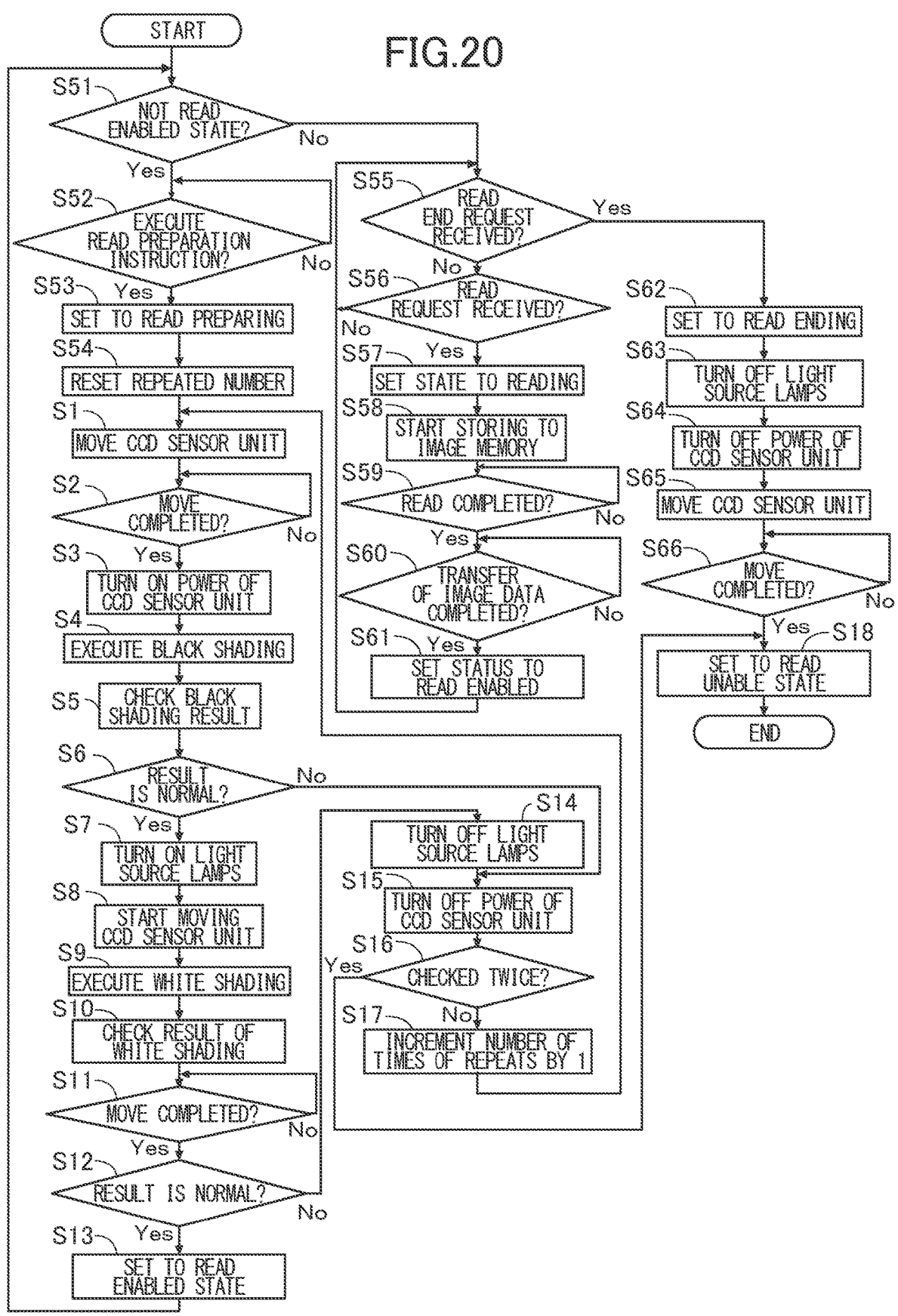
FIG. 20 is a flowchart illustrating a control that is executed by a CPU when reading a document image using a CCD sensor unit according to the first embodiment.

FIG. 20 is a flowchart illustrating a control that is executed when the CPU 321 uses the CCD sensor unit 210 to read the document image.

In reading the document image using the CCD sensor unit 210, at first, the CPU 321 determines whether a read enabled state has been set (S51). When executing this process in the image reading apparatus 1000, at a point of time when the read request of the first page of the document has been received by the controller unit 400, the read enabled state is not yet set.

In the processing of step S51, if it is determined that the read enabled state is not set (No), the CPU 321 determines whether a read preparation has been instructed to the CCD sensor unit 210 (S52). In this processing, the CPU 321 determines whether read preparation of the processing of step S27 in the control of the entire apparatus has been instructed to the CCD sensor unit 210. If the read preparation has not been instructed (No), the CPU 321 repeats the processing of step S52 until the read preparation has been instructed.

Meanwhile, if it is determined that the read preparation has been instructed (Yes), the CPU 321 sets the state of the CCD sensor unit 210 to read preparing (S53) and resets the number of execution of shading control to 0 times (S54). Then, the CPU 321 starts the shading control illustrated in FIG. 6. In shading control, the CPU 321 is configured to execute the processing illustrated in FIG. 6, such that the same step numbers are assigned to equivalent processing steps in FIG. 20 and descriptions thereof are omitted.

As illustrated in FIG. 20, in a case where shading control is completed normally, accompanying setting of the read enabled state in the processing of step S13 and ending the shading control, the CPU 321 advances the processing to step S51 for reading the document image. Thereby, the CPU 321 can set the read enabled state and advance the processing of step S51 to the processing of step S55.

In the processing of step S51, if it is determined that the read enabled state is set (Yes), the CPU 321 determines whether a read end request has been received (S55). In this processing, similar to the processing of step S28 of control of the entire apparatus, the CPU 321 determines whether a document read end request notified from the controller unit 400 to the CPU 321 has been received.

In the processing of step S55, if it is determined that the read end request has not been received (No), the CPU 321 determines whether an instruction accompanying starting of reading of document image has been output (S56). In this processing, if it is determined that the instruction to start reading has not been output (No), the CPU 321 returns the processing to step S55. The details of instruction for starting reading of the document image will be described later.

Meanwhile, if it is determined that starting of reading is instructed (Yes), the CPU 321 sets the state of the CCD sensor unit 210 to reading (S57) and starts to store the document image read by the CCD sensor unit 210 to the image memory 329 (S58). Next, the CPU 321 determines whether reading of document image has been completed (S59). In this processing, the CPU 321 determines whether the reading of document image corresponding to the size specified by the instruction at the start of reading has been executed, and if it is determined that reading has not been completed (No), the processing of step S59 is repeated until reading is completed.

Meanwhile, if it is determined that the reading of the document image has been completed (Yes), the CPU 321 determines whether transfer of the image data stored in the image memory 329 to the controller unit 400 has been completed (S60). In this processing, if the CPU 321 determines that the transfer of image data stored in the image memory 329 to the controller unit 400 has not been completed (No), the processing of step S60 is repeated until transfer is completed. Meanwhile, if it is determined that transfer of image data has been completed (Yes), the CPU 321 sets the state of the CCD sensor unit 210 to read enabled (S61) and returns the processing to step S55.

If it is determined that the read end request has been received in the processing of step S55 (Yes), the CPU 321 sets the state of the CCD sensor unit 210 to read ending (S62). Next, the CPU 321 turns off the light source lamps 203*a* and 203*b* (S63), and turns off the power of the CCD sensor unit 210 (S64). Then, the CPU 321 moves the CCD sensor unit 210 to directly below the shading white board 202 (S65), sets the state of the CCD sensor unit 210 to read unable state (S18), and ends the control for reading the document image.

Conveyance Control Regarding One Sheet of Document

Figure 21:
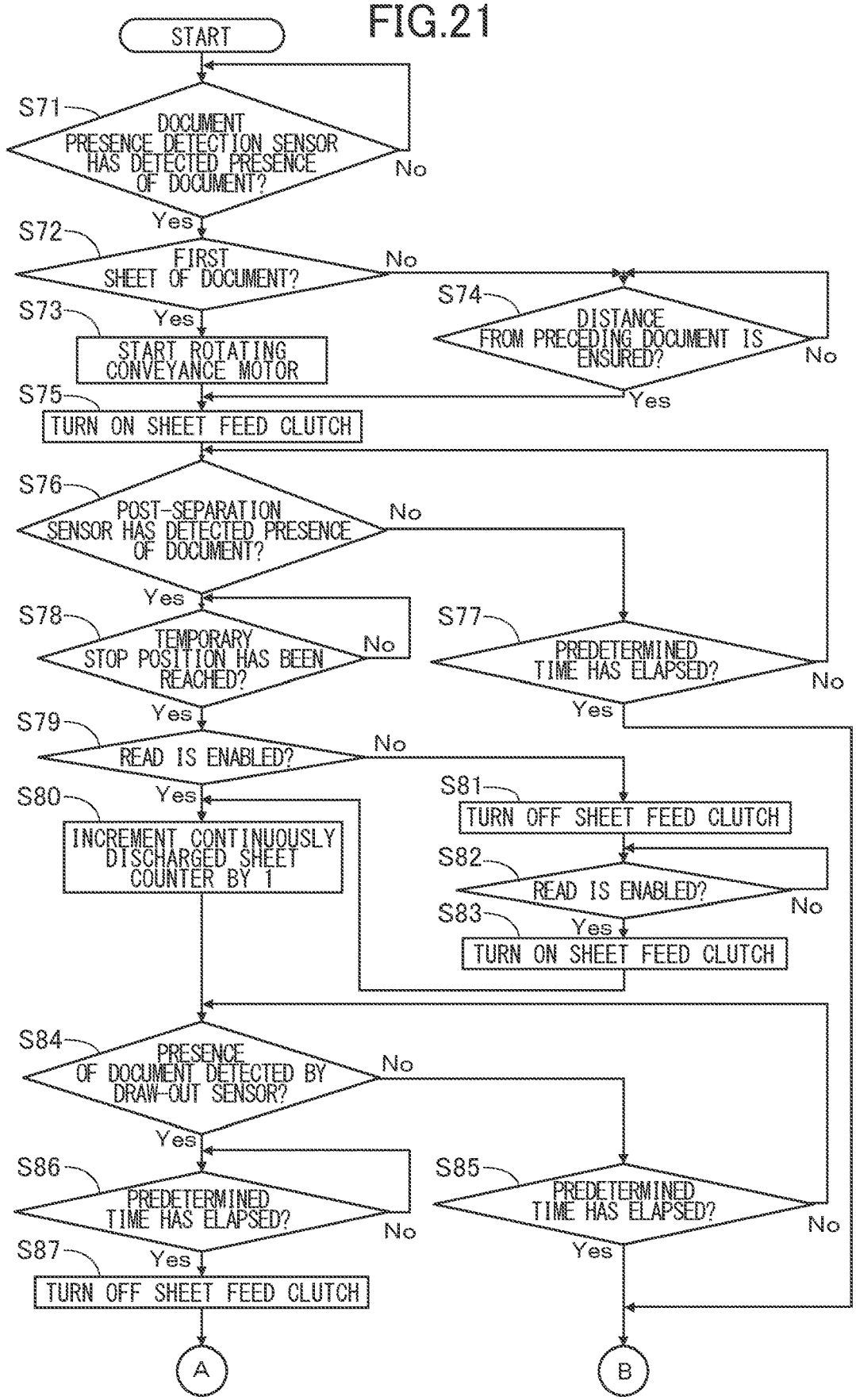
FIG. 21 is a flowchart illustrating a conveyance control of document that is executed by the CPU when reading an image from one sheet of document according to the first embodiment.
Figure 22:
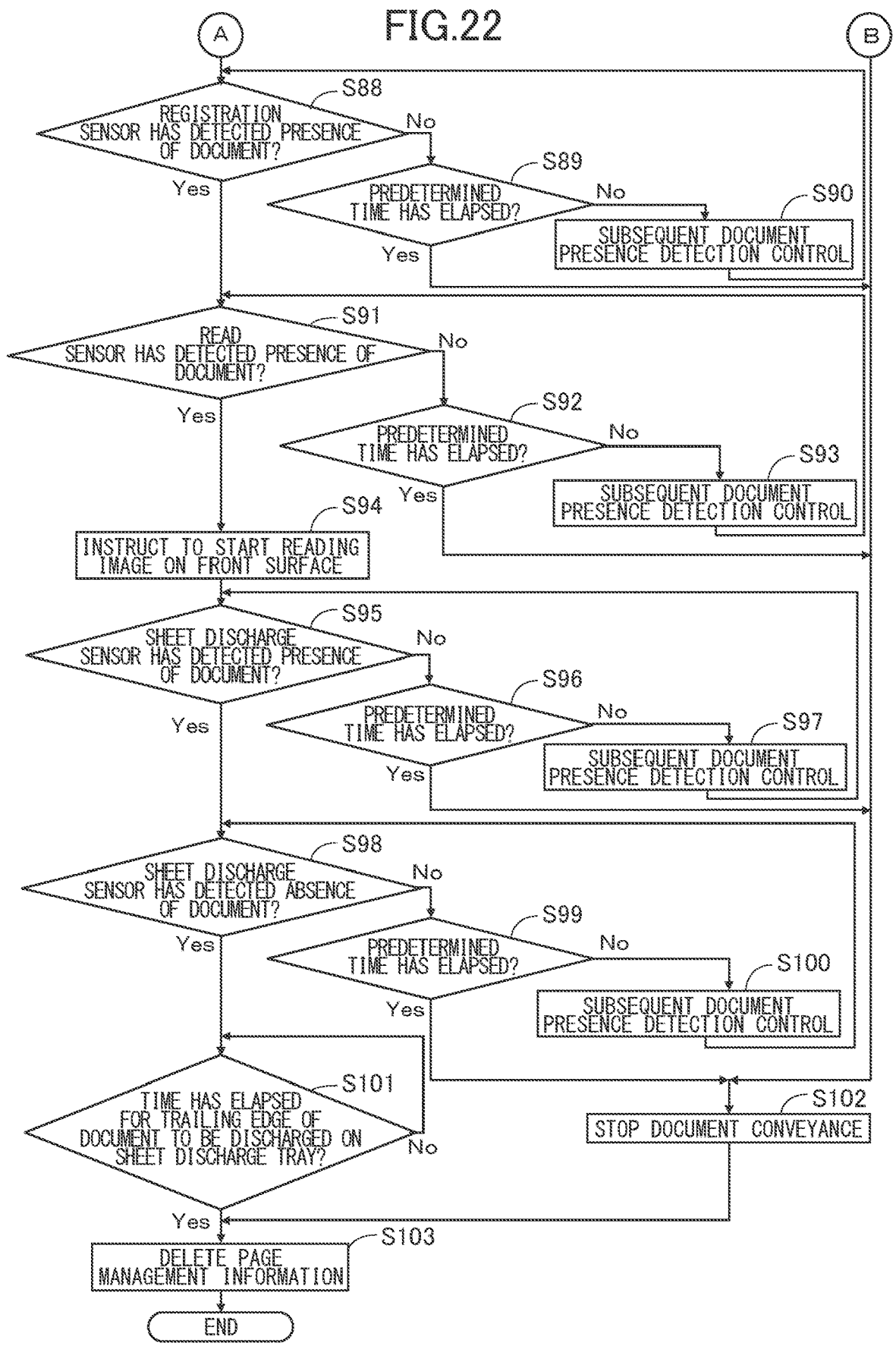
FIG. 22 is a flowchart illustrating a conveyance control of a document that is executed by the CPU when reading an image from one sheet of document according to the first embodiment.

FIGS. 21 and 22 are flowcharts illustrating the conveyance control of the document executed by the CPU 321 for reading an image from one sheet of document. After generating a page management information in the processing of steps S22 and S30 in the control of the entire apparatus, the CPU 321 executes conveyance control of the document.

At first, the CPU 321 determines whether the document presence detection sensor 11 detects the presence of a document on the document tray 30 (S71). In this processing, if it is determined that the document presence detection sensor 11 does not detect the presence of a document on the document tray 30 (No), the CPU 321 repeats the processing of step S71 until the document presence detection sensor 11 detects the presence of a document on the document tray 30.

Meanwhile, if it is determined that the document presence detection sensor 11 has detected the presence of a document on the document tray 30 (Yes), the CPU 321 determines whether the document to be conveyed is the first sheet of document (S72). In the processing, if it is determined that the document to be conveyed is the first sheet of the document (Yes), the CPU 321 starts to rotate the conveyance motor 121 since there is no preceding document within the conveyance path 32 (S73). Meanwhile, if it is determined that the document to be conveyed is the second or subsequent sheet of document (No), the CPU 321 determines whether a distance, i.e., sheet interval, from the preceding document is ensured (S74). In this processing, if it is determined that the sheet interval between the preceding document is not ensured (No), the CPU 321 repeats the processing of step S74 until the interval between sheets is ensured.

In a state where the draw-out sensor 13 is changed from a state in which the presence of a document is detected to a state in which the presence of a document is not detected in the processing of the document conveyance task, the CPU 321 determines that the trailing edge of the document has passed through the position in which the draw-out sensor 13 detects the presence of a document. The CPU 321 is configured to be able to acquire the document trailing edge detection timing at the position of the draw-out sensor 13 also from another document conveyance task for controlling another document conveyed through the conveyance path 32. Therefore, during a document conveyance task that has been created to start feeding of a document, the CPU 321 acquires a timing at which the trailing edge of the preceding document has passed through the draw-out sensor 13 from the document conveyance task of the preceding document. Then, the CPU 321 determines that the trailing edge of the preceding document had passed through the position of the drawing roller 3 by waiting before starting to be fed until a predetermined time computed based on the acquired timing and the conveyance speed of the preceding document has elapsed.

In the image reading apparatus 1000, by having the succeeding document standby until a timing at which the trailing edge of the preceding document passes through the drawing roller 3, it becomes possible to prevent the document started to be fed by turning on the sheet feed clutch 123 from colliding against the preceding document.

After executing the processing of step S73 or during the processing of step S74, if it is determined that interval between sheets is ensured (Yes), the CPU 321 turns on the sheet feed clutch 123 (S75). By having the sheet feed clutch 123 turned on, the driving force of the conveyance motor 121 is supplied to the pickup roller 1 and the separation roller 2 in the ADF 100, and the rotation of the pickup roller 1 and the separation roller 2 is started.

Next, the CPU 321 determines whether the post-separation sensor 12 has detected the presence of a document (S76). In the processing, if it is determined that the post-separation sensor 12 has not detected the presence of a document (No), the CPU 321 determines whether a predetermined time has elapsed (S77). If it is determined that a predetermined time has not elapsed from the start of sheet feed to the reading of the sheet to the post-separation sensor 12, the CPU 321 determines that the document has not reached the post-separation sensor 12, and the processing is returned to step S76. Meanwhile, if it is determined that a predetermined time has elapsed (Yes), the CPU 321 determines that the conveyance of a document has not been carried out properly, and the processing is advanced to step S102.

In the processing of step S76, if the post-separation sensor 12 detects the presence of a document (Yes), the CPU 321 determines whether the leading edge of the document has reached the temporary stop position (S78). In this processing, if it is determined that the temporary stop position has not been reached (No), the CPU 321 repeats the processing of step S78 until the leading edge of the document has reached the temporary stop position. The CPU 321 determines whether the leading edge of the document has reached the temporary stop position based on the timing at which the leading edge of the document has passed through the position of the post-separation sensor 12 and the conveyance speed of the document.

In the processing of step S78, if it is determined that the temporary stop position has been reached (Yes), the CPU 321 determines whether the reading of the document image is enabled (S79). In the processing, the CPU 321 determines whether there is an area for storing image data in the image memory 329, and whether a read prohibited setting is set in the apparatus management information.

In the processing of step S79, if it is determined that read is enabled (Yes), the CPU 321 executes the subsequent processing and finally discharges the document on the sheet discharge tray 10 without temporarily stopping document conveyance. Therefore, based on the fact that discharge of the sheet on the sheet discharge tray 10 is confirmed at this time, the CPU 321 increments the continuously discharged sheet counter by 1 (S80).

In the processing of step S79, if it is determined that read is not enabled (No), the CPU 321 turns off the sheet feed clutch 123 (S81) and temporarily stops the conveyance of the document. As described above, in a state where the continuously discharged sheet counter has reached the upper limit value, that is, in a state where the number of continuously dischargeable sheets of documents have been discharged, the CPU 321 is configured to set the read prohibited setting. Therefore, in a state where the receipt read mode is set, the CPU 321 according to the first embodiment is configured to stop the feeding of the document by the pickup roller 1 and the separation roller 2, regardless of the detection result of the document presence detection sensor 11.

Next, the CPU 321 determines whether read enabled has been set (S82), and if read enabled has not been set (No), the processing of step S82 is repeated until read enabled is set. Meanwhile, if read enabled has been set (Yes), the CPU 321 turns on the sheet feed clutch 123 (S83) and resumes conveyance of documents. Then, after executing the processing of step S83, the CPU 321 advances the processing to step S80 and increments the continuously discharged sheet counter by 1.

In this state, the CPU 321 according to the first embodiment executes the processing of incrementing the value of the continuously discharged sheet counter by one at a point of time when the leading edge of the document has passed through the temporary stop position, and sets the reaching of the continuously discharged sheet counter to the upper limit as the temporarily stop condition (step S40 of FIG. 17). According to this configuration, in the image reading apparatus 1000, the stop position of the document in a state where the continuously discharged sheet counter has reached the upper limit becomes the temporary stop position. In other words, in a state where the number of continuously dischargeable sheets is set, the CPU 321 temporarily stops the leading edge of the document fed in succession to the document that has been determined to cause the number of continuously discharged sheets to reach the determined number of sheets (10 sheets) at a position between the post-separation sensor 12 and the draw-out sensor 13. Thereby, in the image reading apparatus 1000, the point of time from when the conveyance of the document is resumed to the time at which the document is discharged can be shorted.

After executing the processing of step S80, the CPU 321 detects the position of the document using the draw-out sensor 13, the registration sensor 14, the read sensor 15, and the sheet discharge sensor 16 arranged in the conveyance path 32. In detecting the position of the document within the conveyance path 32, at first, the CPU 321 determines whether the presence of a document has been detected by the draw-out sensor 13 (S84). In this processing, if the draw-out sensor 13 has not detected the presence of a document (No), the CPU 321 determines whether a predetermined time in which the leading edge of the document positioned at the temporary stop position reaches the draw-out sensor 13 has been elapsed (S85). In this processing, if it is determined that the predetermined time has not elapsed (No), the CPU 321 returns the processing to step S84. Meanwhile, if it is determined that a predetermined time has elapsed (Yes), the CPU 321 determines that the conveyance of the document is not performed correctly and advances the processing to step S102.

In the processing of step S84, if it is determined that the draw-out sensor 13 has detected the presence of a document (Yes), the CPU 321 determines whether a predetermine time has elapsed for document conveyance to be enabled by the drawing roller 3 without using the separation roller 2 (S86). In this processing, if it is determined that the predetermined time has not elapsed (No), the CPU 321 repeats the processing of step S86 until the predetermined time has elapsed. Meanwhile, if it is determined that the predetermined time has elapsed (Yes), the CPU 321 turns off the sheet feed clutch 123 to convey the document by the drawing roller 3 thereafter (S87).

Next, the CPU 321 determines whether the registration sensor 14 has detected the presence of a document (S88). In this processing, if the registration sensor 14 has not detected the presence of a document (No), the CPU 321 determines whether a predetermined time has elapsed for the leading edge of the document positioned at a position where the sheet feed clutch 123 is turned off to reach the registration sensor 14 (S89). In this processing, if it is determined that the predetermined time has not elapsed (No), the CPU 321 executes a control for detecting the presence of a document to be conveyed subsequently, i.e., subsequent document presence detection control (S90), and returns the processing to step S88. Meanwhile, in the processing of step S89, if it is determined that the predetermined time has elapsed (Yes), the CPU 321 determines that the conveyance of the document is not performed correctly and advances the processing to step S102. The subsequent document presence detection control is also configured to be executed in steps S93, S97, and S100. The details of the subsequent document presence detection control will be described later.

In the processing of step S88, if it is determined that the registration sensor 14 has detected the presence of a document (Yes), the CPU 321 determines whether the read sensor 15 has detected the presence of a document (S91). In this processing, if the read sensor 15 has not detected the presence of a document (No), the CPU 321 determines whether a predetermined time has elapsed for the leading edge of the document positioned at the position detected by the registration sensor 14 to reach the read sensor 15 (S92). In this processing, if it is determined that the predetermined time has not elapsed (No), the CPU 321 executes the subsequent document presence detection control (S93) and returns the processing to step S91. Meanwhile, if it is determined in the processing of step S92 that the predetermined time has elapsed (Yes), the CPU 321 determines that the conveyance of the document is not performed correctly and advances the processing to step S102.

In the processing of step S91, if it is determined that the read sensor 15 has detected the presence of a document (Yes), the CPU 321 instructs the CCD sensor unit 210 to start reading the image on the first surface, i.e., front surface, of the document (S94). By having the processing of step S94 executed in the image reading apparatus 1000, it is determined that the instruction accompanying starting of reading of document image has been performed in the processing of step S56 illustrated in FIG. 20.

Next, the CPU 321 determines whether the sheet discharge sensor 16 has detected the presence of a document (S95). In the processing, if the sheet discharge sensor 16 has not detected the presence of a document (No), the CPU 321 determines whether a predetermined time has elapsed for the leading edge of the document positioned at the position detected by the read sensor 15 to reach the sheet discharge sensor 16 (S96). In the processing, if it is determined that the predetermined time has not elapsed (No), the CPU 321 executes the subsequent document presence detection control (S97) and returns the processing to step S95. Meanwhile, if it is determined that the predetermined time has elapsed in the processing of step S96 (Yes), the CPU 321 determines that the conveyance of the document is not performed correctly and advances the processing to step S102.

In the processing of step S95, if it is determined that the sheet discharge sensor 16 has detected the presence of a document (Yes), the CPU 321 determines whether the sheet discharge sensor 16 has detected absence of a document (S98). In the processing, if the sheet discharge sensor 16 has not detected absence of a document (No), the CPU 321 determines whether a predetermined time has elapsed from the detection of the leading edge of the document by the sheet discharge sensor 16 to the passing of the trailing edge of the document through the sheet discharge sensor 16 (S99). In this processing, if it is determined that the predetermined time has not elapsed (No), the CPU 321 executes the subsequent document presence detection control (S100) and returns the processing to step S98. Meanwhile, in the processing of step S99, if it is determined that the predetermined time has elapsed (Yes), the CPU 321 determines that the discharging of the document is not correctly performed and that sheet jam has occurred at the sheet discharge tray 10, and advances the processing to step S102.

In the processing of step S98, if it is determined that the sheet discharge sensor 16 has detected absence of a document (Yes), the CPU 321 determines whether a time has elapsed for the trailing edge of the document that has passed the position of the sheet discharge sensor 16 to be discharged on the sheet discharge tray 10 (S101). In the processing, if it is determined that the time has not elapsed for the trailing edge of the document that has passed through the position of the sheet discharge sensor 16 to be discharged on the sheet discharge tray 10 (No), the CPU 321 repeats the processing of step S101 until the elapse of time. Meanwhile, if it is determined that the time has elapsed (Yes), the CPU 321 advances the processing to step S103.

In a state where it is determined that the document has not been correctly conveyed, the CPU 321 executes the processing of step S102. In the processing of step S102, the CPU 321 stops conveyance of a document by stopping the conveyance motor 121 and turning off the sheet feed clutch 123. Then, the CPU 321 advances the processing to step S103.

In the processing of step S103, since the document conveyance has been stopped based on the fact that the document has been discharged on the sheet discharge tray 10 or the conveyance of the document has not been performed correctly, the CPU 321 deletes the page management information and ends the conveyance control of one sheet of document.

Subsequent Document Presence Detection Control

As described above, in the image reading apparatus 1000, in a case where a length of the document in the conveyance direction is short, the trailing edge of the document may pass through the post-separation sensor 12 at a timing at which the sheet feed clutch 123 is turned off and conveyance of a document by the drawing roller 3 is started. Therefore, after tuning off the sheet feed clutch 123, the CPU 321 is configured to execute the subsequent document presence detection control in parallel with the processing related to the detection of the leading edge of the document. Further, in the image reading apparatus 1000, if the document length is longer than the conveyance path 32, the trailing edge of the document may remain on the document tray 30 even after the leading edge of the document has been detected by the sheet discharge sensor 16. Therefore, the CPU 321 is configured to be able to execute the subsequent document presence detection control even while detecting the trailing edge of the document by the sheet discharge sensor 16.

Figure 23:
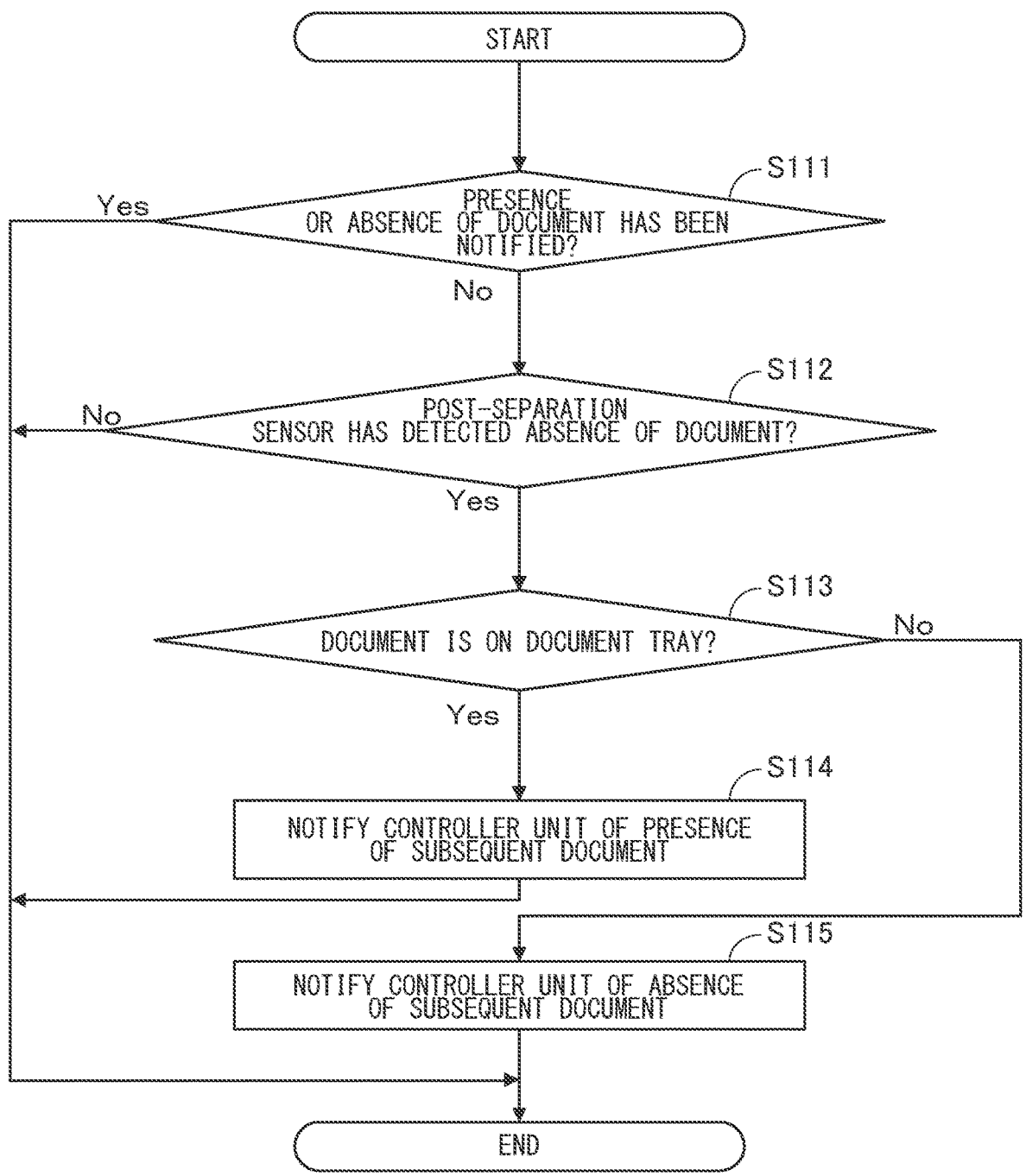
FIG. 23 is a flowchart illustrating a subsequent document presence detection control according to the first embodiment.

FIG. 23 is a flowchart illustrating the subsequent document presence detection control. As illustrated in FIG. 23, at first, the CPU 321 determines whether the presence or absence of a document has been notified (S111). In this processing, since the CPU 321 has multiple chances of executing the subsequent document presence detection control, the CPU 321 determines whether the presence or absence of the document has already been notified to the controller unit 400, and if it is determined that notification has already been performed (Yes), the subsequent document presence detection control is ended.

Meanwhile, if it is determined the presence or absence of the document has not been notified (No), the CPU 321 determines whether the post-separation sensor 12 has detected the absence of a document (S112). In this processing, if it is determined that the post-separation sensor 12 has detected the presence of a document (No), the CPU 321 ends the subsequent document presence detection control since the trailing edge of the document has not passed through the post-separation sensor 12.

Meanwhile, if it is determined that the post-separation sensor 12 has detected absence of document (Yes), the CPU 321 determines whether there is a document on the document tray 30 (S113). In this processing, the CPU 321 determines whether the document presence detection sensor 11 has detected the presence of a document.

In the processing of step S114, if it is determined that there is a document on the document tray 30 (Yes), the CPU 321 notifies the controller unit 400 that a subsequent document is present (S114) and ends the subsequent document presence detection control. Meanwhile, if it is determined that no document is present on the document tray 30 (Yes), the CPU 321 notifies the controller unit 400 that there is no subsequent document (S115) and ends the subsequent document presence detection control.

By the subsequent document presence detection control being executed each time one sheet of document is read, the controller unit 400 is capable of perceiving the presence or absence of a document on the document tray 30 based on the notification of presence or absence of a document from the CPU 321. Thereby, in the processing of step S29 of control of the entire apparatus (refer to FIG. 17), the controller unit 400 can instruct a request to read one page of image when a document not fed remains on the document tray 30. Further, when it is detected by the document presence detection sensor 11 that there is no more document on the document tray 30, the CPU 321 can stop the feeding of the document by the pickup roller 1 and the separation roller 2.

Flow of Execution of Multiple Processing by CPU

Figure 24:
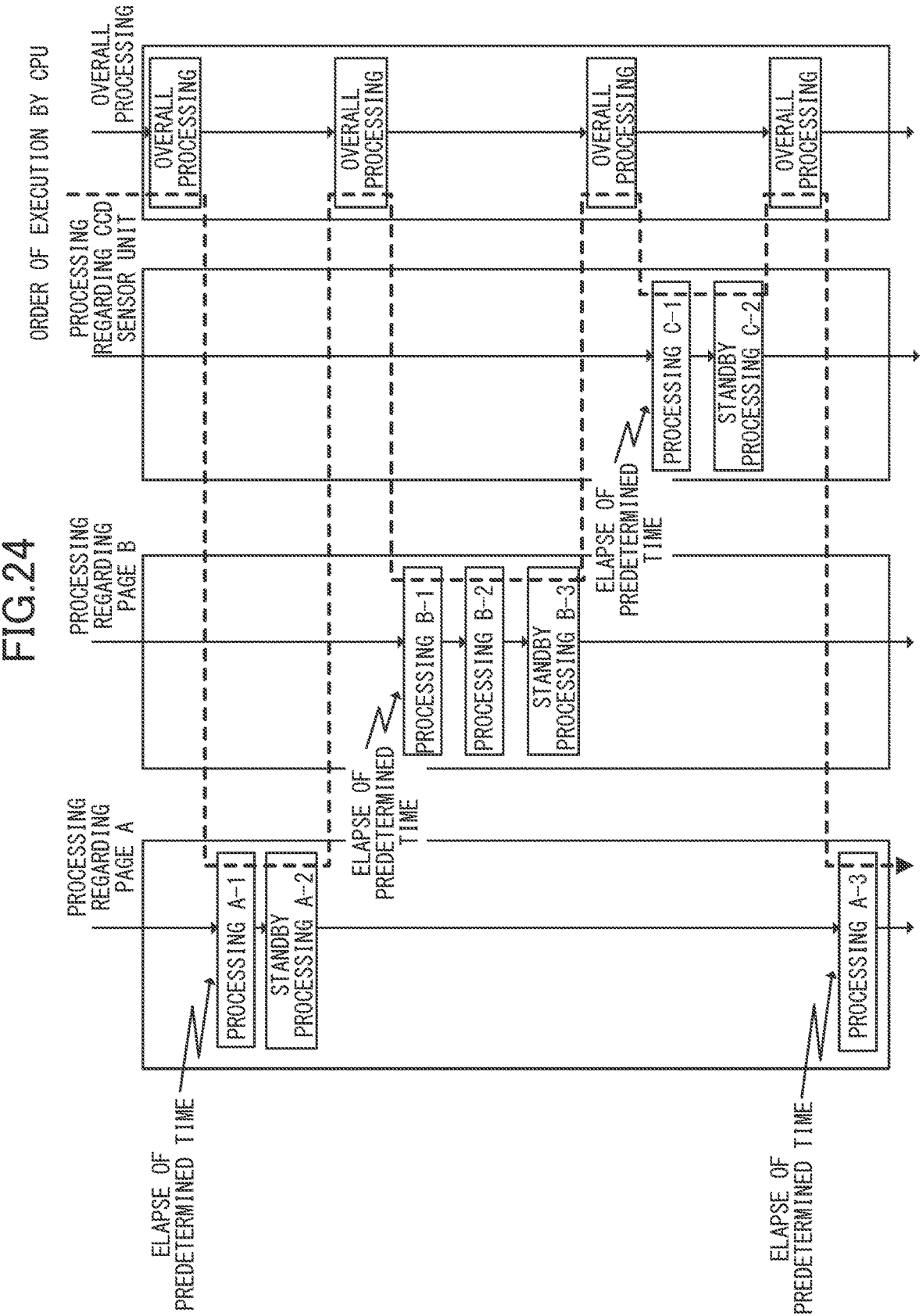
FIG. 24 is a view illustrating a flow of processing in a case where the CPU processes a plurality of tasks by time division according to the first embodiment.

FIG. 24 is a drawing illustrating the flow of processing in a case where the CPU 321 processes multiple tasks in time division. The CPU 321 realizes the processing described in each flowchart as a task using a software such as a multitask OS and executes the respective tasks by time division processing.

The CPU 321 monitors the tasks of the respective processing in time division. The CPU 321 switches to another processing, such as document conveyance, reading of document image, or control of the entire apparatus, in a case where a processing that requires to stand by for a predetermined time becomes necessary among the various tasks such as the processing regarding document conveyance illustrated in FIGS. 22 and 23 or the processing regarding the CCD sensor unit 210 illustrated in FIG. 21. As described, the CPU 321 enables to perform parallel processing of processes that are required to read images from both sides of a plurality of documents.

In the example illustrated in FIG. 24, the CPU 321 performs four processing operations in parallel, which are a processing regarding page A, a processing regarding page B, a processing regarding the CCD sensor unit 210, and a control of the entire apparatus that is executed while reading of a page or an image is not performed, i.e., overall processing. Specifically, in a state where processing A-1 regarding page A is executed and then a standby processing A-2 is executed among the processing of the entire apparatus, since other pages are also in a standby state, the CPU 321 executes the overall processing. When standby of the predetermined time is ended in the processing regarding page B, the CPU 321 terminates the overall processing and executes processing B-1 regarding page B. In a state where processing B-1 and B-2 are executed and then a standby processing B-3 is executed, since other pages are also in a standby state, the CPU 321 executes the overall processing. When standby of the predetermined time is ended in the processing regarding the CCD sensor unit 210, the CPU 321 terminates the overall processing and executes processing C-1 regarding the CCD sensor unit 210.

As described, the CPU 321 executes four processing operations in parallel, which are a processing regarding page A, a processing regarding page B, a processing regarding the CCD sensor unit 210, and a control of the entire apparatus that is executed while reading of a page or an image is not performed, i.e., overall processing.

Summary of First Embodiment

As described, the image reading apparatus 1000 of the first embodiment is capable of setting a receipt read mode that limits the number of documents continuously dischargeable on the sheet discharge tray 10 by the sheet discharge roller 9 to a predetermined number of sheets, such as 10. The image reading apparatus 1000 sets the receipt read mode, and in a state where the number of continuously discharged sheets has reached 10, stops the feeding of documents by the pickup roller 1 and the separation roller 2 regardless of the detection result of the document presence detection sensor 11. Further, the image reading apparatus 1000 can set a read mode other than receipts in which continuous feeding of documents by the pickup roller 1 and the separation roller 2 can be continued exceeding ten sheets and the documents are continuously discharged onto the sheet discharge tray 10. The image reading apparatus 1000 is configured to be able to select and execute the receipt read mode and read mode for documents other than receipts.

According to such configuration, in a state where documents that have low stackability and that are difficult to align in a stacked manner is to be read continuously by the image reading apparatus 1000, there is a limitation set to the number of documents to be stacked on the sheet discharge tray 10. Thereby, the image reading apparatus 1000 can suppress the changing of order in which the documents are stacked on the sheet discharge tray 10 or the occurrence of sheet jam in the sheet discharge unit 33. Further, even in a case where the number of documents exceeding the continuously dischargeable number of sheets are placed on the document tray 30 in the image reading apparatus 1000, the number of documents being discharged continuously can be limited by setting the receipt read mode. Thereby, the image reading apparatus 1000 enables to reduce the number of times the documents are placed on the document tray 30 and the number of times of instructions to execute the reading job, such that the number of processes performed by the user regarding the reading of documents can be reduced.

Second Embodiment

Next, an image reading apparatus 1000 according to a second embodiment will be described. The image reading apparatus 1000 according to the second embodiment adopts a configuration in which a continuously discharged sheet counter is incremented by 1 and determination on whether the continuously discharged sheet counter has reached an upper limit is performed at a timing before the sheet feed clutch 123 is turned on to feed the document placed on the document tray 30. In this way, the image reading apparatus 1000 according to the second embodiment differs from the first embodiment described above. The other configurations are similar to the first embodiment, such that the configurations that are the same as the first embodiment are denoted with the same reference numbers, and control processing steps that are the same as the first embodiment are denoted with the same step number and descriptions thereof are omitted.

Conveyance Control for One Sheet of Document

Figure 25:
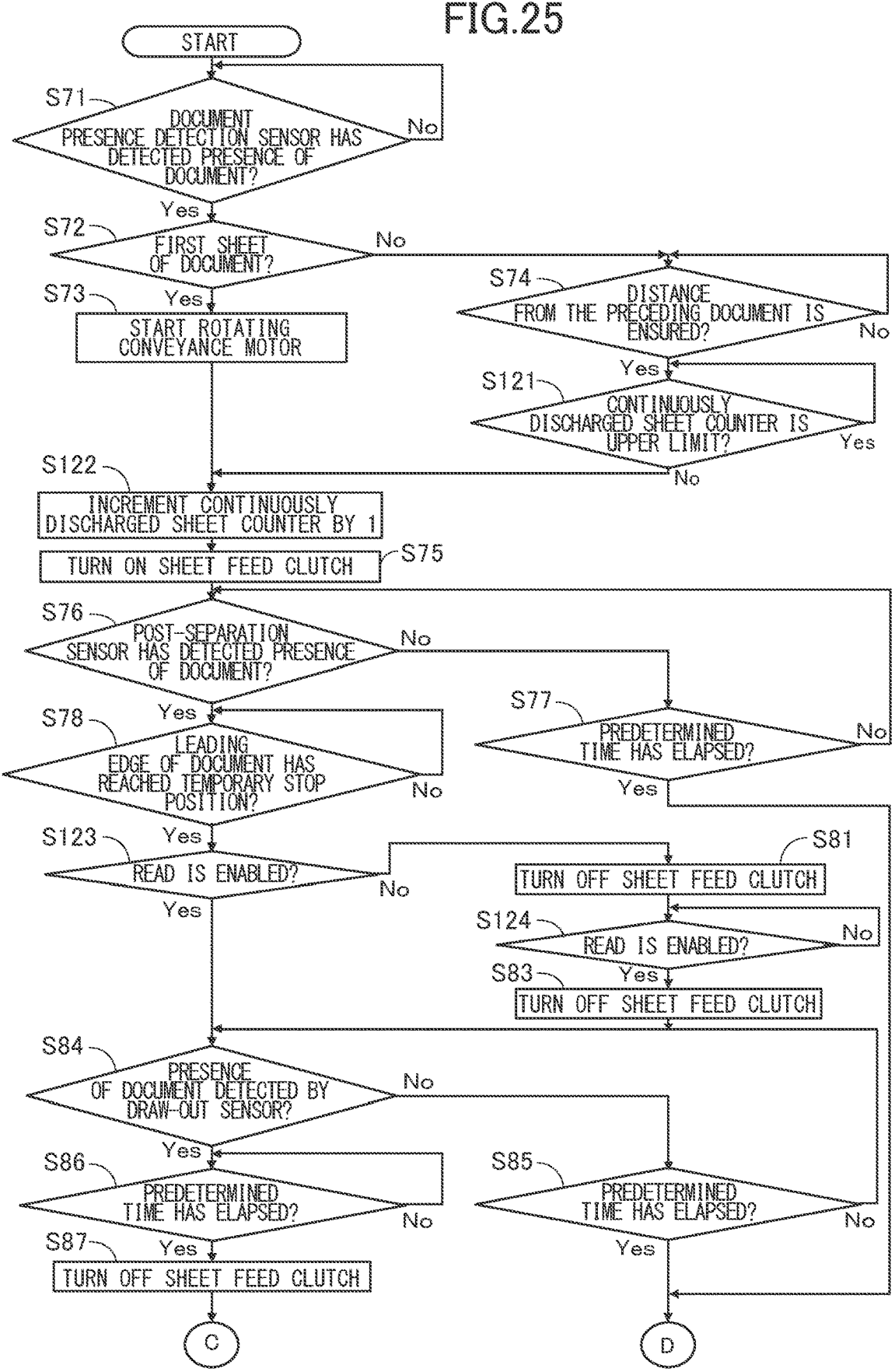
FIG. 25 is a flowchart illustrating a conveyance control of a document that is executed by the CPU when reading an image from one sheet of document according to a second embodiment.
Figure 26:
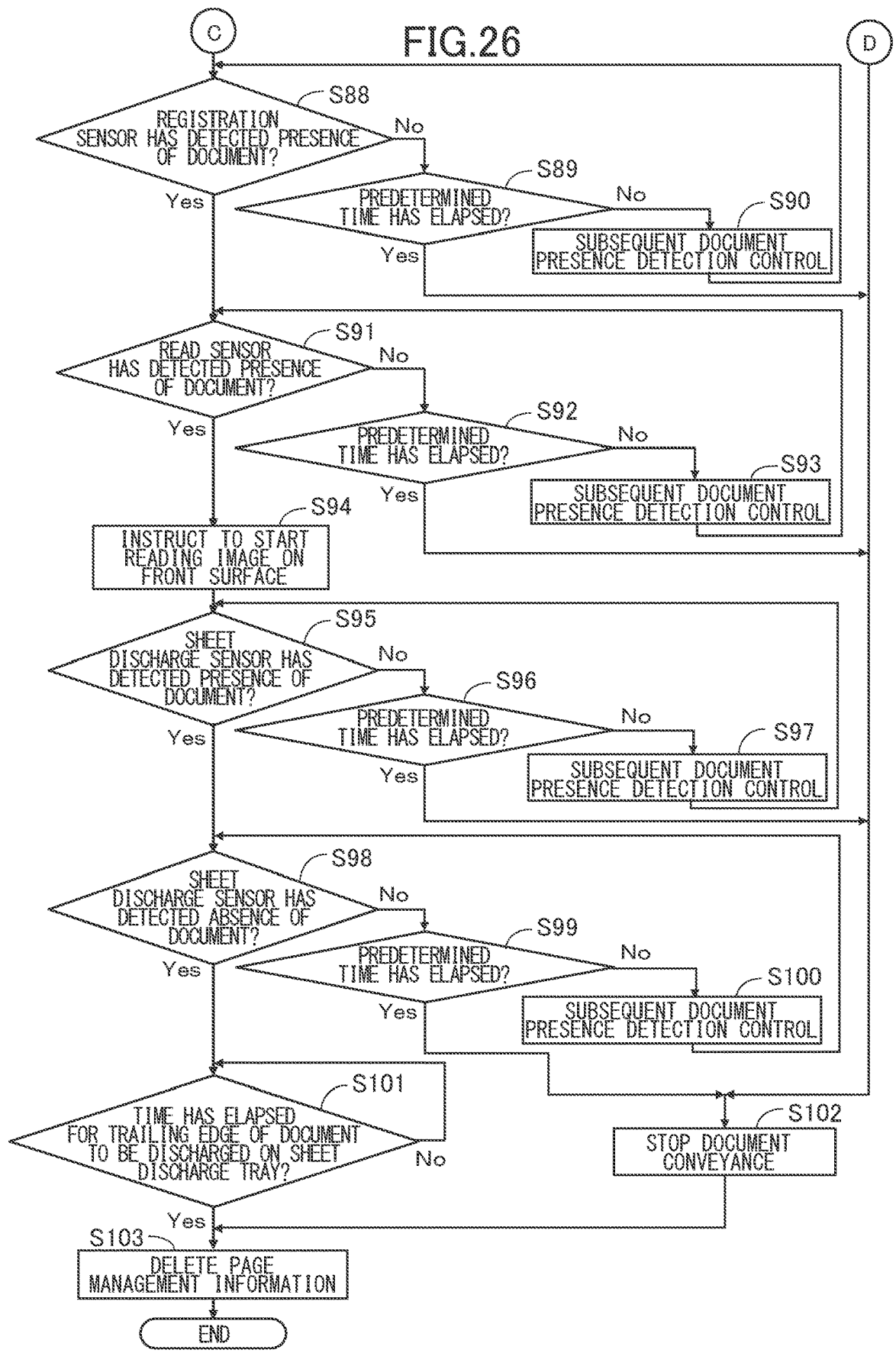
FIG. 26 is a flowchart illustrating a conveyance control of a document that is executed by the CPU when reading an image from one sheet of document according to the second embodiment.

FIGS. 25 and 26 are flowcharts illustrating a document conveyance control that the CPU 321 according to the second embodiment executes to read an image from one sheet of documents. The CPU 321 executes a document conveyance control after generating a page management information in the processing of steps S22 and S30 in the control of the entire apparatus.

In the document conveyance control of the second embodiment, in a state where it is determined that the document being conveyed is the second or subsequent document and that the interval from the preceding document is ensured (step S74: Yes), the CPU 321 advances the processing to step S121. In the processing of step S121, the CPU 321 determines whether the continuously discharged sheet counter is an upper limit value (S121). In the present processing, the CPU 321 compares the current value of the continuously discharged sheet counter stored in the apparatus management information with the upper limit value of the continuously discharged sheet counter stored in the apparatus management information.

In a state where it is determined that the continuously discharged sheet counter has reached the upper limit (Yes), the CPU 321 determines that the number of continuously dischargeable sheets of documents have been discharged and feeding of sheets is prohibited, and the processing of step S121 is repeated until the continuously discharged sheet counter is initialized. The CPU 321 repeats the processing of step S121 until the processing of steps S43 to S47 of the control of the entire apparatus (refer to FIG. 17) have been executed.

In a state where the processing of step S121 is repeated, the image reading apparatus 1000 is in a state where the sheet feed clutch 123 is turned off and feeding of the document placed on the document tray 30 is not performed. Meanwhile, in the image reading apparatus 1000, conveyance of the document already fed and positioned within the conveyance path 32 of the ADF 100 is continued until the document is discharged onto the sheet discharge tray 10.

Further according to the image reading apparatus 1000, in a state where the processing of step S121 is repeated by the CPU 321, information illustrated in FIG. 15 notifying the user to remove the documents discharged onto the sheet discharge tray 10 is displayed on the operation unit 405.

According to such configuration, in the image reading apparatus 1000, while the operation of removing the documents discharged onto the sheet discharge tray 10 is executed by the user, retention of the document being conveyed in the conveyance path 32 can be prevented.

After executing the processing of step S73 or in the processing of step S121, if it is determined that the continuously discharged sheet counter has not reached the upper limit (No), the CPU 321 increments the continuously discharged sheet counter by 1 (S122).

In the processing of step S78, if it is determined that the leading edge of the document has reached the temporary stop position (Yes), the CPU 321 determines whether the reading of the document image is enabled (S123). In this processing, the CPU 321 determines whether there is an area for storing the image data in the image memory 329.

In the processing of step S123, if it is determined that read is not enabled (No), the CPU 321 turns off the sheet feed clutch 123 (S81) and temporarily stops sheet conveyance. Next, the CPU 321 determines whether read enabled is set (S124). In this processing, the CPU 321 determines whether there is an area for storing the image data in the image memory 329.

In the processing of step S124, if read is not set to enabled (No), the CPU 321 repeats the processing of step S124 until read enabled is set. Meanwhile, if read enabled is set (Yes), the CPU 321 turns on the sheet feed clutch 123 (S83) and resumes document conveyance. Then, after executing the processing of step S83, the CPU 321 advances to the processing of step S84.

As described above, the image reading apparatus 1000 of the second embodiment is configured such that, if the continuously discharged sheet counter reaches the upper limit value, feeding of documents is stopped such that documents will not be retained within the conveyance path 32. Therefore, the image reading apparatus 1000 is configured such that, at a point of time when the document has been conveyed to the temporary stop position, read prohibited setting based on the continuously discharged sheet counter having reached the upper limit value is not set.

According to this configuration, in the processing of steps S123 and S124, the CPU 321 according to the second embodiment is not configured to refer to the presence or absence of the read prohibited setting set in the apparatus management information. According to this configuration, the image reading apparatus 1000 according to the second embodiment can cut down the number of steps of the program in the processing of whether read is enabled in a state where the conveyance of the document is started.

Summary of Second Embodiment

As mentioned above, if upper limit of the number of continuously dischargeable sheets is set by having the mode set to the receipt read mode, the image reading apparatus 1000 of the second embodiment determines whether the continuously discharged sheet counter has reached the upper limit value before starting the feeding of a new document. If the number of continuously discharged sheets has reached the upper limit, the image reading apparatus 1000 stops conveyance of the document until the operation unit 405 has been operated and the request to resume reading is output from the controller unit 400 to the CPU 321, and the continuously discharged sheet counter is initialized. According to such configuration, in a state where the document determined to have caused the number of sheets to reach the predetermined number of sheets is discharged onto the sheet discharge tray 10 in the image reading apparatus 1000, the documents following the above-mentioned document are not present in the conveyance path 32.

According to this configuration, in a state where the operation of removing the documents discharged onto the sheet discharge tray 10 is executed by the user, the image reading apparatus 1000 can prevent the document being conveyed from retaining in the conveyance path 32.

Third Embodiment

Next, an image reading apparatus 1000 according to a third embodiment will be described. The image reading apparatus 1000 according to the third embodiment adopts a configuration in which an upper limit value of the continuously discharged sheet counter is set based on a method not depending on a designation by the user. In this way, the image reading apparatus 1000 according to the third embodiment differs from the first embodiment described above. The other configurations are similar to the first embodiment, such that the elements that are common with the first embodiment are denoted with the same reference numbers, control processing steps that are common with the first embodiment are denoted with the same step numbers, and descriptions thereof are omitted.

Outline of Reading of Document Image

In a state where a freely set size (refer to FIG. 16) is selected as the document size from the operation unit 405, the image reading apparatus 1000 according to the third embodiment determines whether to limit the number of continuously dischargeable sheets based on the detected document size. The image reading apparatus 1000 is configured to be able to detect a document width and a skew angle based on the document image read by the CCD sensor unit 210. Further, the image reading apparatus 1000 is configured to be able to detect a position of the document based on an information of presence or absence of detection of each sensor arranged on the conveyance path 32. The image reading apparatus 1000 is configured to be able to compute the length of the document in a conveyance direction based on a time from when each sensor arranged on the conveyance path 32 detects the presence of a document to when the sensor detects the absence of the document, and a conveyance speed.

The image reading apparatus 1000 according to the third embodiment is configured to be able to set an upper limit value of the continuously discharged sheet counter based on a conveyance direction length being computed and a document width being detected. The image reading apparatus 1000 is configured to set up the upper limit value of the continuously discharged sheet counter in a case where the document width is less than a predetermined width, which according to the third embodiment is 105 mm, and where the conveyance direction length is twice the width or greater.

Control of Entire Apparatus

Figure 27:
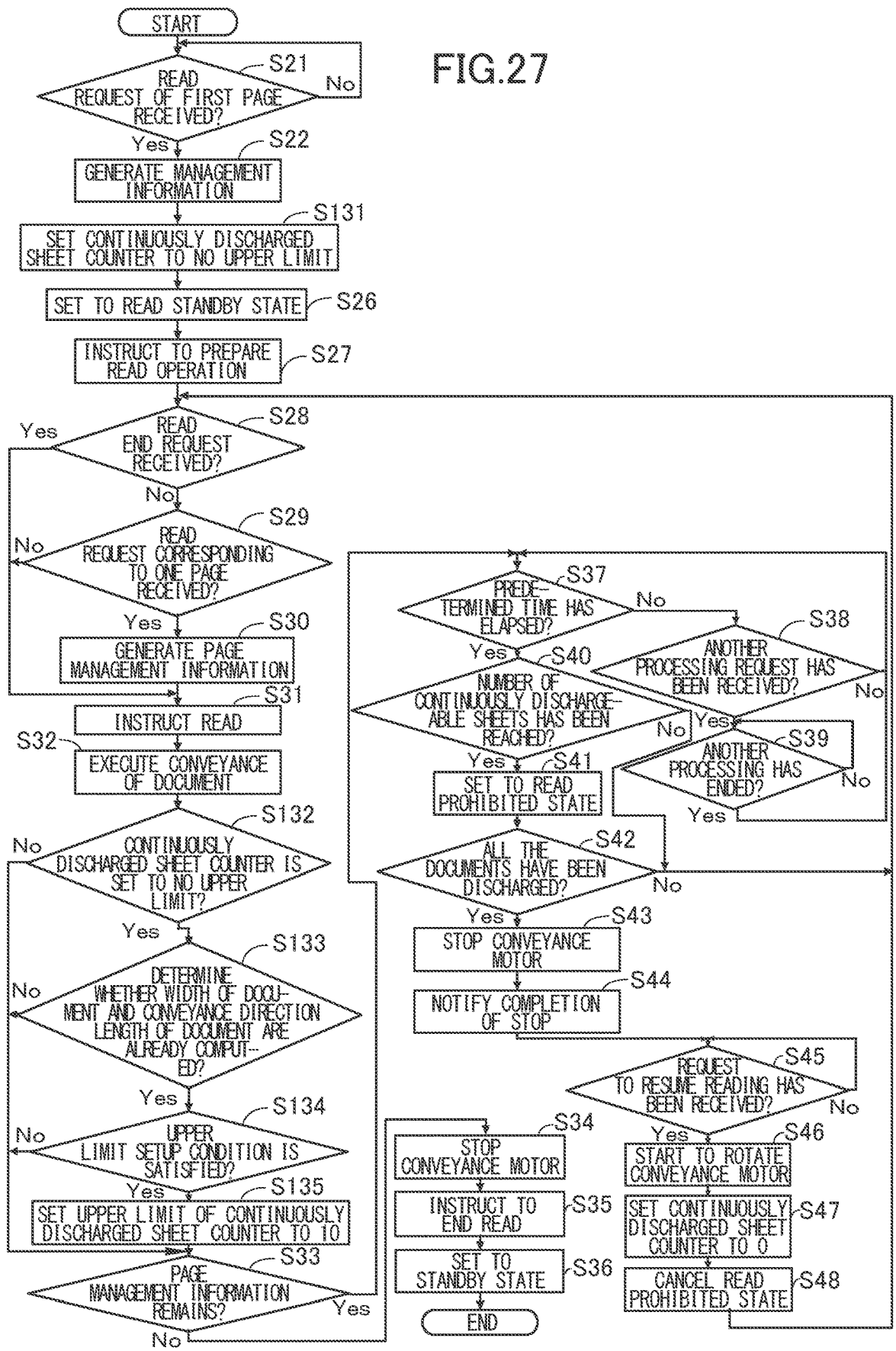
FIG. 27 is a flowchart illustrating a control processing of an entire image reading apparatus when reading a document image according to a third embodiment.

FIG. 27 is a flowchart illustrating a control processing of the entire image reading apparatus 1000 when reading a document in a case where the freely set size is selected as the document size in the operation unit 405.

After executing the processing of step S22, the CPU 321 sets the upper limit of the continuously discharged sheet counter to no upper limit and stores the same in the apparatus management information (S131). In the processing of step S131, the CPU 321 sets the upper limit of the continuously discharged sheet counter to no upper limit at a point of time of starting the reading job, since a read mode of the freely set size is selected. The method for setting the no upper limit is similar to the processing of step S25 according to the first embodiment, wherein a value greater than 1000 (9999 according to the third embodiment), which is the upper limit of the number of continuously readable sheets of the system, is set as the upper limit of the continuously discharged sheet counter.

After executing the processing of step S32, the CPU 321 executes a processing to perform update to the upper limit value of the continuously discharged sheet counter according to the document size. In the processing for performing update of the upper limit value of the continuously discharged sheet counter according to the document size, at first, the CPU 321 determines whether the continuously discharged sheet counter is set to no upper limit (S132). In this processing, if it is determined that the continuously discharged sheet counter is set to no upper limit (Yes), the CPU 321 determines whether the width of the document and the conveyance direction length of the document are already computed (S133). The CPU 321 computes the width of the document based on the control that is executed in a case where document image is read using the CCD sensor unit 210 described below. Further, the CPU 321 computes the conveyance direction length of the document based on the document conveyance control described below.

In the processing of step S133, if it is determined that the width and the conveyance direction length of the document have already been computed (Yes), the CPU 321 determines whether a condition determined to have a low stackability when discharged onto the sheet discharge tray 10, i.e., upper limit setting condition, is satisfied (S134). In the third embodiment, regarding the width and the conveyance direction length of the document being computed, the CPU 321 determines that the above-mentioned setting condition is satisfied when the document width is less than a transverse feeding of an A6 size sheet (105 mm) and the conveyance direction length is twice the document width or greater. The upper limit setting condition constitutes the predetermined condition according to the third embodiment.

In the processing of step S134, if it is determined that the upper limit setting condition has been satisfied (Yes), the CPU 321 sets the upper limit of the continuously discharged sheet counter to 10 and stores the same in the apparatus management information (S135).

According to this configuration, in a case where at least one of the documents in the bundle of documents S placed on the document tray 30 has a width that is less than the predetermined width and the size thereof is not the same as the other documents, the CPU 321 according to the third embodiment sets the upper limit value to the continuously discharged sheet counter. According to this configuration, even in a case where documents of various sizes including the document having a width less than the predetermined width are placed in a mixed manner on the document tray 30 and the stackability on the sheet discharge tray 10 is low, the image reading apparatus 1000 sets a limitation to the number of sheets of the documents to be supported on the sheet discharge tray 10 without the setting performed by the user. Thereby, in a case where documents including a document having low stackability are read continuously in the image reading apparatus 1000, the changing of order in which the documents are stacked on the sheet discharge tray 10 or the occurrence of sheet jams in the sheet discharge unit 33 can be suppressed.

Control Regarding CCD Sensor Unit

Figure 28:
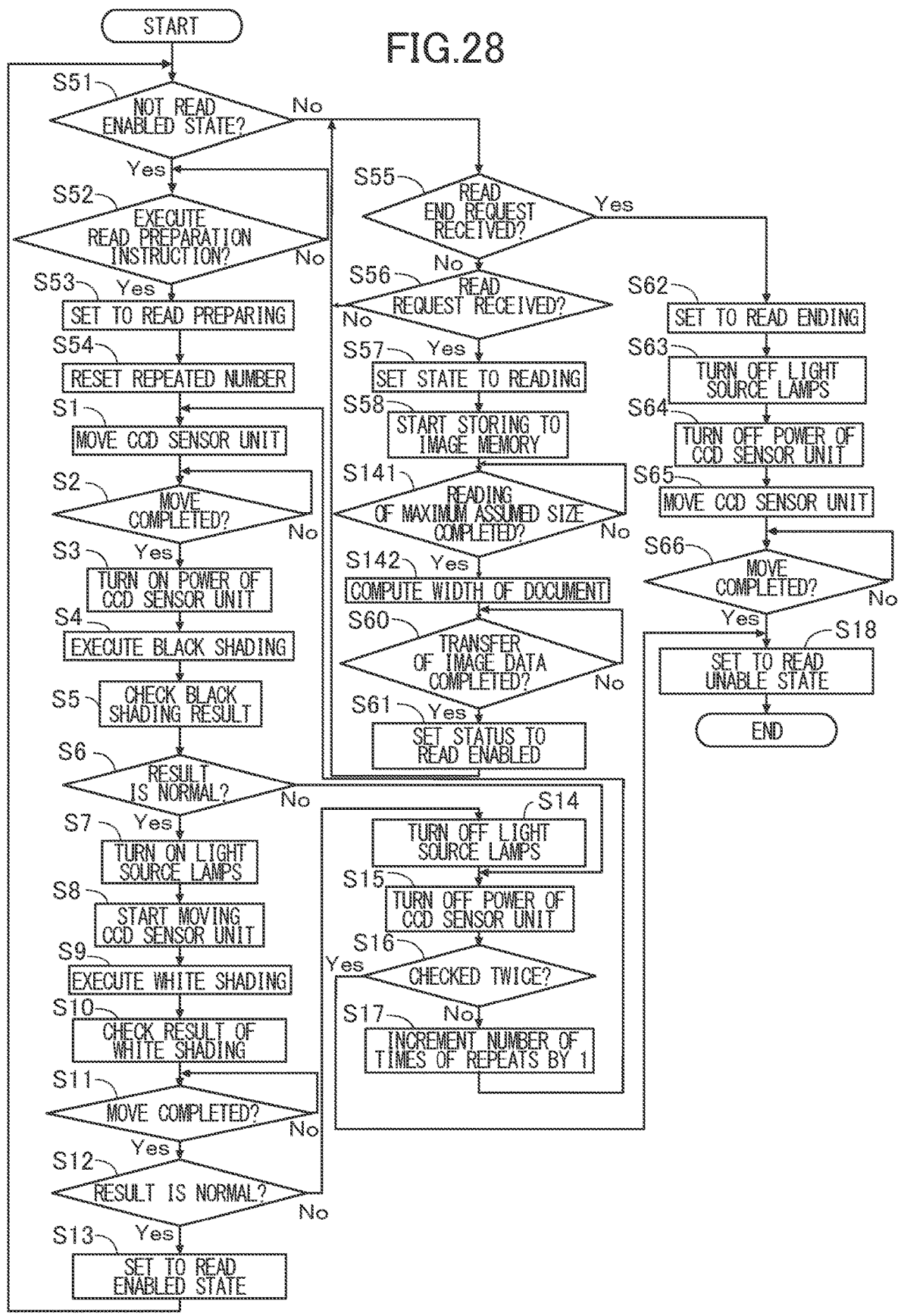
FIG. 28 is a flowchart illustrating a control that is executed by the CPU when reading a document image using a CCD sensor unit according to the third embodiment.

FIG. 28 is a flowchart illustrating a control executed when the CPU 321 reads a document image using the CCD sensor unit 210 in a case where a freely set size is selected as the document size.

After executing the processing of step S58 of a control when reading the document image using the CCD sensor unit 210 in a case where the freely set size is selected as the document size, the CPU 321 executes the processing regarding computing of the document width. Regarding the processing of the computing of document width, at first, the CPU 321 determines whether the reading of the maximum assumable document size has been completed (S141). In this processing, using the document length sensors 17 and 18 and a guide width detection sensor (not shown) for detecting the interval between two document guide plates 31, the CPU 321 determines the maximum assumable document size, i.e., assumed maximum size, based on the detection results of the respective sensors.

In the processing of step S141, if it is determined that the reading of the assumed maximum size has not been completed (No), the CPU 321 repeats the processing of step S141 until the reading of the assumed maximum size has been completed. Meanwhile, if it is determined that the reading of the assumed maximum size has been completed (Yes), the CPU 321 computes the document width based on the image data being read (S142) and advances the processing to step S60. In this processing, the CPU 321 computes the document width by subtracting, from the width of the assumed maximum size, the distance W1 (refer to FIG. 10) from the left edge of the assumed maximum size to the left edge of the leading edge of the document and the distance W2 (refer to FIG. 10) from the right edge of the assumed maximum size to the right edge of the leading edge of the document. The CPU 321 refers to the computed document width in the processing of step S133 of control of the entire apparatus (refer to FIG. 27).

Conveyance Control Regarding One Sheet of Document

Figure 29:
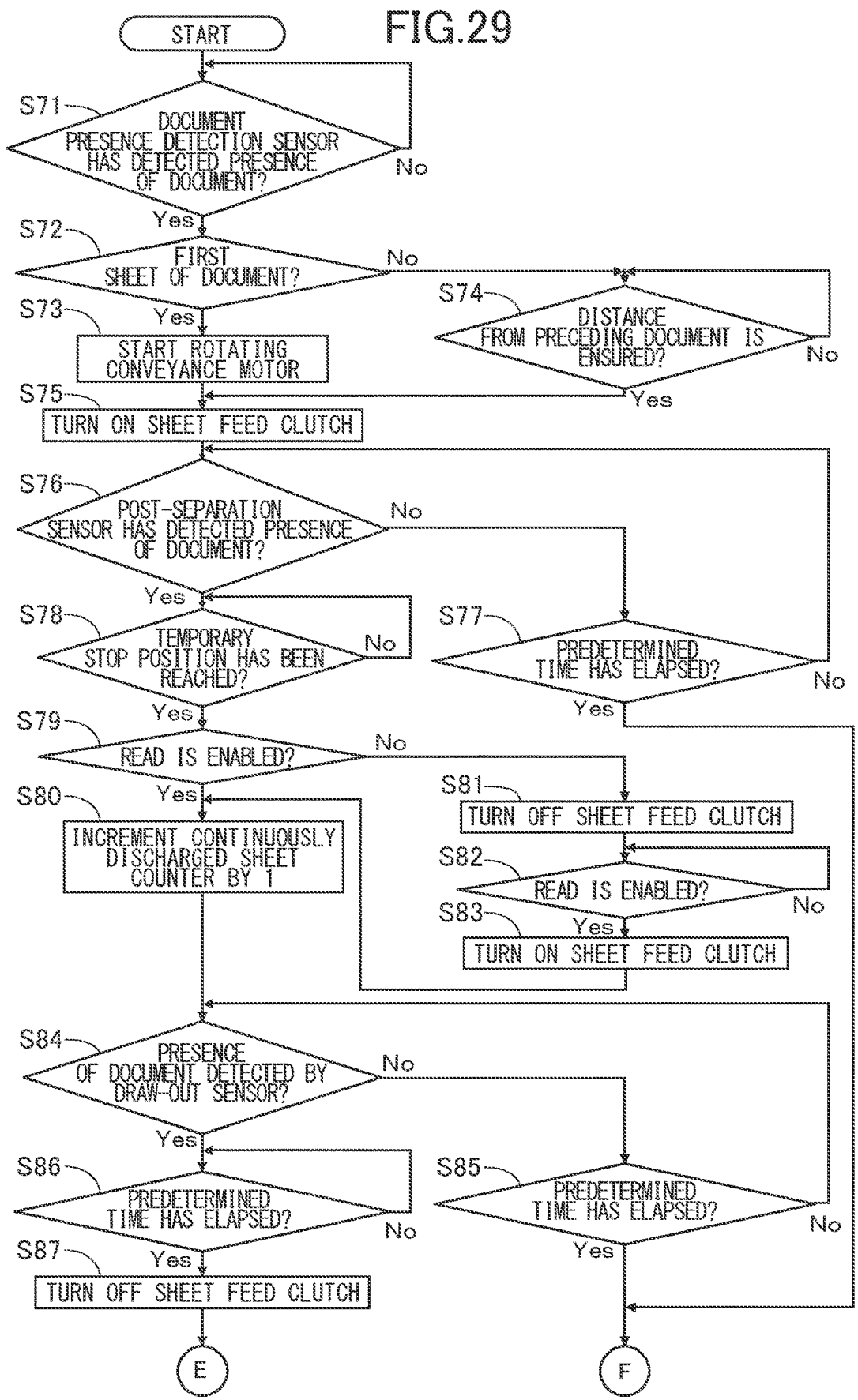
FIG. 29 is a flowchart illustrating a conveyance control of a document that is executed by the CPU when reading an image from one sheet of document according to the third embodiment.
Figure 30:
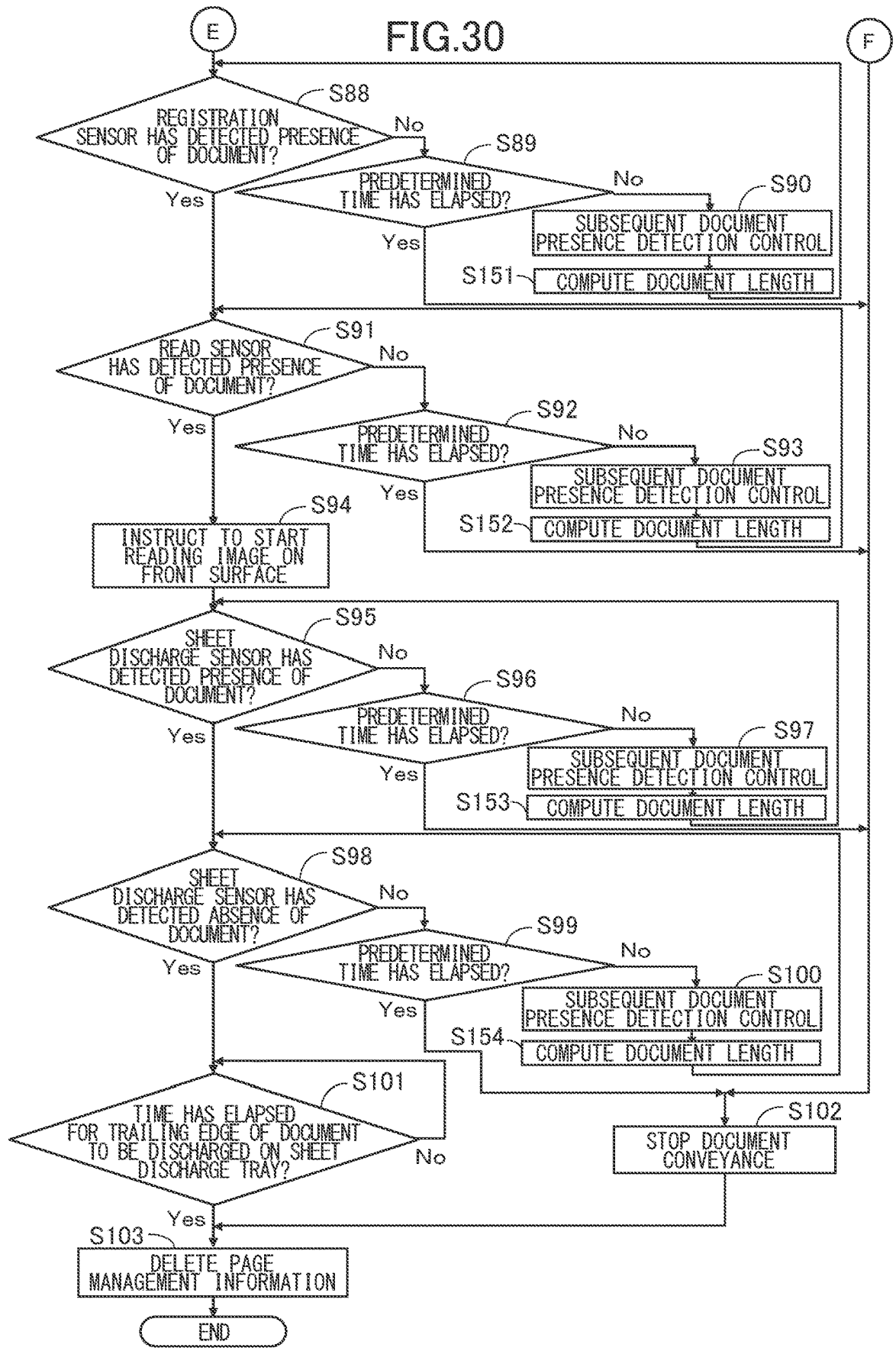
FIG. 30 is a flowchart illustrating a conveyance control of a document that is executed by the CPU when reading an image from one sheet of document according to the third embodiment.

FIGS. 29 and 30 are flowcharts illustrating the document conveyance control that the CPU 321 executes to read an image from one sheet of document.

After executing the processing of step S90 in the conveyance control regarding one sheet of document, the CPU 321 executes a control to compute the conveyance direction length of the document (S151) and returns the processing to step S88. Further, after executing the processing of step S93, the CPU 321 executes a control to compute the conveyance direction length of the document (S152) and returns the processing to step S91. Further, after executing the processing of step S97, the CPU 321 executes a control to compute the conveyance direction length of the document (S153) and returns the processing to step S95. Then, after executing the processing of step S100, the CPU 321 executes a control to compute the conveyance direction length of the document (S154) and returns the processing to step S98.

Control of Computing Conveyance Direction Length of Document

Figure 31:
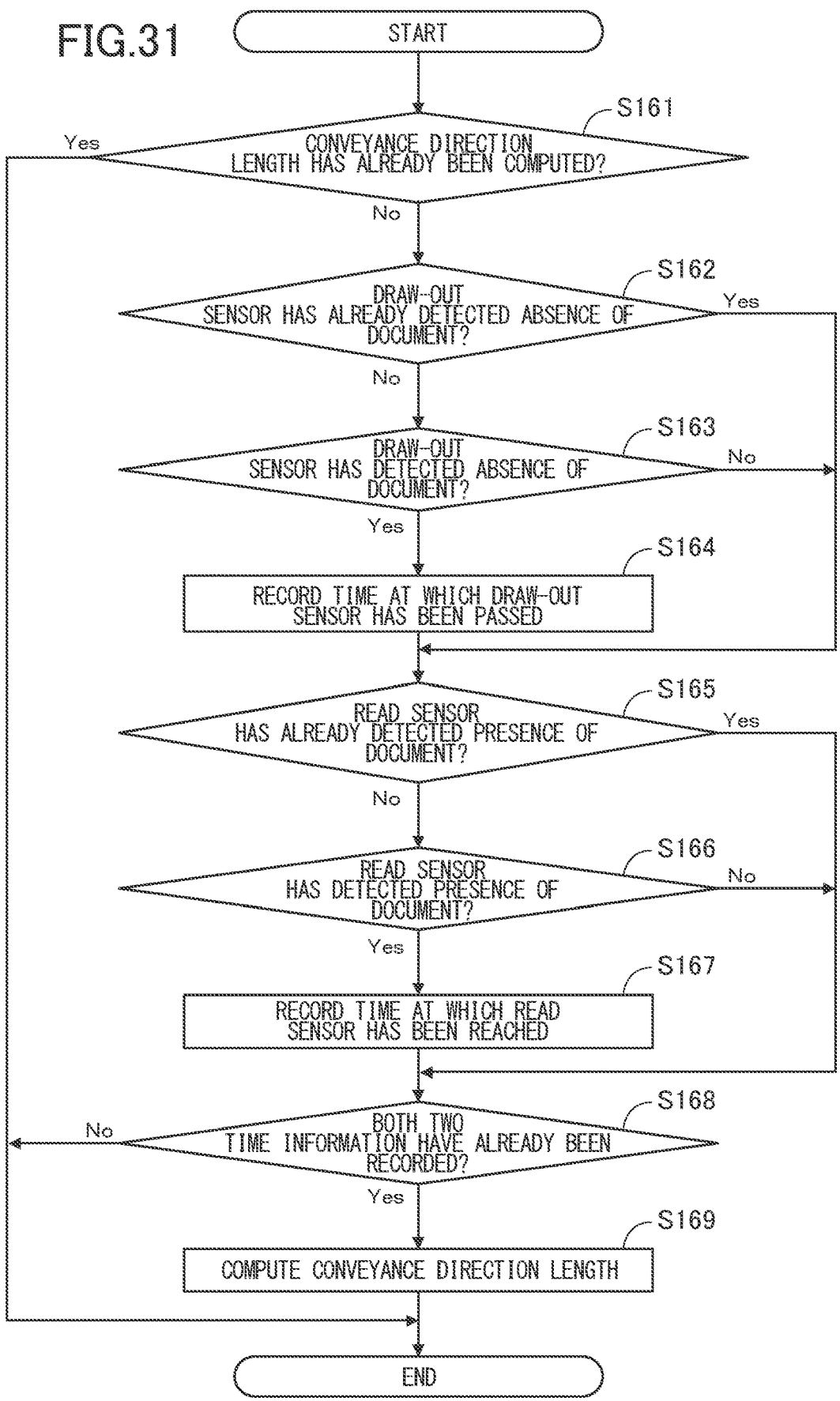
FIG. 31 is a flowchart illustrating a control for computing a length of a conveyance direction of a document according to the third embodiment.

FIG. 31 is a flowchart illustrating a control for computing the conveyance direction length of the document executed in the processing of steps S151 to S154 illustrated in FIG. 30.

Figure 32:
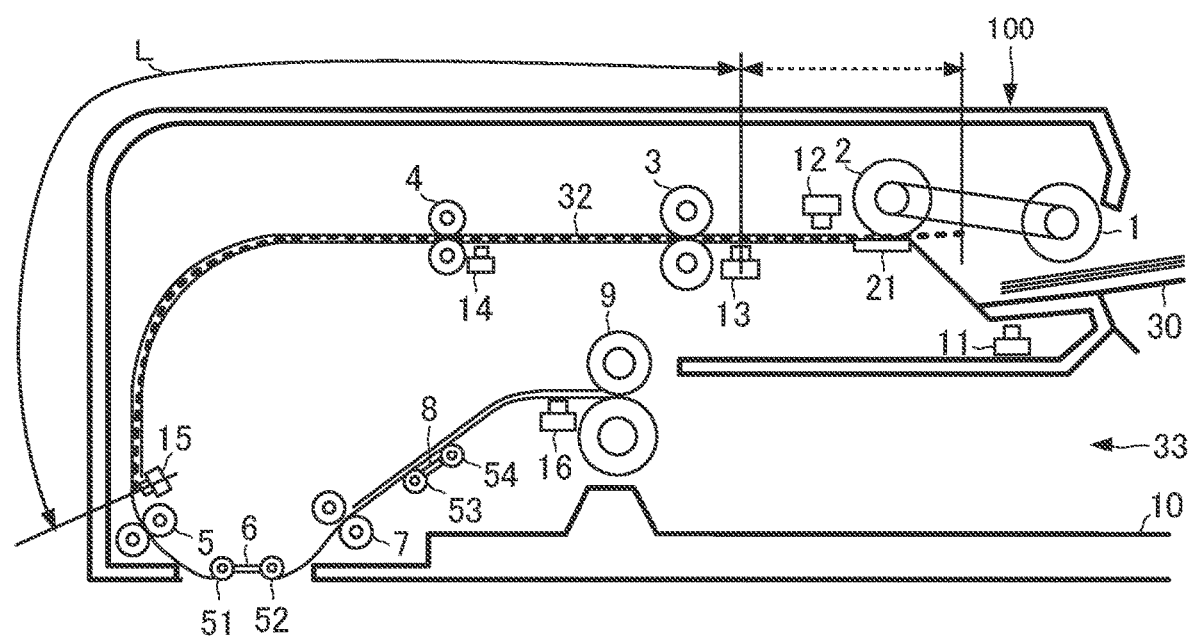
FIG. 32 is a view illustrating a case in which a length of a document in a conveyance direction is longer than a distance from a draw-out sensor to a read sensor according to the third embodiment.

As illustrated in FIG. 32, at first, the CPU 321 determines whether the conveyance direction length of the document has already been computed (S161). In this processing, since there are multiple chances for executing the control for computing the conveyance direction length of the document, the CPU 321 determines whether the conveyance direction length of the document has already been computed, and if it is determined that the length has already been computed (Yes), the control for computing the conveyance direction length of the document is ended.

Meanwhile, if it is determined that the conveyance direction length of the document has not been computed (No), the CPU 321 determines whether the draw-out sensor 13 has already detected absence of a document (S162). In this processing, if it is determined that the draw-out sensor 13 has already detected the absence of a document (Yes), the CPU 321 determines that the trailing edge of the document has already passed through the draw-out sensor 13 and advances the processing to step S165.

Meanwhile, if it is determined that the draw-out sensor 13 has not detected the absence of a document (Yes), the CPU 321 determines whether the draw-out sensor 13 has detected the absence of a document (S163). In this processing, if it is determined that the draw-out sensor 13 has not detected the absence of a document (No), the CPU 321 determines that the document is in the process of passing through the position of the draw-out sensor 13 and advances the processing to step S165.

Meanwhile, in a state where it is determined that the draw-out sensor 13 has detected absence of a document (Yes), the CPU 321 determines that the trailing edge of the document has passed through the position of the draw-out sensor 13, records the time at which the draw-out sensor 13 has detected absence of document (S164), and advances the processing to step S165.

In the processing of step S165, the CPU 321 determines whether the read sensor 15 has already detected the presence of a document (S165). In this processing, in a state where it is detected that the read sensor 15 has already detected the presence of a document (Yes), the CPU 321 determines that the leading edge of the document has already reached the read sensor 15, and advances the processing to step S168.

Meanwhile, if it is determined that the read sensor 15 has not detected the presence of a document (Yes), the CPU 321 determines whether the read sensor 15 has detected the presence of a document (S166). In this processing, if it is determined that the read sensor 15 has not detected the presence of a document (No), the CPU 321 determines that the leading edge of the document has not reached the position of the read sensor 15, and advances the processing to step S168.

Meanwhile, if it is determined that the read sensor 15 has detected the presence of a document (Yes), the CPU 321 determines that the leading edge of the document has reached the position of the read sensor 15, records the time at which the read sensor 15 has detected the presence of a document (S167), and advances the processing to step S168.

In the processing of step S168, the CPU 321 determines whether the two time information have been recorded, which are the time at which the draw-out sensor 13 has detected the absence of a document and the time at which the read sensor 15 has detected the presence of a document (S168). In this processing, if it is determined that the two time information have not been recorded (No), the CPU 321 determines that the condition for enabling the conveyance direction length of the document to be computed is not satisfied, and ends the control for computing the conveyance direction length of the document.

Meanwhile, if it is determined that the two time information have been recorded (Yes), the CPU 321 determines that the condition for enabling the conveyance direction length of the document to be computed is satisfied, computes the conveyance direction length of the document (S169), and ends the control for computing the conveyance direction length of the document.

The details of the processing of step S169 will be described with reference to FIGS. 32 and 33. FIG. 32 illustrates a case in which the conveyance direction length of the document is longer than a distance L from the draw-out sensor 13 to the read sensor 15. In such a case, in the image reading apparatus 1000, the presence of a document is detected by the read sensor 15 and the processing of step S167 is executed. Meanwhile, in the image reading apparatus 1000, the absence of a document is not detected by the draw-out sensor 13, and the processing of step S164 is not executed.

Therefore, at a point of time when the trailing edge of the document has passed through the draw-out sensor 13 and the draw-out sensor 13 has detected the absence of a document, the CPU 321 executes the processing of step S164 and records the time. Then, the CPU 321 computes the result of having added the distance L to a product of a conveyance speed and a time difference between the timing at which the draw-out sensor 13 has detected the absence of a document and a timing at which the read sensor 15 has detected the presence of a document as the conveyance direction length of the document.

Figure 33:
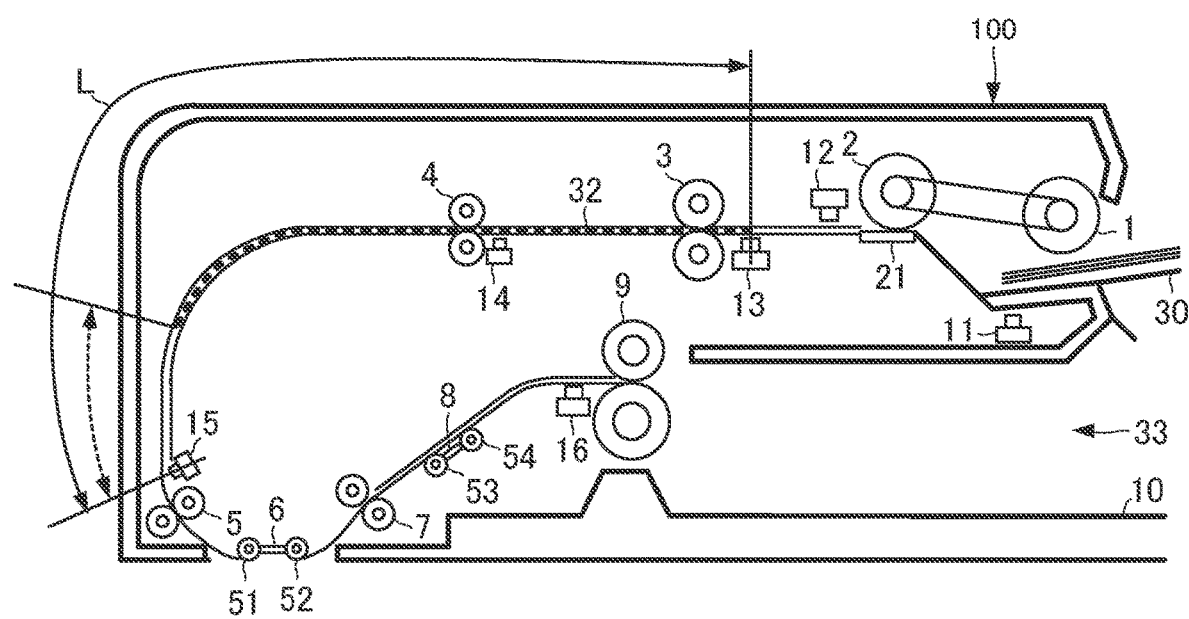
FIG. 33 is a view illustrating a case in which a length of a document in the conveyance direction is longer than the distance from the draw-out sensor to the read sensor according to the third embodiment.

FIG. 33 is a view illustrating a state in which the conveyance direction length of the document is shorter than the distance L from the draw-out sensor 13 to the read sensor 15. In such a case, in the image reading apparatus 1000, at a point of time when the absence of a document is detected by the draw-out sensor 13 and the processing of step S164 is executed, there is a state in which the read sensor 15 has not detected the presence of a document.

Therefore, the CPU 321 executes the processing of step S167 and records the time at a point of time when the leading edge of the document has reached the read sensor 15 and the read sensor 15 has detected the presence of a document. Then, the CPU 321 computes the result of having subtracted the product of the conveyance speed and the time difference between the timing at which the absence of a document has been detected by the draw-out sensor 13 and a timing at which the presence of a document has been detected by the read sensor 15 from the distance L as the conveyance direction length of the document.

As described, the CPU 321 computes the conveyance direction length of the document in the processing of step S169, and refers to the conveyance direction length of the document having been computed in the processing of step S133 of the control of the entire apparatus (refer to FIG. 27).

The CPU 321 that acquires the document size composed of the width of the document and the conveyance direction length of the document constitutes a size acquisition unit, a length acquisition unit, and a width acquisition unit according to the third embodiment.

Summary of Third Embodiment

As described, the image reading apparatus 1000 according to the third embodiment is configured to compute the width and the conveyance direction length of the document, and at a point of time when it is determined that the document has a low stackability based on the computed document size, to set an upper limit value of the continuously discharged sheet counter. In other words, the CPU 321 is configured to switch from a second mode in which there is no limitation on the number of continuously dischargeable sheets to a first mode in which the number of continuously dischargeable sheets is limited to a predetermined number.

According to this configuration, in a case where the image reading apparatus 1000 subjects the document determined to have low stackability to continuous reading, a limitation is provided to the number of documents to be stacked on the sheet discharge tray 10 regardless of the setting performed by the user. Thereby, in a case where the image reading apparatus 1000 reads documents determined to have low stackability continuously, the changing of order in which the documents are stacked on the sheet discharge tray 10 or the occurrence of sheet jam in the sheet discharge unit 33 can be suppressed.

Other Embodiments

In the first to third embodiments, a receipt has been defined as the type of document that is specified as a document having low stackability in the reading job, but it is merely one example of a dedicated setting that is prepared according to a job workflow application. A similar effect can be acquired by applying the present invention to any document having a narrow width, such as a receipt. Further, a similar effect can be acquired by applying the present invention in a mixed-load read mode in which a plurality of document having different sizes are read.

Further, according to the first to third embodiments, the CPU 321 limits the number of continuously dischargeable sheets, and when the number of documents discharged by the sheet discharge roller 9 has reached a predetermined number, stops the feeding of the document regardless of the detection result of the document presence detection sensor 11, but the present technique is not limited to this example. The CPU 321 can be configured to count the number of sheets being fed and to stop the feeding of sheets when the number has reached a predetermined number, instead of the configuration of counting the number of discharged sheets and stopping the feeding of sheets when the number has reached a predetermined number. That is, the CPU 321 can be configured to be able to set a first mode of stopping the feeding of documents regardless of the detection result of the document presence detection sensor 11 in a case where the number of documents fed continuously by the pickup roller 1 and the separation roller 2 has reached a predetermined number. Further, the CPU 321 can be configured to be able to set a second mode of continuing continuous feeding of documents by the pickup roller 1 and the separation roller 2 regardless of the number of documents being fed continuously by the pickup roller 1 and the separation roller 2. The CPU 321 can be configured to be able to selectively execute the first mode and the second mode.

According to such a configuration, in a state where documents that have low stackability and are difficult to align in a stacked manner is read continuously by the image reading apparatus 1000, a limitation is provided to the number of documents being fed continuously so as to limit the number of documents being stacked on the sheet discharge tray 10. Thereby, the image reading apparatus 1000 can suppress the changing of order in which the documents are stacked on the sheet discharge tray 10 or the occurrence of sheet jam in the sheet discharge unit 33. Further, even if the number of documents having exceeded the number of continuously feedable sheets is placed on the document tray 30, the image reading apparatus 1000 can set the first mode so as to limit the number of documents being fed continuously. Thereby, the image reading apparatus 1000 can reduce the number of times that documents are placed on the document tray 30 and the number of times the reading job is instructed and executed, such that the number of steps performed by the user when reading documents can be reduced.

Further according to the first to third embodiments, the CPU 321 initializes the continuously discharged sheet counter when a request to resume reading output from the controller unit 400 by having the OK button on the operation unit 405 pressed is received, but the present invention is not limited to this example. For example, the CPU 321 can be configured to be able to resume the conveyance of the document by initializing the continuously discharged sheet counter and continue the limitation of the number of continuously dischargeable sheets at a point of time when a sensor 34 (refer to FIG. 1) that detects presence or absence of a document placed on the sheet discharge tray 10 detects the absence of a document.

According to the above configuration, the document presence detection sensor 11 constitutes a first detection unit, and the sensor 34 that is arranged on the sheet discharge tray 10 and that detects the presence or absence of a document placed on the sheet discharge tray 10 constitutes a second detection unit.

Further according to the first and third embodiments, the CPU 321 is configured to temporarily stop the document at a position between the separation roller 2 and the drawing roller 3 when the number of continuously dischargeable sheets has reached a predetermined number, but the present technique is not limited to this example. The CPU 321 can be configured to set any position between the document tray 30 and the CCD sensor unit 210 in the conveyance path 32 as the position at which the document is temporarily stopped when the number of continuously dischargeable sheets has reached a predetermined number.

Further according to the third embodiment, in a state where a read mode of the freely set size is set and the upper limit setting conditions have been satisfied, the CPU 321 is configured to set an upper limit value of the continuously discharged sheet counter, but the present technique is not limited thereto. Even in a case where the conditions for setting the upper limit are satisfied, if a specific switch (not shown) for suppressing a control to set the upper limit value of the continuously discharged sheet counter provided on the operation unit 405 is operated, for example, the CPU 321 can be configured to not set the upper limit value of the continuously discharged sheet counter.

As described above, in a case where the upper limit value of the continuously discharged sheet counter is set, the CPU 321 according to the third embodiment is configured not to update the upper limit value until the reading job is ended. Therefore, by not setting the upper limit value of the continuously discharged sheet counter when a specific switch is operated in the image reading apparatus 1000, even in a case where a small document not intended by the user is mixed in the bundle of documents S, the continuous reading of documents can be continued exceeding the predetermined number of documents.

Even according to such case, the CPU 321 constitutes a mode maintaining unit of maintaining a second mode even if a condition for switching from the second mode to the first mode is satisfied.

According further to the third embodiment, when determining whether the upper limit setting conditions have been satisfied, the CPU 321 is configured to refer to the width and the conveyance direction length of the document, but the present technique is not limited to this example. For example, the CPU 321 can be configured to determine that the document has low stackability and that the upper limit setting conditions are satisfied in a case where the thickness of the document is less than a predetermined thickness using a sensor for detecting a thickness of the document provided on the conveyance path 32.

When this configuration is adopted, a document of a first type whose number of continuously dischargeable sheets is limited to a predetermined number of sheets is set as a document having a low stackability in the sheet discharge tray 10 since the document is thinner than the document of the second type and easily crumpled, folded, and curled. The type of the document determined to have a thickness less than the predetermined thickness constitutes a specific type, and the CPU 321 that detects the thickness of the document and determines whether the thickness is less than a predetermined thickness constitutes a type detection unit.

Further according to the third embodiment, the CPU 321 is configured to determine whether the upper limit setting conditions have been satisfied based on the width of the document and the magnification of the conveyance direction length of the document and document width, but the present technique is not limited thereto. For example, the CPU 321 can be configured to determine that the upper limit setting condition has been satisfied in a case where the document width being computed is less than a predetermined width. Further, if the conveyance direction length of the document being computed is less than a predetermined length, the CPU 321 can be configured to determine that the upper limit setting conditions have been satisfied.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-111240, filed Jul. 5, 2021, which is hereby incorporated by reference herein in its entirety.

What is claimed is:

1. An image reading apparatus comprising:
a document tray on which a document is placed;
a detection unit configured to detect the document placed on the document tray;
a sheet feeding unit configured to feed the document placed on the document tray;
a conveyance unit configured to convey the document fed by the sheet feeding unit along a conveyance path;
a reading unit configured to read an image on the document being conveyed by the conveyance unit;
a sheet discharge unit configured to discharge the document having been read by the reading unit;
a sheet discharge tray on which the document discharged by the sheet discharge unit is stacked; and
a control unit configured to control the sheet feeding unit such that in a reading job in which a plurality of documents on the document tray is continuously fed by the sheet feeding unit, the sheet feeding unit stops the continuous feeding of the documents in response to changing of a state of the detection unit from a detection state in which the detection unit detects a document on the document tray to a non-detection state in which the detection unit does not detect any document on the document tray,
wherein the control unit is configured to execute a first mode and a second mode, the first mode being a mode in which the sheet feeding unit stops the continuous feeding of the documents in a case where the number of documents having been discharged continuously by the sheet discharge unit in the reading job has reached a predetermined number of sheets, regardless of a detection result of the detection unit, and the second mode being a mode in which the sheet feeding unit continues the continuous feeding of the documents regardless of the number of documents having been discharged continuously by the sheet discharge unit.

2. The image reading apparatus according to claim 1, wherein in the first mode, in a state where the number of documents having been discharged continuously has reached the predetermined number of sheets, the control unit is configured to stop a leading edge of a document being fed subsequent to a document having been determined to have caused the number of documents having been discharged continuously to reach the predetermined number of sheets at a position between the document tray and the reading unit in the conveyance path.

3. The image reading apparatus according to claim 1, wherein the control unit is configured to execute the first mode in a case where a type of the document is a first type, and to execute the second mode in a case where the type of the document is a second type that differs from the first type, and
wherein the document of the first type has a thickness thinner than the document of the second type.

4. The image reading apparatus according to claim 3, wherein the control unit is configured to set the first mode to be executed in a case where at least one document among the plurality of documents placed on the document tray has a width orthogonal to a conveyance direction that is less than a predetermined width and a size of the plurality of documents placed on the document tray is not uniform.

5. The image reading apparatus according to claim 4, further comprising a cancel unit configured to cancel a limitation of the number of documents having been discharged continuously by the predetermined number of sheets in a case where the document placed on the document tray is the document of the first type.

6. The image reading apparatus according to claim 1, further comprising:
an operation unit configured to accept an operation by a user,
wherein, in the first mode, the control unit is configured to display on the operation unit an information urging removal of the document on the sheet discharge tray in a case where the continuous feeding of documents by the sheet feeding unit is stopped on the basis that the number of documents having been discharged continuously by the sheet discharge unit has reached the predetermined number of sheets.

7. The image reading apparatus according to claim 6, wherein, after displaying the information, the control unit is configured to continue the first mode and resume feeding of the document according to an operation by the user.

8. The image reading apparatus according to claim 6, further comprising:
a second detection unit where the detection unit is a first detection unit,
wherein the second detection unit is configured to detect the document on the sheet discharge tray, and
wherein, after displaying the information, the control unit is configured to continue the first mode and resume feeding of the document in a case where the absence of the document on the sheet discharge tray is detected by the second detection unit.

9. The image reading apparatus according to claim 1, further comprising:
an operation unit configured to accept an operation by a user,
wherein the control unit is configured to set the predetermined number of sheets according to an input from the operation unit.

10. The image reading apparatus according to claim 1, further comprising:
a type detection unit configured to detect a type of the document; and
wherein the control unit is configured to execute the first mode in a case where the type of the document detected by the type detection unit is a specific type.

11. The image reading apparatus according to claim 1, further comprising:
a size acquisition unit configured to acquire a size of the document,
wherein the control unit is configured to execute the first mode in a state where the size of the document acquired by the size acquisition unit satisfies a predetermined condition.

12. The image reading apparatus according to claim 11, wherein the size acquisition unit includes a width acquisition unit configured to acquire a width orthogonal to a conveyance direction of the document; and
wherein the control unit is configured to execute the first mode in a case where the width orthogonal to the conveyance direction of the document acquired by the width acquisition unit is less than a predetermined width.

13. The image reading apparatus according to claim 11, wherein the size acquisition unit includes a length acquisition unit configured to acquire a conveyance direction length of the document and a width acquisition unit configured to acquire a width orthogonal to the conveyance direction of the document, and wherein the control unit is configured to execute the first mode in a state where the conveyance direction length of the document acquired by the length acquisition unit is longer than a predetermined magnification of a width orthogonal to the conveyance direction of the document acquired by the width acquisition unit and where the width orthogonal to the conveyance direction of the document is less than a predetermined width.

14. The image reading apparatus according to claim 11, wherein the size acquisition unit includes a length acquisition unit configured to acquire a conveyance direction length of the document; and
wherein the control unit is configured to execute the first mode in a case where the conveyance direction length of the document acquired by the length acquisition unit is less than a predetermined length in a state where the second mode is set.

15. An image forming apparatus comprising:
the image reading apparatus according to claim 1; and
an image forming unit configured to form an image on a sheet based on an image information read by the image reading apparatus.

16. An image reading apparatus comprising:
a document tray on which a document is placed;
a detection unit configured to detect the document placed on the document tray;
a sheet feeding unit configured to feed the document placed on the document tray;
a conveyance unit configured to convey the document fed by the sheet feeding unit along a conveyance path;
a reading unit configured to read an image on the document conveyed by the conveyance unit;
a sheet discharge unit configured to discharge the document having been read by the reading unit;
a sheet discharge tray on which the document discharged by the sheet discharge unit is stacked; and
a control unit configured to control the sheet feeding unit such that in a reading job in which a plurality of documents on the document tray is continuously fed by the sheet feeding unit, the sheet feeding unit stops the continuous feeding of the documents in response to changing of a state of the detection unit from a detection state in which the detection unit detects a document on the document tray to a non-detection state in which the detection unit does not detect any document on the document tray,
wherein the control unit is configured to execute a first mode and a second mode, the first mode is a mode in which the sheet feeding unit stops the continuous feeding of the documents in a case where the number of documents having been fed continuously by the sheet feeding unit in the reading job has reached a predetermined number of sheets, regardless of a detection result of the detection unit, and the second mode is a mode in which the sheet feeding unit continues the continuous feeding of the documents regardless of the number of documents having been fed continuously by the sheet feeding unit.

17. An image reading apparatus comprising:
a document tray on which a document is placed;
a detection unit configured to detect the document placed on the document tray;
a sheet feeding unit configured to feed the document placed on the document tray;
a conveyance unit configured to convey the document fed by the sheet feeding unit along a conveyance path;

a reading unit configured to read an image on the document being conveyed by the conveyance unit;

a sheet discharge unit configured to discharge the document having been read by the reading unit;

a sheet discharge tray on which the document discharged by the sheet discharge unit is stacked; and a control unit configured to control the sheet feeding unit such that in a reading job in which a plurality of documents on the document tray is continuously fed by the sheet feeding unit, the sheet feeding unit stops the continuous feeding of the documents in response to changing of a state of the detection unit from a detection state in which the detection unit detects a document on the document tray to a non-detection state in which the detection unit does not detect any document on the document tray, wherein, in a state where a document on the document tray is detected by the detection unit, the control unit is configured to stop the continuous feeding of the documents by the sheet feeding unit, if documents continuously read by the reading unit in the reading job have reached a predetermined number of sheets.

* * * * *